United States Patent
Yoshioka et al.

(10) Patent No.: US 8,781,728 B2
(45) Date of Patent: Jul. 15, 2014

(54) TRAVEL HISTORY EDITING DEVICE

(75) Inventors: Mototaka Yoshioka, Osaka (JP); Jun Ozawa, Nara (JP); Takahiro Kudoh, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1199 days.

(21) Appl. No.: 12/375,345

(22) PCT Filed: Oct. 22, 2007

(86) PCT No.: PCT/JP2007/070535
§ 371 (c)(1),
(2), (4) Date: Jan. 27, 2009

(87) PCT Pub. No.: WO2008/050711
PCT Pub. Date: May 2, 2008

(65) Prior Publication Data
US 2009/0312946 A1 Dec. 17, 2009

(30) Foreign Application Priority Data
Oct. 26, 2006 (JP) .................................. 2006-291129

(51) Int. Cl.
*G01C 21/32* (2006.01)
(52) U.S. Cl.
USPC .......................................................... 701/424
(58) Field of Classification Search
CPC .......................... G01C 21/3673; G01C 21/3617
USPC .................. 701/200–226, 400–444
See application file for complete search history.

(56) References Cited

U.S. PATENT DOCUMENTS

| | | | | |
|---|---|---|---|---|
| 6,067,502 A | * | 5/2000 | Hayashida et al. | ........... 701/209 |
| 2006/0020387 A1 | | 1/2006 | Nagata et al. | |
| 2008/0133124 A1 | * | 6/2008 | Sarkeshik | ..................... 701/201 |

FOREIGN PATENT DOCUMENTS

| | | |
|---|---|---|
| JP | 2000-205868 | 7/2000 |
| JP | 2001-50760 | 2/2001 |
| JP | 2005-30982 | 2/2005 |
| JP | 2006-030051 | 2/2006 |
| JP | 2007-298499 | 11/2007 |

OTHER PUBLICATIONS

International Search Report issued Jan. 22, 2008 in the International (PCT) Application of which the present application is the U.S. National Stage.
Japanese Office Action from corresponding Japanese Application No. 2008-540974.

* cited by examiner

*Primary Examiner* — Minnah Seoh
(74) *Attorney, Agent, or Firm* — Wenderoth, Lind & Ponack, L.L.P.

(57) ABSTRACT

A travel history editing device including: a position information detecting unit detecting position information of a vehicle; a map information accumulation unit accumulating pre-registered position information and name information; and an arrival point name providing unit, (i) reading out a name of a facility, and providing the read name as the arrival point when the arrival point corresponds to a position of the facility, and (ii) reading out other name information from the map information accumulation unit, and providing the other name information when the arrival point does not correspond to the position of the facility. Further the device includes an arrival point history accumulation unit accumulating an arrival point corresponding to the facility and the name; and a name editing unit editing the name of the arrival point for which the other name is provided as the name of the facility accumulated in the arrival point history accumulation unit.

19 Claims, 56 Drawing Sheets

FIG. 3

| Date | East longitude | North latitude | |
|---|---|---|---|
| 11:40, June 24th, 2006 | 135 degrees 13 minutes 10 seconds | 35 degrees 44 minutes 15 seconds | |
| 11:40, June 24th, 2006 | 135 degrees 13 minutes 34 seconds | 35 degrees 44 minutes 25 seconds | |
| 11:41, June 24th, 2006 | 135 degrees 13 minutes 34 seconds | 35 degrees 44 minutes 41 seconds | |
| 11:41, June 24th, 2006 | 135 degrees 13 minutes 34 seconds | 35 degrees 43 minutes 01 seconds | |
| 11:41, June 24th, 2006 | 135 degrees 13 minutes 34 seconds | 35 degrees 43 minutes 08 seconds | |
| 11:42, June 24th, 2006 | 135 degrees 13 minutes 34 seconds | 35 degrees 43 minutes 14 seconds | |
| : | : | : | |
| : | : | : | |
| 12:02, June 24th, 2006 | 135 degrees 20 minutes 11 seconds | 35 degrees 53 minutes 20 seconds | ← Engine shut down |

FIG. 5

| Travel history ID | Date | Position | Destination | ... |
|---|---|---|---|---|
| 001 | 2006/6/23/(Fri.)/8:10 | E135. 40. 11 N35. 10. 20 | Hanamachi corporation | ... |
| 002 | 2006/6/23/(Fri.)/20:21 | E136. 44. 10 N33. 18. 21 | House | ... |
| 003 | 2006/6/23/(Fri.)/8:20 | E135. 40. 11 N35. 10. 20 | Hanamachi corporation | ... |
| 004 | 2006/6/23/(Fri.)/20:21 | E136. 44. 10 N33. 18. 21 | House | ... |
| 005 | 2006/6/24/(Sat.)/11:20 | E135. 20. 01 N35. 58. 00 | Convenience store Ruson | ... |
| 006 | 2006/6/24/(Sat.)/12:01 | E135. 20. 11 N35. 53. 20 | Tiger department store | ... |
| 007 | 2006/6/24/(Sat.)/17:05 | E136. 40. 10 N33. 18. 21 | House | ... |
| 008 | 2006/6/25/(Sun.)/13:20 | E135. 20. 17 N35. 53. 23 | Hanamachi 3-1, Tanabe city | ... |
| 009 | 2005/9/22/(Fri.)/16:40 | E136. 40. 10 N33. 18. 21 | House | ... |
| .. | .. | .. | .. | ... |

FIG. 7A

| Travel history ID | Date | Position | Destination Name | ... |
|---|---|---|---|---|
| 001 | 2006/6/23/(Fri.)/8:10 | E135.40.11 N35.10.20 | Hanamachi corporation | ... |
| 002 | 2006/6/23/(Fri.)/20:21 | E136.44.10 N33.18.21 | House | ... |
| : | : | : | : | : |
| 005 | 2006/6/24/(Sat.)/11:20 | E135.20.01 N35.58.00 | Convenience store Ruson | ... |
| : | : | : | : | : |
| 013 | 2006/7/1/(Sat.)/11:23 | E135.20.01 N35.58.00 | Convenience store Ruson | ... |
| : | : | : | : | : |

FIG. 7B

| Destination Name |
|---|
| Convenience store Ruson |

FIG. 7C

| Travel history ID | Date | Position | Destination Name | ... |
|---|---|---|---|---|
| 005 | 2006/6/24/(Sat.)/11:20 | E135.20.01 N35.58.00 | Convenience store Ruson | ... |
| 013 | 2006/7/1/(Sat.)/11:23 | E135.20.01 N35.58.00 | Convenience store Ruson | ... |

FIG. 9A

| Travel history ID | Date | Position | Destination Name | ... |
|---|---|---|---|---|
| .. | .. | .. | .. | .. |
| 006 | 2006/6/24/(Sat.)/12:01 | E135.20.11 N35.53.20 | Tiger department store | ... |
| 007 | 2006/6/24/(Sat.)/17:05 | E136.40.10 N33.18.21 | House | ... |
| 008 | 2006/6/25/(Sun.)/13:20 | E135.20.17 N35.53.23 | Hanamachi 3-1, Tanabe city | ... |
| .. | .. | .. | .. | .. |

Search unavailable ←

FIG. 9B

| Destination name |
|---|
| Tiger department store |

FIG. 9C

| Travel history ID | Date | Position | Destination Name | ... |
|---|---|---|---|---|
| 006 | 2006/6/24/(Sat.)/12:01 | E135.20.11 N35.53.20 | Tiger department store | ... |

FIG. 12

| Travel history ID | Date | Position | Destination name | ... |
|---|---|---|---|---|
| 001 | 2006/6/23/(Fri.)/8:10 | E135.40.11 N35.10.20 | Hanamachi corporation | ... |
| 002 | 2006/6/23/(Fri.)/20:21 | E136.44.10 N33.18.21 | House | ... |
| 003 | 2006/6/23/(Fri.)/8:20 | E135.40.11 N35.10.20 | Hanamachi corporation | ... |
| 004 | 2006/6/23/(Fri.)/20:21 | E136.44.10 N33.18.21 | House | ... |
| 005 | 2006/6/24/(Sat.)/11:20 | E135.20.01 N35.58.00 | Convenience store Ruson | ... |
| 006 | 2006/6/24/(Sat.)/12:01 | E135.20.11 N35.53.20 | Tiger department store | ... |
| 007 | 2006/6/24/(Sat.)/17:05 | E136.40.10 N33.18.21 | House | ... |
| 008 | 2006/6/25/(Sun.)/13:20 | E135.20.17 N35.53.23 | ~~Hanamachi 3-1, Tanabe city~~ Tiger department store | ... |
| 009 | 2005/9/22/(Fri.)/16:40 | E136.40.10 N33.18.21 | House | ... |
| .. | .. | .. | .. | .. |

FIG. 13A

| Travel history ID | Date | Position | Destination name |
|---|---|---|---|
| : | : | : | : |
| 006 | 2006/6/24/(Sat.)/12:01 | E135.20.11 N35.53.20 | Tiger department store |
| 007 | 2006/6/24/(Sat.)/17:05 | E136.40.10 N33.18.21 | House |
| 008 | 2006/6/25/(Sun.)/13:20 | E135.20.17 N35.53.23 | ~~Hanamachi 3-1, Tanabe city~~ Tiger department store |
| : | : | : | : |

Search available 

FIG. 13B

| Destination name |
|---|
| Tiger department store |

FIG. 13C

| Travel history ID | Date | Position | Destination name |
|---|---|---|---|
| : | : | : | : |
| 006 | 2006/6/24/(Sat.)/12:01 | E135.20.11 N35.53.20 | Tiger department store |
| 008 | 2006/6/25/(Sun.)/13:20 | E135.20.17 N35.53.23 | ~~Hanamachi 3-1, Tanabe city~~ Tiger department store |

FIG. 23

| Travel history ID | Date | Position | Destination name | Nearby facility | Nearby facility |
|---|---|---|---|---|---|
| .. | .. | .. | .. | .. | .. |
| 021 | 2006/7/2/(Sun.)/13:25 | E135.20.17 N35.53.23 | Hanamachi 8-1 | Hawks department store | Yotsubishi bank |
| .. | .. | .. | .. | .. | .. |

FIG. 25

| Travel history ID | Date | Position | Destination name | Nearby facility | Nearby facility |
|---|---|---|---|---|---|
| .. | .. | .. | .. | .. | .. |
| 021 | 2006/7/2/(Sun.) /13:25 | E135. 20. 17 N35. 53. 23 | ~~Hanamachi 8-1~~ Hawks department store | ~~Hawks department store~~ | Yotsubishi bank |
| .. | .. | .. | .. | .. | .. |
| 032 | 2006/7/16/(Sun.) /12:11 | E135. 20. 10 N35. 53. 18 | Hawks department store | .. | .. |
| .. | .. | .. | .. | .. | .. |
| .. | .. | .. | .. | .. | .. |

FIG. 28

| Travel history ID | Date | Position | Destination name | Nearby facility | Nearby facility |
|---|---|---|---|---|---|
| .. | .. | .. | .. | .. | .. |
| 021 | 2006/7/2/(Sun.) /13:25 | E135.20.17 N35.53.23 | ~~Hanamachi 8-1~~ Hawks department store | .. | ~~Yotsubishi bank~~ |
| .. | .. | .. | .. | .. | .. |
| 032 | 2006/7/16/(Sun.) /12:11 | E135.20.10 N35.53.18 | Hawks department store | .. | .. |
| .. | .. | .. | .. | .. | .. |
| 038 | 2006/7/17/(Mon.) /9:15 | E135.20.10 N35.52.18 | Yotsubishi bank | .. | .. |
| .. | .. | .. | .. | .. | .. |

FIG. 31

| Date | East longitude | North latitude | |
|---|---|---|---|
| 11:40, June 24th, 2006 | 135 degrees 13 minutes 10 seconds | 35 degrees 44 minutes 15 seconds | ⎫ Latitude and longitude information of N100 (House) |
| 11:40, June 24th, 2006 | 135 degrees 13 minutes 34 seconds | 35 degrees 44 minutes 25 seconds | |
| 11:41, June 24th, 2006 | 135 degrees 13 minutes 34 seconds | 35 degrees 44 minutes 41 seconds | |
| 11:41, June 24th, 2006 | 135 degrees 13 minutes 34 seconds | 35 degrees 43 minutes 01 seconds | |
| 11:41, June 24th, 2006 | 135 degrees 13 minutes 34 seconds | 35 degrees 43 minutes 08 seconds | |
| 11:42, June 24th, 2006 | 135 degrees 13 minutes 34 seconds | 35 degrees 43 minutes 14 seconds | ⎫ Latitude and longitude information of C21 (Green-four intersection) |
| : | : | : | |
| : | : | : | |
| 12:02, June 24th, 2006 | 135 degrees 20 minutes 11 seconds | 35 degrees 53 minutes 20 seconds | ⎫ Latitude and longitude information of N123, Tiger department store |

FIG. 33

| History ID | Date | Starting point | Route | | | | | Destination |
|---|---|---|---|---|---|---|---|---|
| 001 | June 24th (Sat.) 2006 | N100 (House) | C21 (Midori 4) | C22 (Midori 3) | C23 (Midori 2) | C24 (Midori 1) | ... | N123 Tiger department store |
| | | 11:04 | 11:10 | 11:20 | 11:40 | 11:50 | | 12:01 |
| : | : | : | : | : | : | : | : | : |
| 005 | June 25th (Sun.) 2006 | N100 (House) | C21 (Midori 4) | C22 (Midori 3) | C23 (Midori 2) | C24 (Midori 1) | ... | N125 Hanamachi 3-1 |
| | | 12:10 | 12:20 | 12:30 | 12:44 | 12:59 | | 13:20 |
| : | : | : | : | : | : | : | : | : |
| 007 | July 1th (Sat.) 2006 | N100 (House) | C21 (Midori 4) | C22 (Midori 3) | C23 (Midori 2) | C27 (Easy 5) | ... | N131 Sanzeria |
| | | 12:13 | 12:24 | 12:33 | 12:40 | ... | | 13:01 |
| : | : | : | : | : | : | : | : | : |

FIG. 35A

| History ID | Date | Starting point | Route | | | | | Destination |
|---|---|---|---|---|---|---|---|---|
| 001 | June 24th (Sat.) 2006 | N100 (House) 11:04 | C21 (Midori 4) 11:10 | C22 (Midori 3) 11:20 | C23 (Midori 2) 11:40 | C24 (Midori 1) 11:50 | ... | N123 Tiger department store 12:01 |
| .. | .. | .. | .. | .. | .. | .. | .. | .. |
| 005 | June 25th (Sun.) 2006 | N100 (House) 12:10 | C21 (Midori 4) 12:20 | C22 (Midori 3) 12:30 | C23 (Midori 2) 12:44 | C24 (Midori 1) 12:59 | ... | N125 Hanamachi 3-1 13:20 |
| .. | .. | .. | .. | .. | .. | .. | .. | .. |
| 007 | July 1th (Sat.) 2005 | N100 (House) 12:13 | C21 (Midori 4) 12:24 | C22 (Midori 3) 12:33 | C23 (Midori 2) 12:40 | C27 (Easy 5) .. | ... | N131 Sanzeria 13:01 |
| .. | .. | .. | .. | .. | .. | .. | .. | .. |

FIG. 35B

| Date | Starting point | Route | | |
|---|---|---|---|---|
| July 15th (Sat.) 2006 | N100 (House) 11:34 | C21 (Midori 4) 11:40 | C22 (Midori 3) 11:48 | |

FIG. 35C

| Destination | Frequency |
|---|---|
| N131 Sanzeria | Six times |
| N123 Tiger department store | Five times |
| N125 Hanamachi 3-1 | Five times |

FIG. 39

| History ID | Date | Starting point | Route | | | | ... | Destination |
|---|---|---|---|---|---|---|---|---|
| 001 | June 24th (Sat.) 2006 | N100 (House) | C21 (Midori 4) | C22 (Midori 3) | C23 (Midori 2) | C24 (Midori 1) | ... | N123 Tiger department store |
| | : | 11:04 | 11:10 | 11:20 | 11:40 | 11:50 | : | 12:01 |
| 005 | June 25th (Sun.) 2006 | N100 (House) | C21 (Midori 4) | C22 (Midori 3) | C23 (Midori 2) | C24 (Midori 1) | ... | ~~N125~~ ~~Hanamachi 3-1~~ N123 Tiger department store |
| | | 12:10 | 12:20 | 12:30 | 12:44 | 12:59 | : | 13:20 |
| : | : | | | | | | | |
| 012 | July 2nd (Mon.) 2005 | N151 (Hanamachi corporation) | C43 (Kyou8) | C44 (Kyou 7) | C45 (Kyo 6) | C46 (Kyou 5) | ... | N140 Exercise |
| | | 20:02 | 20:10 | 20:18 | 20:20 | 20:24 | : | 20:31 |
| : | : | | | | | | | |

FIG. 40A

| History ID | Date | Starting point | Route | | | | | Destination |
|---|---|---|---|---|---|---|---|---|
| 001 | June 24th (Sat.) 2006 | N100 (House) | C21 (Midori 4) | C22 (Midori 3) | C23 (Midori 2) | C24 (Midori 1) | ... | N123 Tiger department store |
| | | 11:04 | 11:10 | 11:20 | 11:40 | 11:50 | ... | 12:01 |
| :  | :  | :  | :  | :  | :  | :  | :  | :  |
| 005 | June 25th (Sun.) 2006 | N100 (House) | C21 (Midori 4) | C22 (Midori 3) | C23 (Midori 2) | C24 (Midori 1) | ... | N123 Tiger department store |
| | | 12:10 | 12:20 | 12:30 | 12:44 | 12:59 | ... | 13:20 |
| :  | :  | :  | :  | :  | :  | :  | :  | :  |
| 007 | July 1th (Sat.) 2005 | N100 (House) | C21 (Midori 4) | C22 (Midori 3) | C23 (Midori 2) | C27 (Easy 5) | ... | N131 Sanzeria |
| | | 12:13 | 12:24 | 12:33 | 12:40 | ... | ... | 13:01 |
| :  | :  | :  | :  | :  | :  | :  | :  | :  |

FIG. 40B

| Date | Starting point | Route | |
|---|---|---|---|
| July 15th (Sat.) 2006 | N100 (House) | C21 (Midori 4) | C22 (Midori 3) |
| | 11:34 | 11:40 | 11:48 |

FIG. 40C

| History ID | Destination | Frequency |
|---|---|---|
| 001 | N131 Sanzeria | Six times |
| 002 | N123 Tiger department store | Ten times |

FIG. 48

| East longitude | North latitude | |
|---|---|---|
| .. | .. | |
| 135. 01. 102 | 35. 01. 102 | |
| 135. 01. 106 | 35. 01. 102 | |
| 135. 01. 112 | 35. 01. 102 | |
| 135. 01. 116 | 35. 01. 105 | Deviation point |
| 135. 01. 116 | 35. 01. 107 | |
| 135. 01. 116 | 35. 01. 110 | |
| .. | .. | |
| .. | .. | |
| 135. 01. 138 | 35. 01. 114 | Arrival point |

On route / Deviation point / Out of route

FIG. 49

| Travel history ID | Position | Deviation point | Destination name |
|---|---|---|---|
| 010 | E135.01.102<br>N35.01.108 | E135.01.116<br>N35.01.105 | Tiger department store |
| 011 | E135.01.138<br>N35.01.114 | E135.01.120<br>N35.01.105 | ... |
| .. | .. | .. | .. |

FIG. 51

| Travel history ID | Position | Deviation point | Destination name |
|---|---|---|---|
| 010 | E135.01.102 N35.01.108 | E135.01.116 N35.01.105 | Tiger department store |
| 011 | E135.01.138 N35.01.114 | E135.01.120 N35.01.105 | Tiger department store |
| .. | .. | .. | .. |

FIG. 55

| East longitude | North latitude | |
|---|---|---|
| 135. 01. 138 | 35. 01. 114 | Starting point |
| 135. 01. 130 | 35. 01. 110 | |
| 135. 01. 125 | 35. 01. 108 | |
| 135. 01. 120 | 35. 01. 106 | |
| 135. 01. 116 | 35. 01. 105 | Deviation point (Returning point) |
| 135. 01. 112 | 35. 01. 102 | |
| 135. 01. 106 | 35. 01. 102 | |
| 135. 01. 102 | 35. 01. 102 | |
| ‥ | ‥ | |

Out of route { (rows 1–4)
Deviation point (Returning point) ← (row 5)
On route { (rows 6–8)

TRAVEL HISTORY EDITING DEVICE

TECHNICAL FIELD

The present invention relates to devices to detect names of points of arrival in accordance with a users' travel history by editing a detected destination based on accumulated travel histories. More particularly, the present invention is applicable to a traveling object terminal device including a car navigation system.

BACKGROUND ART

There have been systems automatically accumulating histories of detected points of arrival of users (See Patent Reference 1). The systems were devised because registering an arrival point every time through a user operation could be troublesome for the user. As described in the above conventional technique, the systems can solve such a trouble by automatically registering histories of points of arrival. Further, registration of a history of an arrival point allows the user to search for the history later, and to conduct a route search by setting the history as a destination. In addition, the conventional technique registers a destination by automatically extracting the name of a facility out of an arrival point
[Patent Reference 1] Japanese Unexamined Patent Application Publication No. 2001-50760

DISCLOSURE OF INVENTION

Problems that Invention is to Solve

In the conventional systems, a facility corresponding to an arrival point is not always registered on a map of a car navigation system. Thus, the system possibly fails to correctly register a facility name and even the name of an arrival point. In such a case, a user cannot conduct a search for a matching history to the arrival point since the name of the facility is not registered under the correct name.

The purpose of the present invention is to offer a travel history editing device which can edit histories of points of arrival in familiar names to a user, and bring together the names under one name.

Means to Solve the Problems

In order to solve the above problems, a travel history editing device in the present invention edits name information of position information to be accumulated as a history regarding a travel route of a vehicle, and includes: a position detecting unit detecting position information regarding the vehicle; a map information accumulation unit for accumulating pre-registered position information and name information regarding the position information; an arrival point name providing unit reading out the name information regarding an arrival point of the vehicle from the map information accumulation unit, using the position information, of the vehicle, detected by the position detecting unit, and providing the name information for the arrival point; an arrival point history accumulation unit for accumulating the position information and the name information regarding the arrival point; and a name editing unit editing the name information provided by the arrival point name providing unit by rewriting the name information as different name information accumulated in the arrival point history accumulation unit in accordance with a pre-detected rule.

It is noted that the present invention can be implemented as: a method for realizing the processing units to structure the device as steps; a program to cause a computer to execute those steps; a computer-readable storing medium which stores the program, such as a CD-ROM; and information data and a signal indicating the program, as well as a device. Such a program, information, data, and a signal may be distributed via a communication network, such as the Internet.

Effects of Invention

In the present invention, since second kind name information accumulated in an arrival point history accumulating unit is edited as first kind name information, as described above, an effect is observed in that name information of location information accumulated in the arrival point history accumulating unit can be brought together under the first kind name information which is easy for a user to understand.

BRIEF DESCRIPTION OF DRAWINGS

FIG. 3 exemplifies a content of position information detected by a position information detecting unit.

FIG. 5 is a diagram showing travel histories of points of arrival accumulated into a travel history accumulation unit.

FIG. 7A exemplifies travel histories subject to a search.

FIG. 7B exemplifies how the user enters a search key of a destination name.

FIG. 7C exemplifies a search result when the travel histories shown in FIG. 7A are searched, using the search key shown in FIG. 7B.

FIG. 9A exemplifies travel histories subject to a search including destination names described in other than facility names.

FIG. 9B exemplifies how the user enters a search of a destination name.

FIG. 9C exemplifies a search result when the travel histories shown in FIG. 9A are searched, using the search key shown in FIG. 9B.

FIG. 12 exemplifies a history with the destination name edited by a history editing unit in accordance with a judgment result detected by a history editing detecting unit.

FIG. 13A exemplifies a travel history subject to a search with the destination name edited.

FIG. 13B exemplifies how the user enters a search key of the destination name.

FIG. 13C exemplifies a search result when travel histories shown in FIG. 13A are searched out, using the search key shown in FIG. 13B.

FIG. 23 shows the travel histories accumulated in the travel history accumulation unit shown in FIG. 1.

FIG. 25 describes how the unknown point is edited based on an arrival history to a facility shown in FIG. 24.

FIG. 28 shows a result of editing of a travel history in accordance with the classification shown in FIG. 27.

FIG. 31 shows latitude and longitude information detected by the position information detecting unit.

FIG. 33 shows travel histories accumulated in the travel history accumulation unit shown in FIG. 29.

FIG. 35A exemplifies travel histories subject to a search in the case where the user conducts a search for predicting a destination.

FIG. 35B exemplifies a node sequence, to a current driving point, including a starting point.

FIG. 35C exemplifies a search result when the travel histories shown in FIG. 35A are searched, using the node sequence shown in FIG. 35B as a search key.

FIG. 39 shows an editing technique of the history in the second embodiment based on a degree of coincidence.

FIG. 40A exemplifies travel histories subject to a search for predicting a destination.

FIG. 40B exemplifies a node sequence until a current driving point, including a starting point.

FIG. 40C exemplifies a search result when the travel histories shown in FIG. 40A are searched, using the node sequence shown in FIG. 40B as a search key.

FIG. 48 shows position information detected by the position information detecting unit.

FIG. 49 shows travel histories accumulated in the travel history accumulation unit.

FIG. 51 shows histories edited by the history editing unit and accumulated in the history accumulation unit.

FIG. 55 shows latitude and longitude information on a point to which the vehicle leaves the parking lot of the Tiger Department Store and returns to the route (returning point).

NUMERICAL REFERENCES

Figure 1:
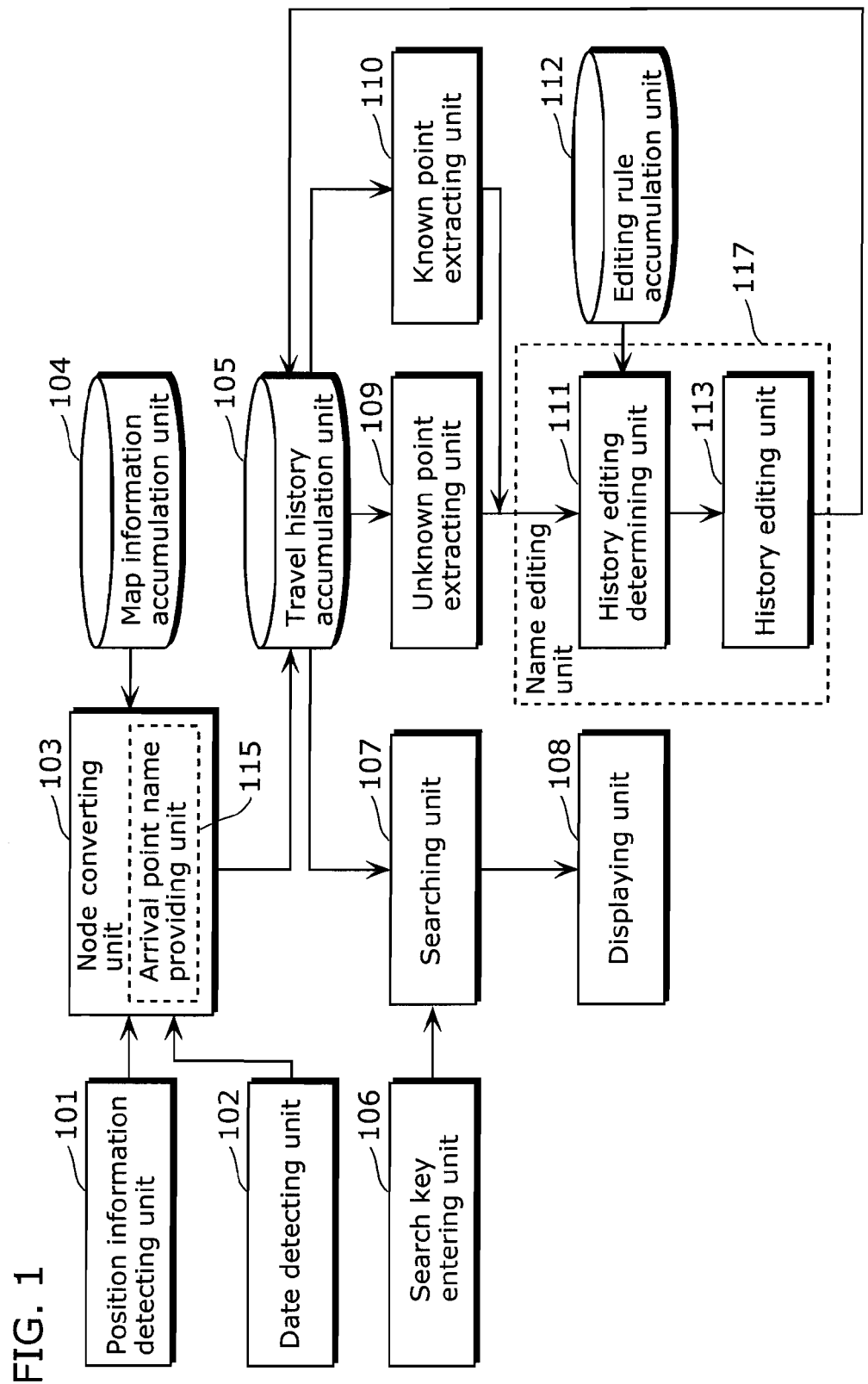
FIG. 1 is a block diagram showing a structure of a travel history editing device in a first embodiment.

101 Position information detecting unit
102 Date detecting unit
103 Node converting unit
104 Map information accumulation unit
105 Travel history accumulation unit
106 Search key entering unit
107 Searching unit
108 Displaying unit
109 Unknown point extracting unit
110 Known point extracting unit
111 History editing detecting unit
112 Editing rule accumulation unit
113 History editing unit
114 Destination predicting unit
115 Arrival point name providing unit
116 Arrival point history accumulation unit
117 Name editing unit
118 Parking lot information accumulation unit
119 Change of arrival point intention estimating unit
121 Deviation point detecting unit
420 Car navigation device
421 Speaker
422 Entering unit
423 Displaying unit 424 External memory
425 GPS (Global Positioning System)
426 ROM (Read-only Memory)
427 CPU (Central Processing Unit)
428 RAM (Random Access Memory)
429 Communicating unit
430 Bus Best Mode For Carrying Out For The Invention A travel history editing device in the present invention shall be described with reference to the drawings, hereinafter.

(First Embodiment)

FIG. 1 is a block diagram showing a structure of a travel history editing device in a first embodiment. Hereinafter, each of structural elements shall be described, and then an operational flow of the present invention shall be described.

The travel history editing device in the first embodiment: extracts an arrival point which is not represented in the name of a facility out of points of arrival accumulated in a travel history; and edits the name of the extracted arrival point as a name of a facility which a user has previously visited. The travel history editing device includes a position information detecting unit 101, a date detecting unit 102, a node converting unit 103, a map information accumulation unit 104, a travel history accumulation unit 105, a search key entering unit 106, a searching unit 107, a displaying unit 108, an unknown point extracting unit 109, a known point extracting unit 110, a history editing detecting unit 111, an editing rule accumulation unit 112, and a history editing unit 113. The node converting unit 103 includes therein an arrival point name providing unit 115. Further, the history editing detecting unit 111 and the history editing unit 113 structure a name editing unit 117.

The position information detecting unit 101 exemplifies a position detecting unit detecting position information (latitude and longitude, for example) indicating a position of a user (vehicle). In the embodiment, the position information detecting unit 101 can be implemented as the GPS (Global Positioning System) detecting a current position of the user in the case where the travel history editing device of the present invention is installed in a car navigation device, for example. The position information detecting unit 101 detects latitude and longitude information indicating a position of the user at a pre-detected interval, such as an approximately one-second interval. In the present embodiment, the position information detecting unit 101, structured with the GPS, detects, with the pre-detected interval, latitude and longitude information as position information along with travel of the user.

Figure 2:
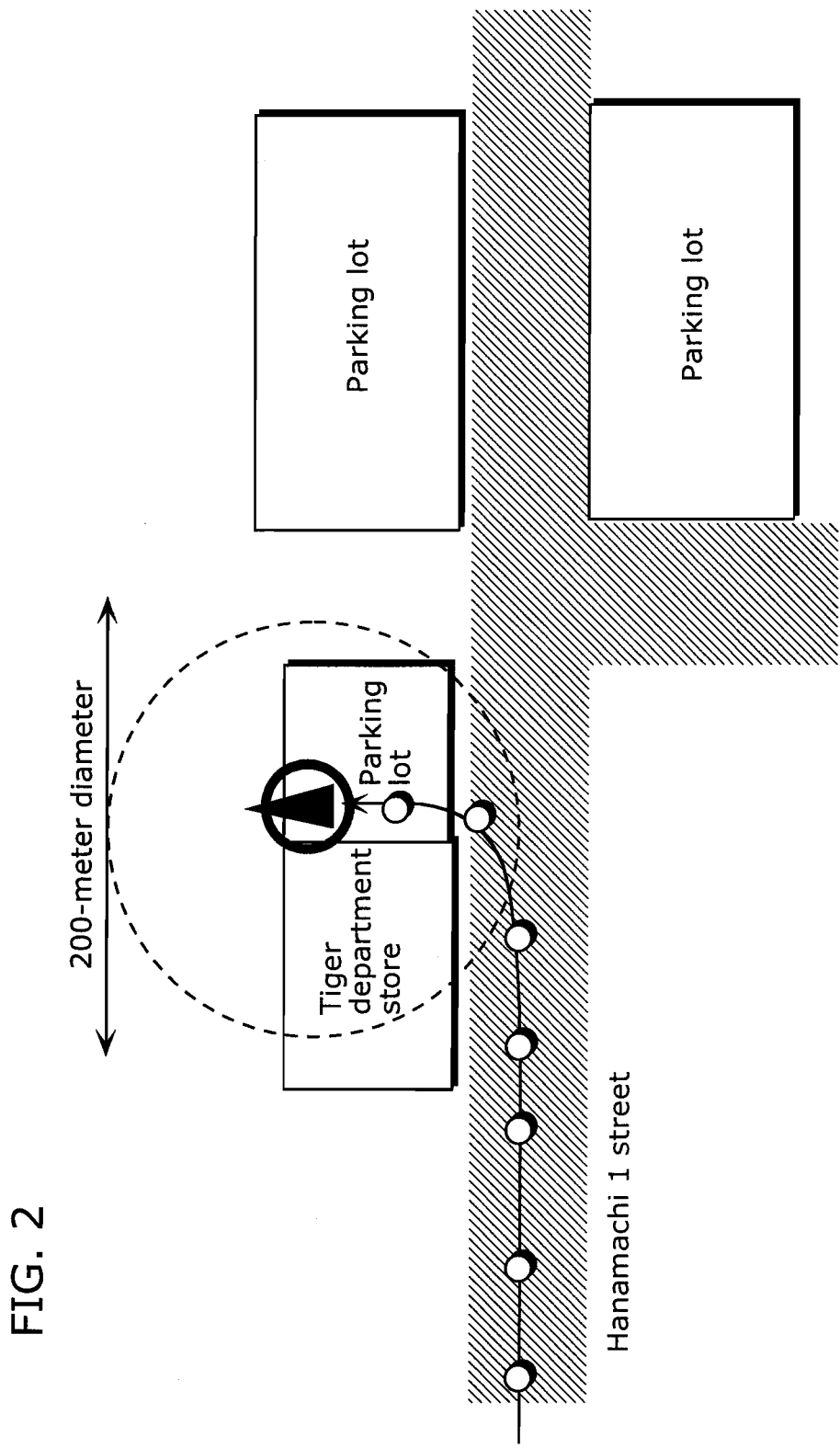
FIG. 2 is a diagram showing travel of a user and position information detected in accordance with the travel.

FIG. 2 is a diagram showing travel of the user and the position information detected in accordance with the travel. White circles in FIG. 2 indicate positions which the position information detected in a pre-detected interval shows as the user travels "Hanamachi 1 street" eastbound (to the right). FIG. 3 exemplifies a content of the position information detected by the position information detecting unit 101. The position of the user is detected as latitude and longitude information indicated in east longitude and north latitude. In addition, the date detecting unit 102, a unit to detectedate, may detect a date as well as latitude and longitude information obtained from a satellite via the GPS, for example. In FIG. 3, for example, at the date of "eleven forty, Jun. 24, 2006", a position "at 135 degrees 13 minutes 10 seconds east longitude, and 35 degrees, 44 minutes, 15 seconds north latitude" is detected.

The node converting unit 103 is a unit to convert the position information detected by the position information detecting unit 101, by referring to map information accumulated in the map information accumulation unit 104. Then, an arrival point is accumulated in the travel history accumulation unit 105, for example.

Figure 4:
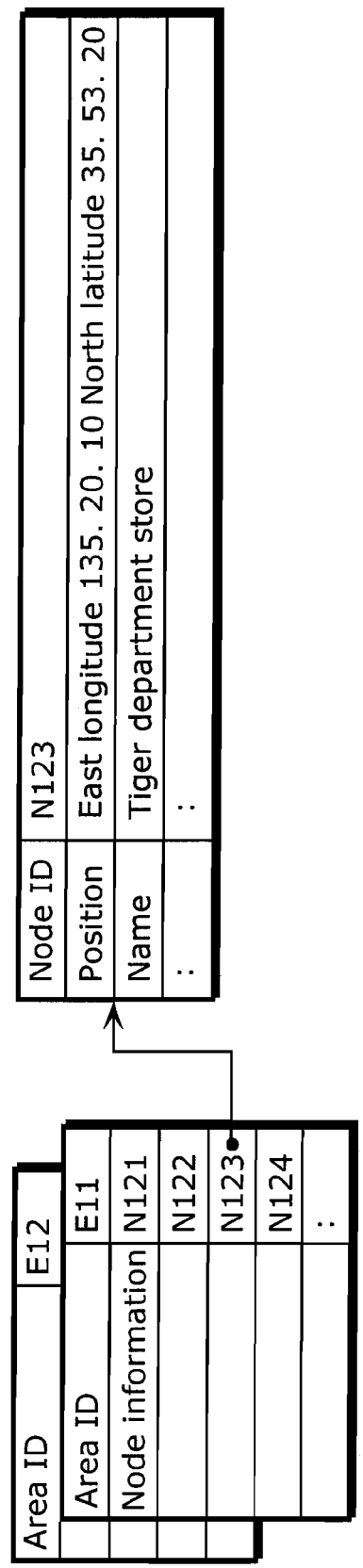
FIG. 4 exemplifies a set of map information.

In the embodiment, the map information accumulation unit 104 is a unit to accumulate map information. In general, the map information is divided into pre-detected ranges. The map information accumulation unit 104 accumulates information on facilities and routes in each of the areas. FIG. 4 exemplifies a set of map information. For example, the area ID "E11" includes information on a facility indicated on a node basis. The node ID "N123" is, for example, information on the "Tiger Department Store" positioned at "135 degrees 20 minutes 10 seconds east longitude, and 35 degrees, 53 minutes, 20 seconds north latitude", and is accumulated under the name of the "Tiger Department Store".

Now, as shown in FIG. 2, the user is assumed to arrive at a parking lot of the Tiger Department Store. Whether or not the user has arrived at the department store can be judged by shut down of the engine. The position information detecting unit 101 detects the fact that the engine of the vehicle is shut down at the position of "135 degrees 20 minutes 11 seconds east longitude, and 35 degrees, 53 minutes, 20 seconds north latitude", as shown in FIG. 3. Here, the node converting unit 103 converts the arrival point into the facility (node) with reference to the map information. For example, a facility to be searched out and accumulated as a point of destination is assumed to be positioned within a pre-detected range based on the detected position (within 200 meters in diameter with the detected position centered). In the case of FIG. 2, position of the Tiger Department Store "135 degrees 20 minutes 10 seconds east longitude, and 35 degrees, 53 minutes, 20 seconds north latitude" is included in the range with respect to the detected position "35 degrees, 53 minutes, 20 seconds north latitude and 135 degrees 20 minutes 11 seconds east longitude." Thus, the arrival point is accumulated as the Tiger Department Store. It is noted that a traveling distance for one second is as far as approximately 25 meters. Hence, the Tiger Department Store is assumed to be included within a diameter of 200 meters with the arrival point centered.

FIG. 5 is a diagram showing the travel histories of the points of arrival accumulated in the travel history accumulation unit 105. The travel history accumulation unit 105 intends to accumulate histories on an every arrival basis, for example. Each of the histories is shown in an associated row (record). Then, each of rows includes items indicated in a column (field). For example, the row includes "history ID" used as an ID of a history, "date", "position", and "destination name" as a name of the arrival point converted by the converting technique described above. For example, a date "8:10, June 23rd (Fri.), 2006", a position "135 degrees 40 minutes 11 seconds east longitude, and 35 degrees, 10 minutes, 20 seconds north latitude", and a destination name "Hanamachi corporation" are accumulated in a history ID "001".

The searching unit 107, searching for the travel histories accumulated in the travel history accumulation unit 105, conducts a search based on a keyword entered into the search key entering unit 106.

A travel history showing previous driving of a user reflects a movement tendency of the user. The travel history, important information used in various applications, is reflected in a route search in accordance with the movement tendency of the user, and is used for filtering traffic information to be provided. In addition, the user also possibly searches for a previously visited position later, confirms the visited date, and searches for the previously visited position in order to set the position as a destination. Hereinafter, the above shall be described, using the drawings.

Figure 6:
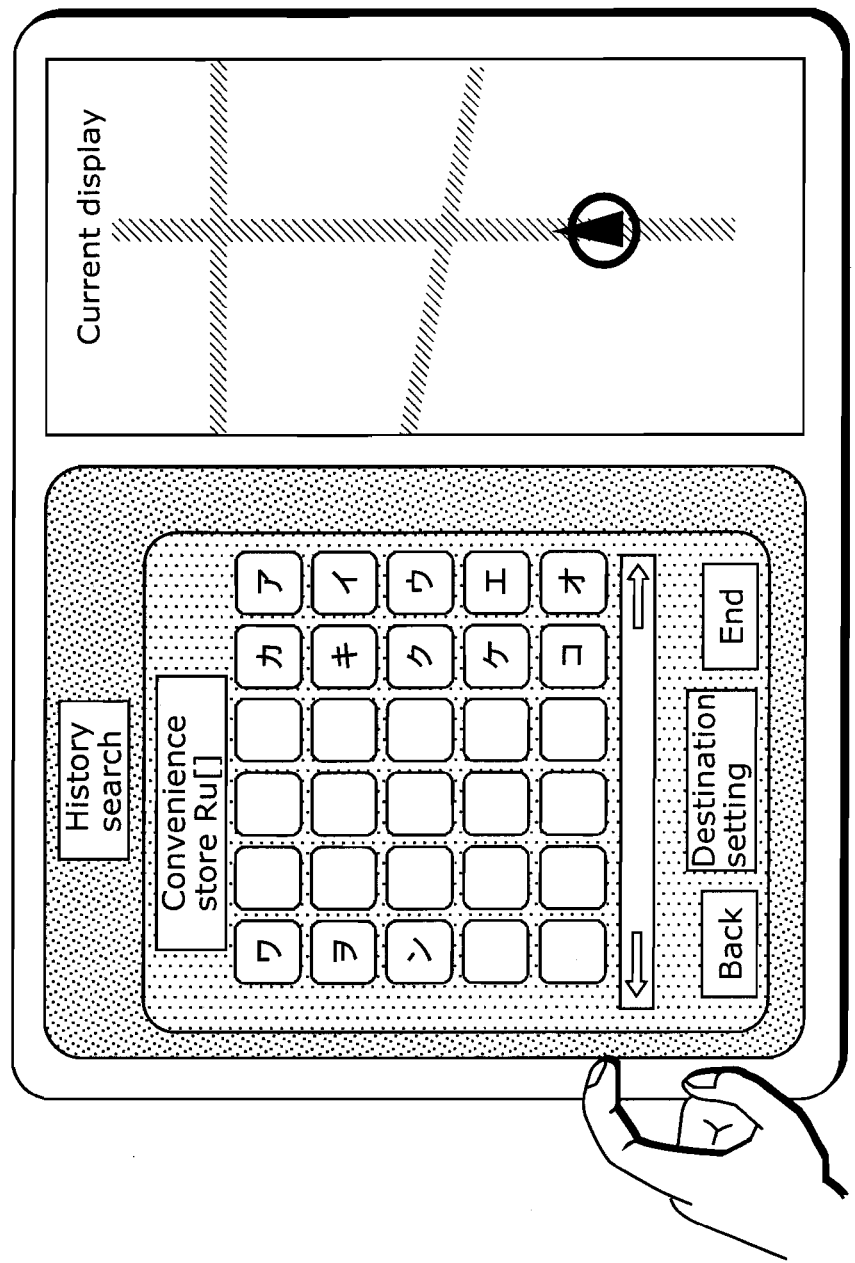
FIG. 6 describes how a search key is entered.

FIG. 6 describes how a search keyword is entered. The search key entering unit 106 intends to include a touch panel of a car navigation system, for example. A monitor of the car navigation system shown in FIG. 6 displays a 50-character kana syllabary. A travel history is searched by entering a keyword for a search, using the touch panel. The user often conducts a search by entering a name of a previously visited position, for example. In FIG. 6, the user enters the "convenience store Ruson" as a keyword. Based on the entered keyword as mentioned above, the searching unit 107 searches for a travel history.

FIGS. 7 describe a search out of histories. FIG. 7A exemplifies travel histories subject to a search. FIG. 7B exemplifies how the user enters a search key of a destination name. FIG. 7C exemplifies a search result when the travel histories shown in FIG. 7A are searched, using the search key shown in FIG. 7B. There has been a method to extract corresponding data, based on a search keyword, from a data base. For example, a record (referring to each histories) having information of a field (indicating an item such as a destination in the embodiment) corresponding to a search key is intended to be searched out. Here, a history corresponding to a destination name the "convenience store Ruson" is to be searched. As corresponding histories, travel history IDS "005" and "013" are searched out. Such a search of a history based on a search keyword allows the user to obtain information including when in a previous time the user visited the destination, and how often the user has visited the destination. Further, the user can again set the position as a destination.

Some points of arrival, however, do not always have appropriately assigned names. In such a case, the user may fail to search out the history. The following describes with a specific example.

Figure 8:
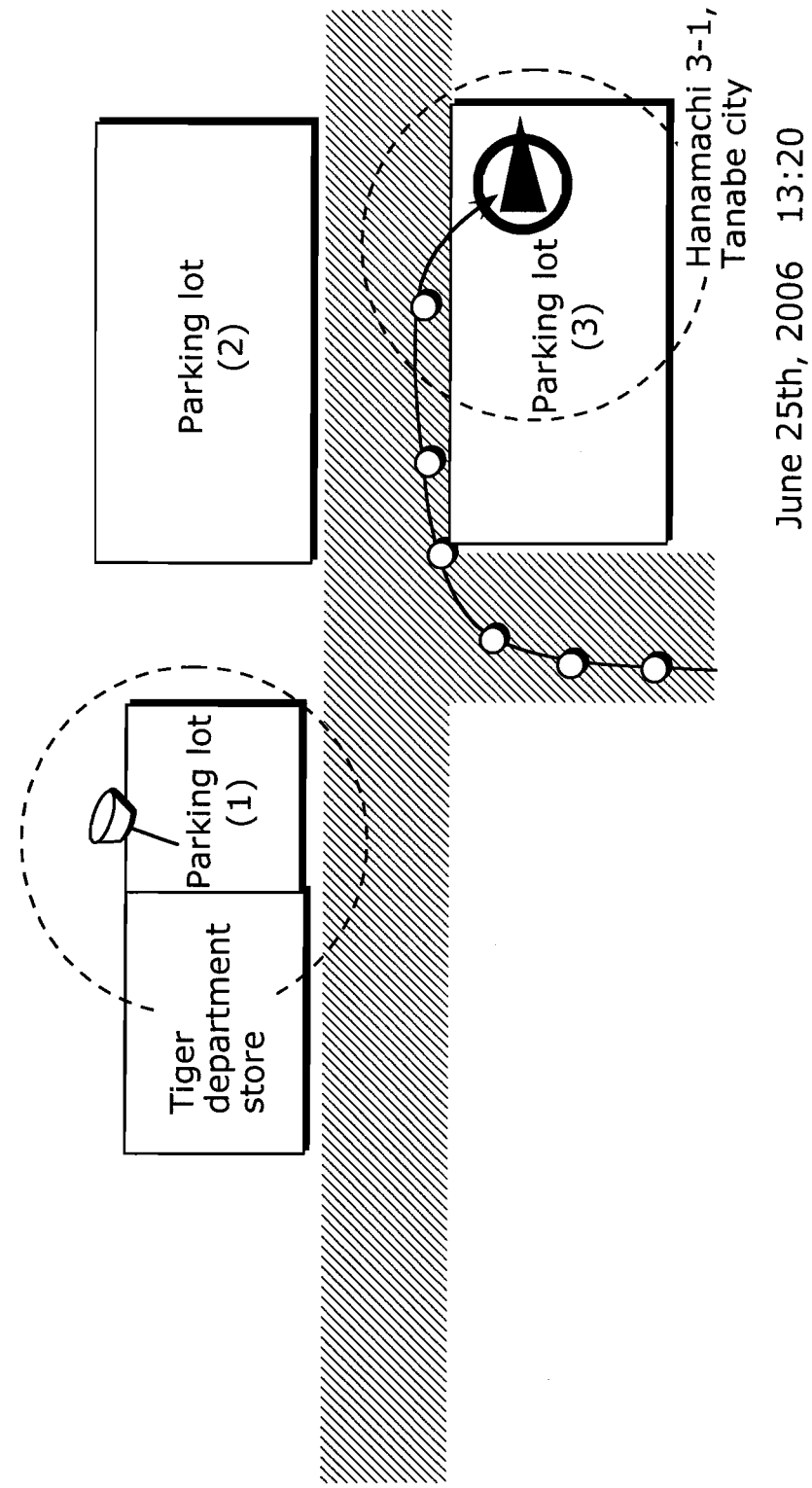
FIG. 8 exemplifies a history of an arrival point.

FIG. 8 exemplifies a history of an arrival point, showing that the user arrived at a parking lot of the Tiger Department Store at 13:20, Jun. 25, 2006 (It is noted that the Tiger Department Store has a plurality of parking lots. Here, the parking lot is referred to as a parking lot (3) for distinction). Using the above-mentioned technique, the travel history accumulation unit 105 accumulates a travel history by judging whether or not a facility exists within a pre-detected range (a 200-meter diameter in the embodiment) with respect to the arrival point. In the case of FIG. 8, however, the "Tiger Department Store" is not included in the pre-detected range, and thus, a destination name cannot be assigned. It is noted that a history accumulated as the Tiger Department Store on Jun. 24, 2006 (parking in a parking lot (1)) is shown on the top of FIG. 8 so that the current travel is distinguished.

In the case where the user does not assign a name of the position registered with the specification of the user, a conventional device has, for example, registered a position with no name assigned (unknown), or tentatively registered an unknown position automatically with an ID including, for example: latitude and longitude, and the date of the arrival point; and the address of the position so that the position can be identified. In addition, tentatively assigned names, including the unknown names, may or may not be recognized by the user. For example, even though the tentative names may be recognized as unknown names by the user, the tentative names may have IDS assigned for identification in the car navigation system. The tentative names, including unknown names, are referred to as "names" in the embodiment. In the embodiment, the address of a position ("3-1, Hana-machi, Tanabe city", for example) is intended to be assigned as the destination name in order to facilitate the description. It is noted that the address is assigned as the destination name in order for classification. Thus, the destination name may be registered as an unknown name.

In the travel histories shown in FIG. 5, a date and time "June 25th (Sun), 2006", a position "135 degrees, 20 minutes, 23 seconds east longitude, and 35 degrees, 53 minutes, 23 seconds north latitude", and the destination name "3-1, Hana-machi, Tanabe city" are accumulated under a travel history ID "008".

Recently, appearance of major residential and business complexes has been introducing a lot of stores having a large parking lot and facilities having a plurality of parking lots. In such a case, the position at which the user stops is not always judged as the same position, depending on the position at which the user parks his or her vehicle. Thus, the arrival point and the registered position end up being registered as different positions. In addition, even though the user parks his or her vehicle at a similar position, the similar position can be judged as a different position due to an error of the GPS. Further, there is a case where the user registers a position himself or herself since the position is a new shop which has not been reflected in some map information yet, or the position is not included in the map information. Similarly, such a position can be judged to be accumulated as another position depending on a place to park. In addition, in the case where a designated parking lot in front of the store is full, for example, the user often parks his or her vehicle at a somewhat distantly-positioned pay parking lot instead of parking on the street in front of the store in an area in which street parking is prohibited. In such a case, as well, the user ends up parking his or her vehicle at a position away from the position previously accumulated automatically (the designated parking lot in front of the store). Hence, the parking lot in front of the store and the distantly-positioned pay parking lot are accumulated as different histories. In such a case, even though the user tries to conduct a search of the history later, the user cannot search out the history since the history has been separately accumulated as different positions.

FIGS. 9 describe how a position shall be searched out. FIG. 9A exemplifies travel histories subject to a search. FIG. 9B exemplifies how the user enters a search key of a destination name. FIG. 9C exemplifies a search result when the travel histories shown in FIG. 9A are searched, using the search key shown in FIG. 9B. As shown in FIG. 9B, now the user tries to search out a history regarding a previous visit to the "Tiger Department Store", by entering the search keyword the "Tiger Department Store" on the search key entering unit 106. In FIG. 9A, a history of a travel to the Tiger Department Store at a date and time of "12:01, June 24th (Sat.), 2006" is searched out in an travel history ID "006". Meanwhile, the user actually visited the Tiger Department Store on June 25th (Sun.), 2006 as shown in FIG. 8. The history, however, is accumulated as a name "3-1 Hana-machi, Tanebe city" as shown in a travel history ID "008" in FIG. 9A. Thus, the user cannot search out the Tiger Department Store.

Hence, in the embodiment, a name, of an arrival point, assigned by the node converting unit 103 is once edited in accordance with a history regarding a previous arrival of the user.

Out of the points of arrival accumulated in the histories of travel history accumulation unit 105, the unknown point extracting unit 109 extracts a position to which no destination name is assigned since no relevant facilities exist, and a position to which the address is tentatively assigned to (referred to as an unknown point). The known point extracting unit 110 extracts, out of the points of arrival accumulated in the histories, a position having a relevant facility within a pre-detected range, and an assigned destination name (known point). In the travel histories shown in FIG. 5, for example, an unknown point is accumulated as "3-1, Hana-machi, Tanabe city" in a travel history ID "008". The unknown point is intended to be edited based on the known point.

The history editing detecting unit 111 judges whether or not the histories can be edited based on the extracted known point and unknown point. For example, the history editing detecting unit 111 makes a judgment with reference to an editing rule accumulated in the history editing rule accumulation unit 112. Then, the history editing unit 113 edits the histories. Hereinafter, editing of the histories shall be described, using the drawings.

Figure 10:
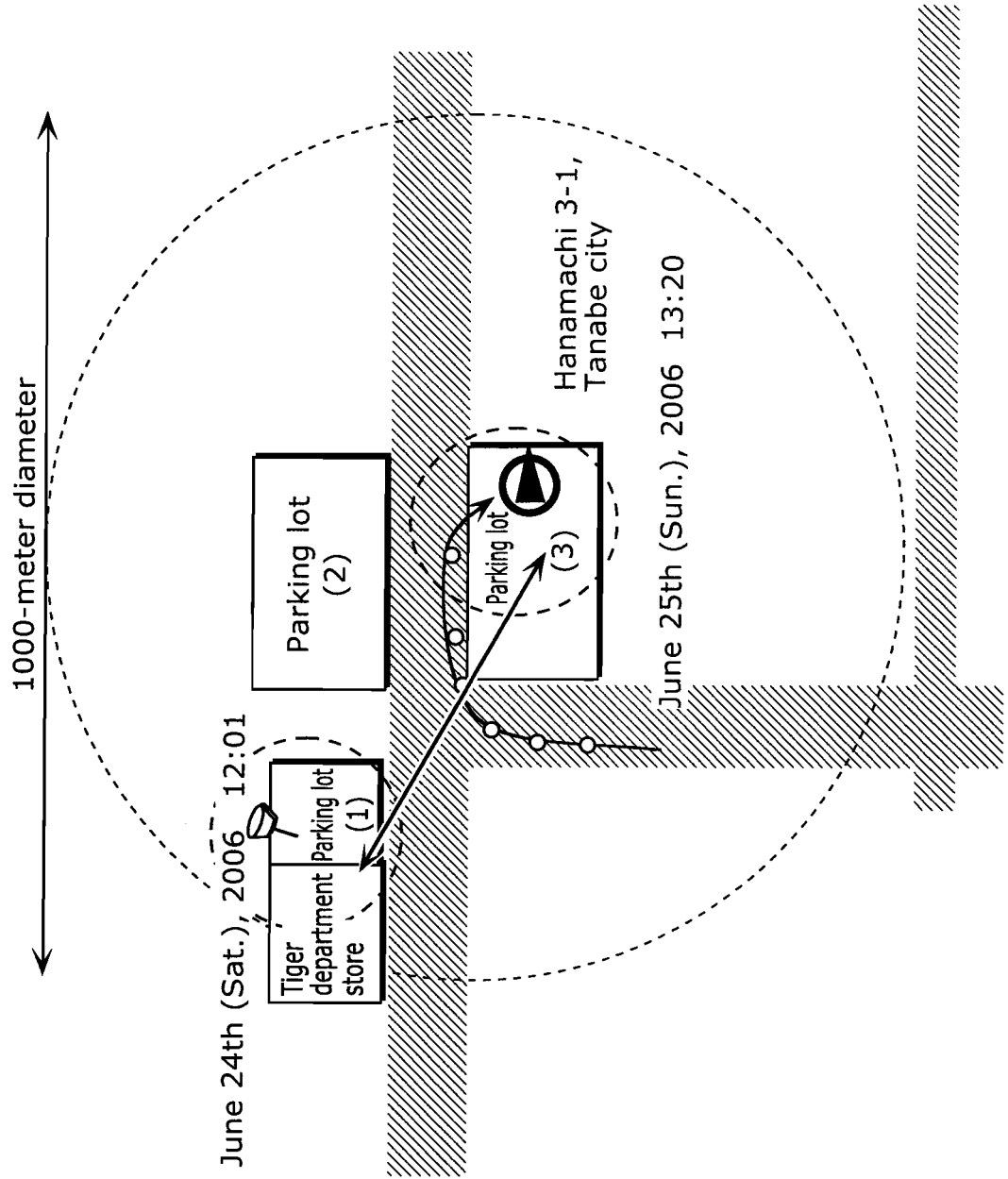
FIG. 10 exemplifies an editing technique of history editing carried out according to an editing rule accumulated in an editing rule accumulation unit.

FIG. 10 exemplifies an editing technique of history editing carried out according to the editing rule accumulated in the history editing rule accumulation unit 112. As shown in FIG. 10, the history of the position with no name assigned (a position with the address tentatively assigned in the embodiment) "3-1 Hana-machi, Tanabe city" is extracted by the unknown point extracting unit 109. Then, the history editing detecting unit 111 judges whether or not the relevant facility exists, out of known points accumulated in the histories, within a second pre-detected range with respect to the unknown point; that is the range, within a 1000-meter diameter, in which the user can travel on foot from the unknown point, for example. In the example of FIG. 10, a history of a previous arrival at the Tiger Department Store corresponds to the relevant history. Next, the history editing detecting unit 111 judges whether or not the histories can be edited with reference to the editing rule accumulated in the history editing rule accumulation unit 112. Exemplifying a editing rule accumulation unit accumulating an editing rule defining that second kind name information is edited as the facility name information, using facility name information satisfying a pre-detected condition among the points of arrival with the second kind name information assigned to out of the facilities obtained as the result of the search, the history editing rule accumulation unit 112 accumulates the following accumulation rule.

In general, when the user visits a destination, the visit is often made in similar situations such as time slots. Movements of a person are abided by regularity based on time slots. For example, the person goes to work on weekday mornings and visits a cafeteria at noon on weekdays. Further, the person goes to a department store on weekends instead of weekdays. Thus, movements of a typical user often depend on days such as weekdays and weekends. Thus, even though points of arrival are different, and the positions may be different out of the information on the points of arrival alone, the positions are possibly the same destination in the case where a similarity is observed between the situations as described above despite the fact that the points of arrival is somewhat away from each other. Hence, in the embodiment, the histories shall be edited based on the similarities in accordance with situations, as well as whether or not the destination merely belongs to a pre-detected range.

Figure 11:
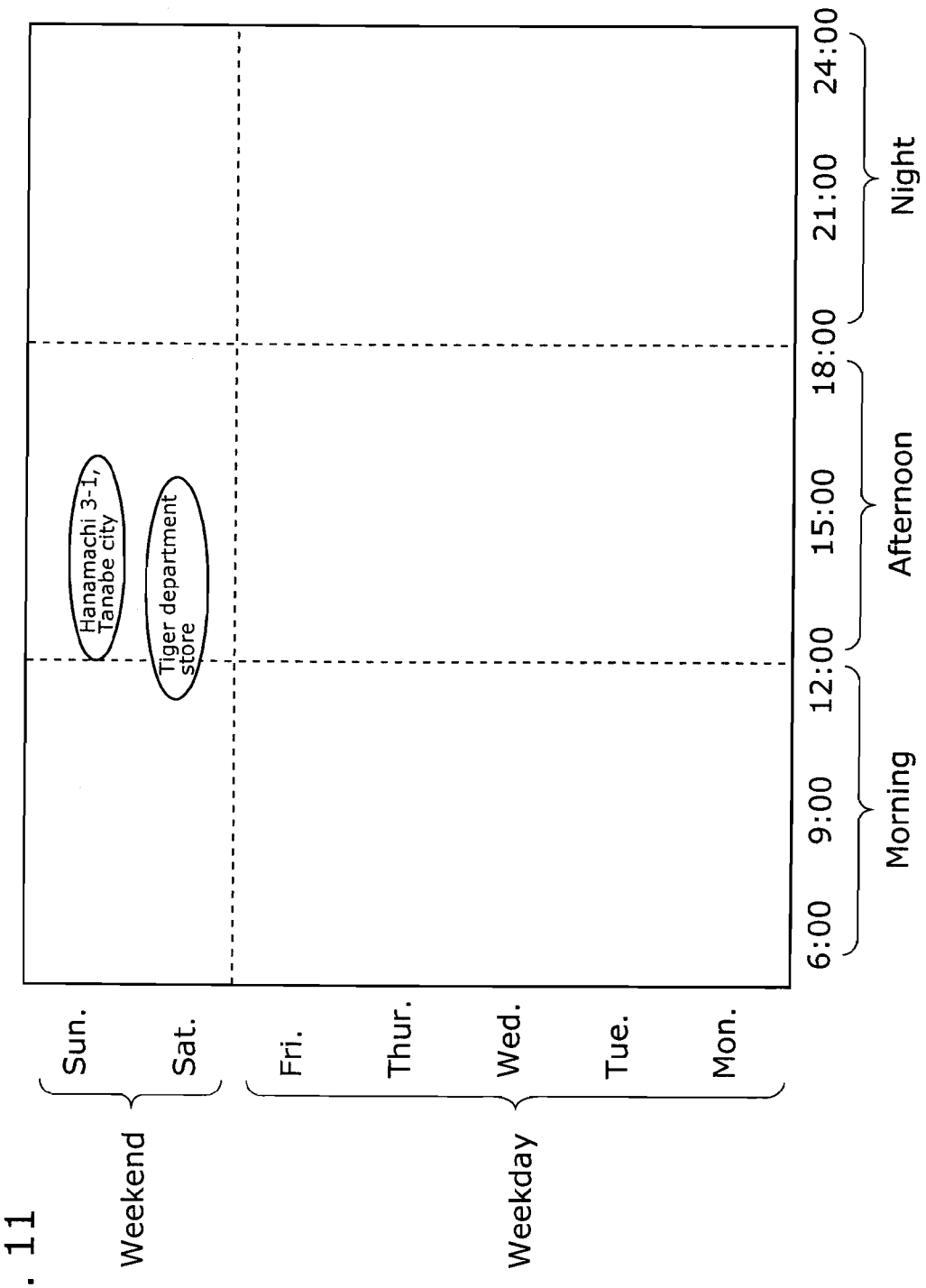
FIG. 11 exemplifies an editing rule accumulated in the editing rule accumulation unit.

FIG. 11 exemplifies an editing rule accumulated in the editing rule accumulation unit 112. In the embodiment, similarities are judged based on time and day information, for example. A rule horizontal axis and the vertical axis shown in FIG. 11 represent a time axis and a day axis, respectively. The time axis is divided into three classes; namely, a morning from six hours to twelve hours, afternoon from twelve hours to eighteen hours, and night from eighteen hours to twenty four hours. In addition, the day axis is divided into six classes in total; that is, weekdays from Monday to Friday, and two classes of a weekend including Saturday and Sunday.

Since arrival date and time, of which the user arrived at a destination, named under "3-1 Hana-machi, Tanebe city" is "13:20, June 25th (Sun.), 2006" in FIG. 10. Thus, the arrival date and time belongs to the weekend afternoon class. Meanwhile, arrival date and time to the "Tiger Department Store" positioned within a 1000-diameter is "12:01, June 24th (Sat.), 2006". Thus, the arrival date and time belongs to the weekend afternoon class, likewise. In the case where a known point belongs to the same class to which an extracted unknown point belongs, the history editing detecting unit 111 judges that the unknown point can be edited in the name of the known point. In accordance with a judgment result of the history editing detecting unit 111, the history editing unit 113 edits a name of an arrival point. FIG. 12 exemplifies a history with the destination name edited by the history editing unit 113 in accordance with a judgment result detected by the history editing detecting unit 111. The FIG. 12 shows that the destination name of the travel history ID "008" accumulated in the travel history accumulation unit 105 is edited from the "3-1 Hana-machi, Tanebe city" to the "Tiger Department Store". It is noted that, in FIG. 12, the destination name of the travel history ID "008"; namely, "3-1 Hana-machi, Tanebe city" has been "crossed out" to be edited to the "Tiger Department Store". In fact, the destination name, the "Tiger Department Store", is overwritten onto the name "3-1 Hana-machi, Tanebe city" as data to be accumulated into the travel history accumulation unit 105. It is noted that the previous data "3-1 Hana-machi, Tanebe city" may be completely deleted, or a trace of modification may be recorded.

FIGS. 13 show how a history is searched out of travel histories with the destination named edited as shown in FIG. 12. FIG. 13A exemplifies a travel history subject to a search. FIG. 13B exemplifies how the user enters a search key of a destination name. FIG. 13C exemplifies a search result when travel histories shown in FIG. 13A are searched out, using the search key shown in FIG. 13B. In the travel history shown in FIG. 13A, the travel history ID "008" accumulated as the destination name "3-1 Hana-machi, Tanebe city" is edited as the destination name the "Tiger Department Store". Hence, the user can accurately search out a relevant travel history even with a destination the "Tiger Department Store" as a keyword. Grouping the positions, registered as different destinations because of somewhat different points of arrival, as the same destination by using the technique as described above, the relevant destination can be accurately searched out later when searching out the destination.

Meanwhile, there are some cases where an unknown point and a known point belong to the same class, and judging the unknown point and the known point as the same destination is inappropriate. The following describes the above, using FIG. 14.

Figure 14:
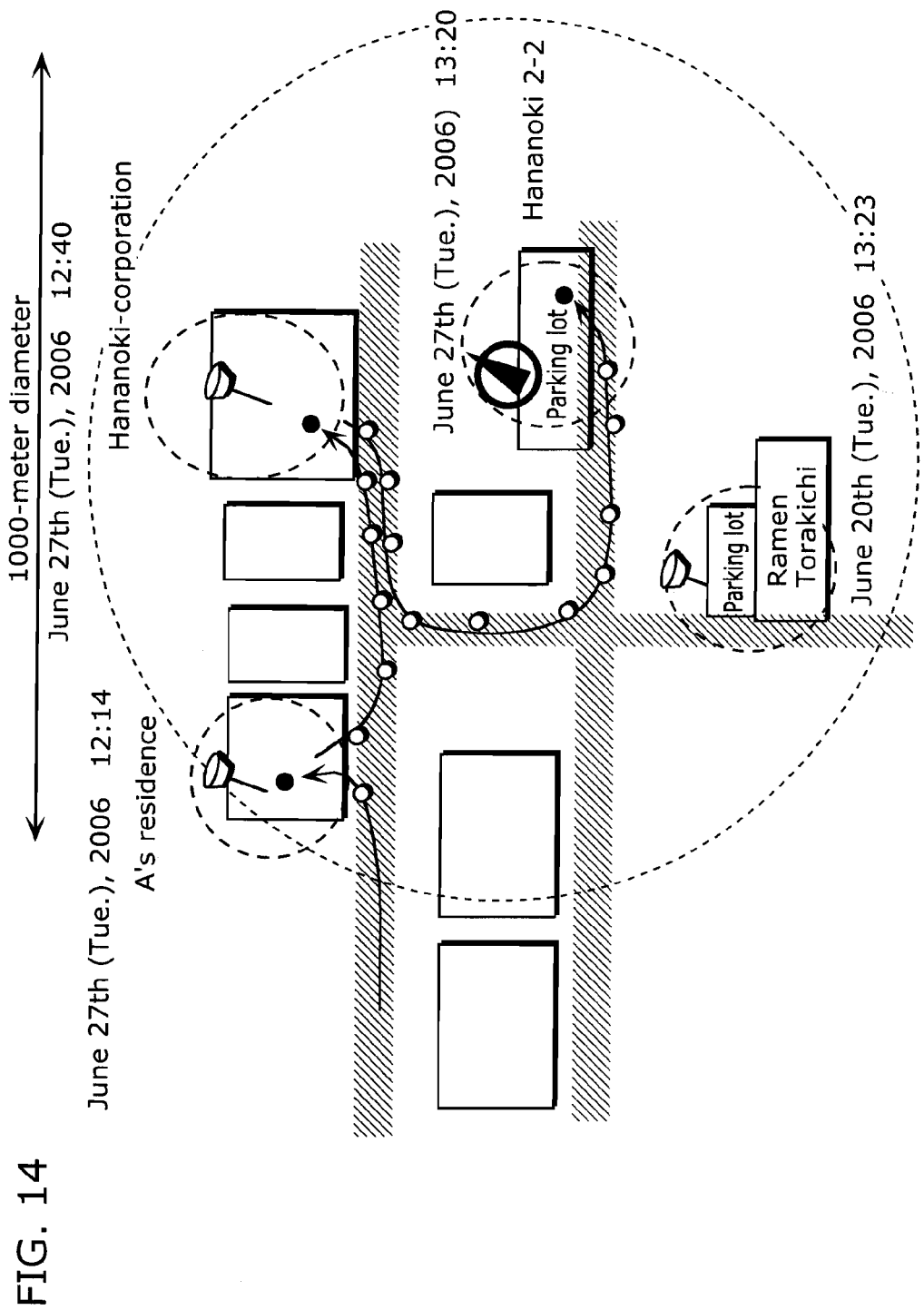
FIG. 14 shows a movements history of a user.

FIG. 14 shows a movements history of a user. The user arrived at a destination name "A's residence" at 12:14, Jun. 27, 2006, and then, arrived at the "Hananoki-corporation" at 12:40. Following the above, the user is assumed to have arrived at a position at 13:30. Since the name to the arrival point is not found in the map information, it is assumed that the name cannot be assigned. For example, in the case where the name is to be provided in the address of the relevant point, "Hananoki 2-2" is a preliminary name. Here, suppose the above-described technique is used, a relevant facility is searched out of histories by searching histories within a 1000-meter diameter with the arrival point "Hananoki 2-2" centered. In addition, whether or not situations including time and days are similar to the searched relevant facility is to be judged. However, a mere reference to the fact whether or not the searched relevant facility is within a pre-detected range or the user arrived in the same time slot and on the same day results in calculating both of "A's residence" and the "Hananoki-corporation". These destinations (known points) are surely close to the arrival point (unknown point), and are to belong to the same class sharing a time slot and a day when the user consecutively travels. Meanwhile, it is often the case that the destinations are not always appropriate enough to be edited as the same destination.

Typical map information has no names of houses. In addition, even names of companies and facilities do not always exist in map information. In such cases, user himself or herself needs to register names of residents. For example, "A's residence" is a self-registered name. Further, the houses are often densely built. Thus, an arrival at a different house often ends in arriving at a position near "A's residence" distance-wise. Moreover, a sales representative often visits the houses one after another. Thus, it is not appropriate that these houses would be edited into a same name just because distance between the houses are short and the sales representative visits the houses in a same time slot even though the houses represent different points of arrival. Hence, even in the case where a user travels one after another; that is, a situation in that: a distance between an unknown point and a known point is within a pre-detected threshold; and time, day, and date of the travel are similar, the unknown point and the known point are to be accumulated as different positions. In other words, "Hananoki 2-2" is not edited as the "Hananoki-corporation" or "A's residence" because "Hananoki 2-2" has the same date "Jun. 27, 2006" as the "Hananoki-corporation" and "A's residence" have. The history editing detecting unit 111 judges travel continuity out of date and time. In the case where the travel continues, the history editing unit 113 avoids naming relevant names under a same name, and assigns different names. It is noted that a consecutive points of arrival positions extracting unit for judging continuity of travel may separately be provided in order to assign different names to points of arrival of which extracted travel is conducted consecutively.

Figure 15:
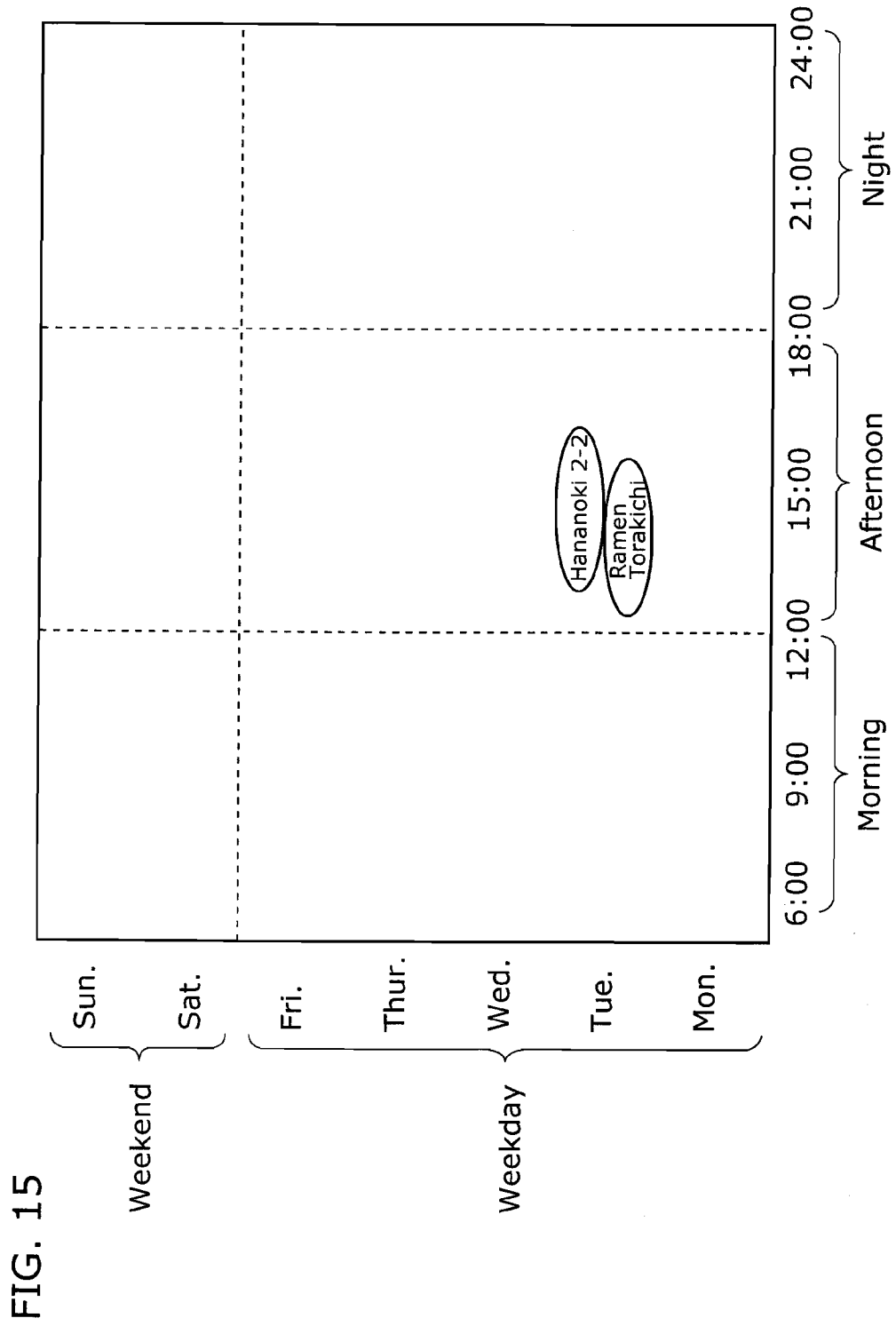
FIG. 15 shows a classification example regarding an arrival point "Hananoki 2-2", and an arrival point on another day the "Ramen Torakichi".

Meanwhile, in FIG. 14, the "Ramen Torakichi" is searched out as a relevant facility within a 1000-meter diameter of the arrival point "Hananoki 2-2". FIG. 15 shows a classification example regarding an arrival point "Hananoki 2-2", and an arrival point on another day the "Ramen Torakichi". As shown in FIG. 15, a previous arrival date at this the "Ramen Torakichi", "13:23, June 20th (Tue.), 2006", belongs to a day-class on a weekday. The previous arrival date belongs to the same day-class on a weekday of an arrival date at "Hananoki 2-2" at "13:20, June 27th (Tue.), 2006". Then, the history editing unit 113 is to edit the arrival point "Hananoki 2-2" as the "Ramen Torakichi", instead of "A's residence".

Typical Map information may include a new store which has not been reflected in the map information. In addition, a store may not have a parking lot. Another store may have a parking lot; however, the user may park his or her vehicle at another distantly-positioned parking lot or at a pay parking lot since the parking lot is full. The user may park his or her vehicle beside the store especially when street parking is possible. In the case where street parking is prohibited, however, the user often parks his or her vehicle at a distantly-positioned parking lot or a pay parking lot since street parking beside the store causes a traffic jam and a trouble to pedestrians. In the above-described case; meanwhile, the user ends in parking his or her vehicle at a position away from an automatically accumulated relevant position (known point). Thus, the relevant position and the position away from the relevant position result in being accumulated as different histories. In the case of the example, the user parked his or her vehicle at a parking lot in front of the "Ramen Torakichi" on "June 20th (Tue.), 2006", so that the position has been accumulated as the "Ramen Torakichi", for example. Meanwhile, when the user made a current visit on "June 27th (Tue.), 2006", the user parked his or her vehicle at a relevant position "Hananoki 2-2"; that is, a little away from the parking lot since the parking lot was full. Here, when a judgment is made based simply on whether or not the vehicle was parked within a pre-detected range, the accumulated parking lot and the relevant position may be judged as different positions. Thus, the histories categorized as different positions with a use of the above-described technique can be automatically judged as the same destination, and the destination can be used for a search later. Hence, the present invention is particularly effective in parking at a parking lot. In other words, the present invention can provide the same name for histories to be registered as different points of arrival since the user has parked at different parking lots. Thus, the user can easily search out a previous history with a search to be conducted later, or can set a destination.

Further, the technique may be utilized only for a history of parking at a parking lot, instead of being utilized for all of histories. In FIG. 14, for example, the histories of arrival at "A's residence" and the "Hananoki-corporation" do not represent parking at a parking lot. Thus, it is improvable that the user would make movements such as parking his or her vehicle at another position because of a full parking lot. Meanwhile, the histories of arrival at a side of the "Ramen Torakichi" at 13:23, June 20th (Tue.), 2006, and at 13:20, June 27th (Tue.), 2006 both represent arrival at the parking lot. Thus, the user has possibly parked his or her vehicle at a different position due to a full parking lot. Thus, judgment of similarities between visiting days and times shown in the technique allow the history of arrival at 13:20, June 27th (Tue.) to be edited as the "Ramen Torakichi". It is noted that the parking lot in the present invention includes a parking lot on a road shoulder on which the user can park his or her vehicle at a pre-detected time with a parking fee.

It is also noted that information whether or not the position is in a no-parking area may be considered. For example, assumed movements of the user that the user may park at another position because the above parking lot is full often depend on the fact whether or not a relevant area is in a no-parking area. The above shall be described, using similar examples of histories of arrival at the side of the "Ramen Torakichi" and arrival at "Hananoki 2-2". For example, when areas around the "Ramen Torakichi" are no-parking areas, it is improvable that the user would park his or her vehicle near the "Ramen Torakichi" despite the fact that the areas are no-parking areas. Thus, it is assumed that the user would park his or her vehicle at the somewhat distant position "Hananoki 2-2". Hence, a name of an arrival point may be edited, considering the information whether or not a relevant area is in a no-parking area.

Figure 16:
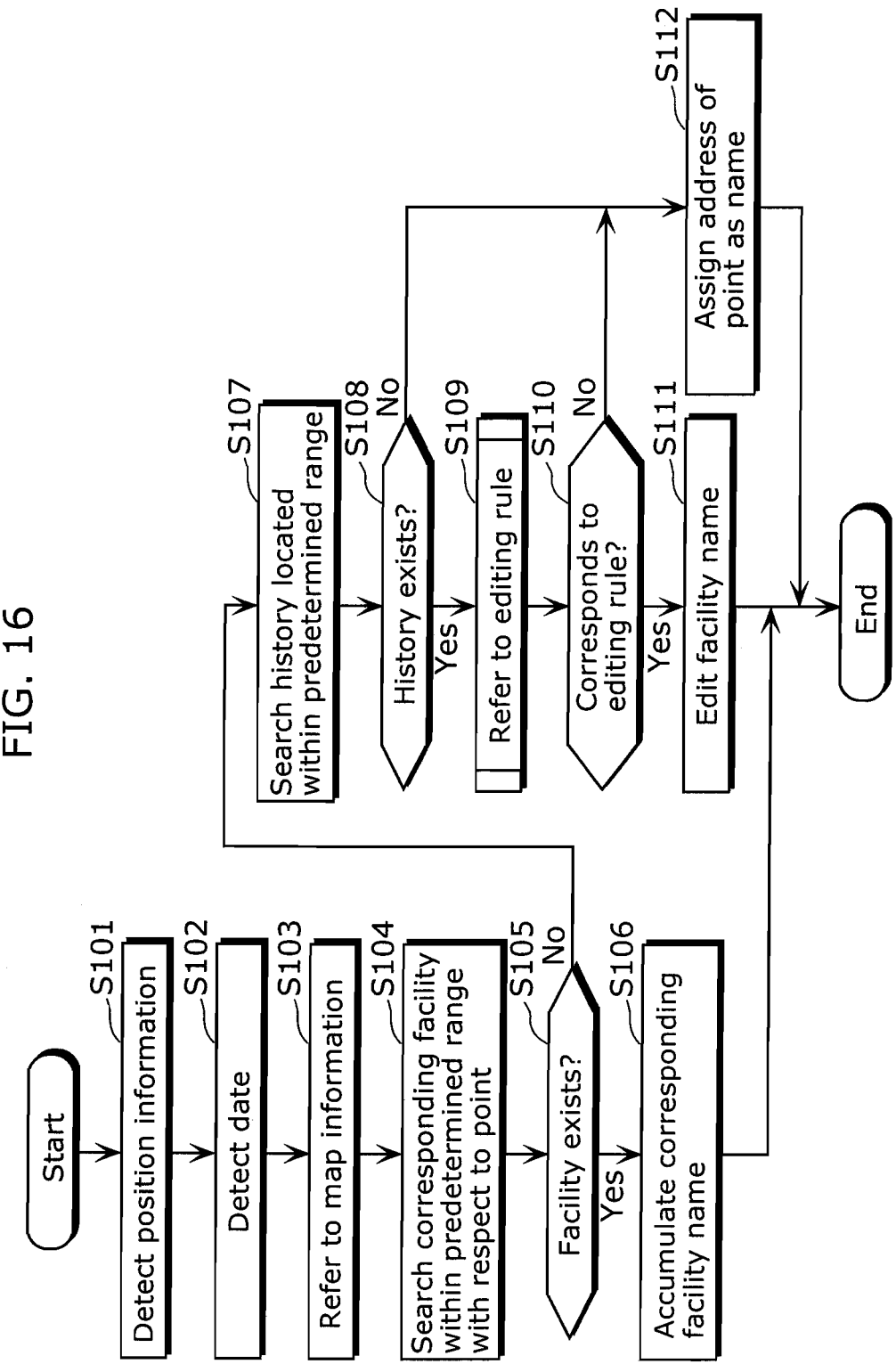
FIG. 16 is a flow chart showing a sequence of editing processing of a destination name by the history editing detecting unit and the history editing unit.

Hereinafter, an operation flow of the embodiment shall be described, using flowcharts in FIGS. 16, 17, and 18. FIG. 16 is a flowchart showing a sequence of name editing processing of a destination by the history editing detecting unit 111 and the history editing unit 113.

First, the position information detecting unit 101 detects position information (Step S101). Then, the date detecting unit 102 detects a date (Step S102). For example, the GPS can detect latitude and longitude information and date information detected by a satellite, and thus the position information detecting unit 101 and the date detecting unit 102 detect these sets of information. Meanwhile, referring to the map information accumulated in the map information accumulation unit 104 (Step S103), the node converting unit 103 searches out a relevant facility within a pre-detected range with respect to an arrival point (Step S104). The node converting unit 103 judges whether or not the relevant facility exists (Step S105). When the relevant facility exists, the operation flow proceeds to Step S106. When the relevant facility does not exist, the operation flow proceeds to Step S107. When the relevant facility exists (Step S105: Yes), the name of the relevant facility is accumulated in the travel history accumulation unit 105 as the destination (Step S106). Meanwhile, when the relevant facility does not exist (Step S105: No), the name of the arrival point is to be edited, using another travel history (Step S107 or the following).

Out of points of arrival included in previous histories accumulated in the travel history accumulation unit 105, first, the history editing detecting unit 111 searches out a history of which distance from an unknown point is positioned within a second pre-detected range (known point) (Step S107). Then, whether or not the history (known point) exists is judged (Step S108). When the history exists, the editing rule accumulated in the history editing rule accumulation unit 112 is referred to (Step S109), and whether or not the existing history conforms to the editing rule is judged by the history editing detecting unit 111 (Step S110). When the history conforms to the editing rule (Step S110: Yes), the name of the facility is to be edited by the history editing unit 113 (Step S111). Meanwhile, when the history does not exist, (Step S108: No), or when the history does not conform to the editing rule (Step S110: No), the address of the arrival point is preliminary assigned as a name, for example (Step S112).

Figure 17:
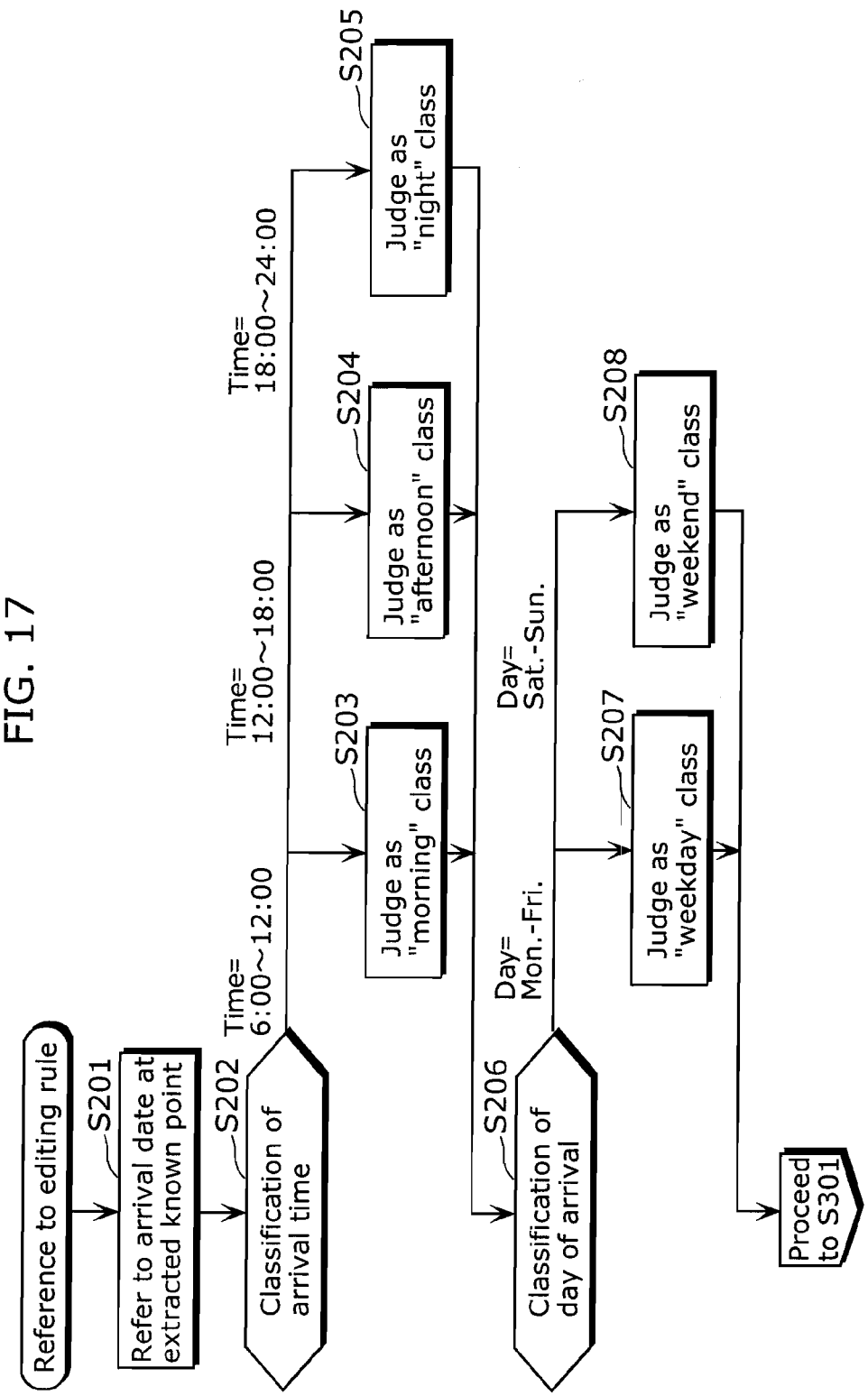
FIG. 17 is a flow chart showing a sequence of editing processing of a destination name, with reference to an editing rule, by the history editing detecting unit and the history editing unit.
Figure 18:
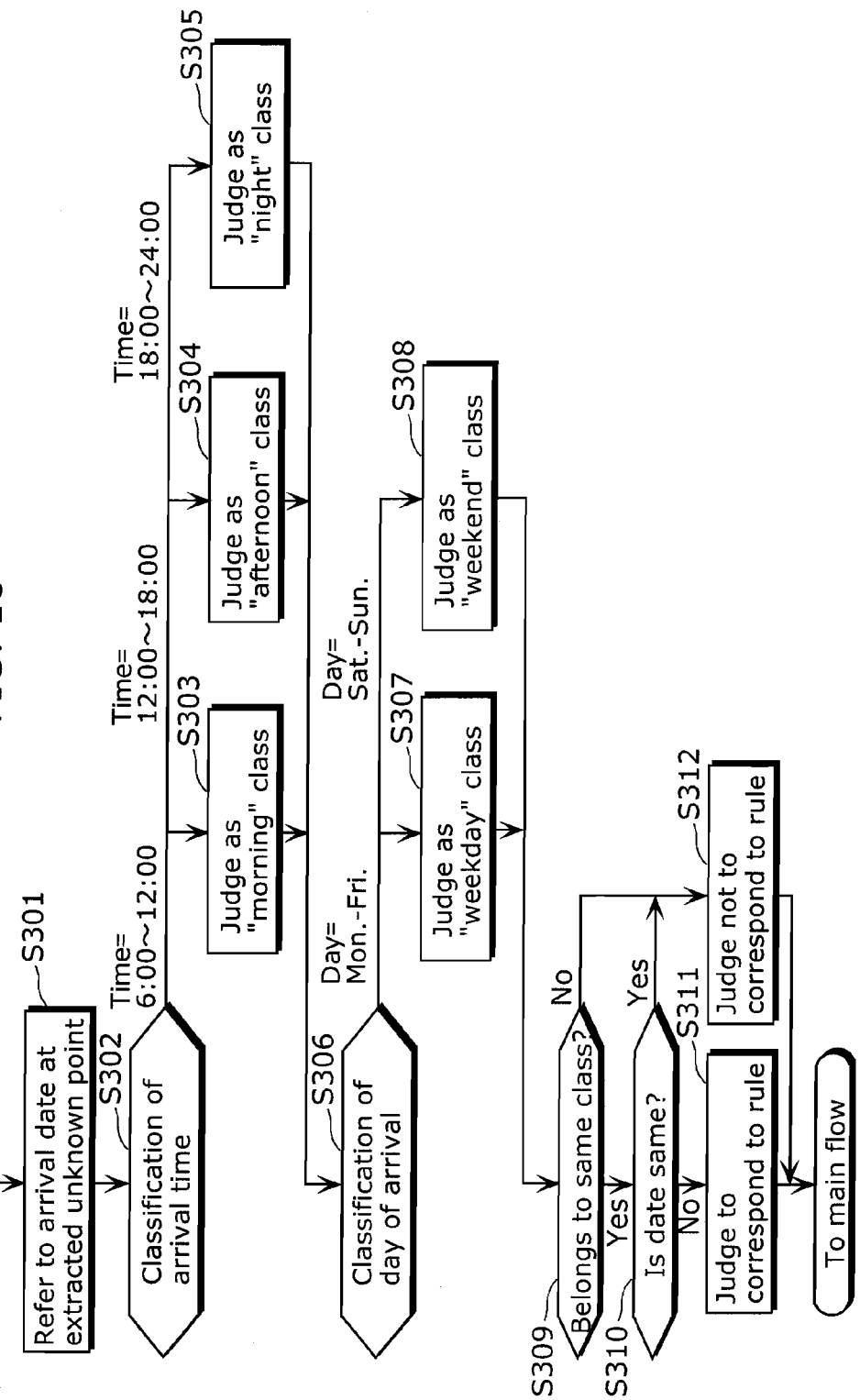
FIG. 18 is a flow chart showing a sequence of editing processing of a destination name, with reference to an editing rule, by the history editing detecting unit and the history editing unit.

Next, editing rule reference and history editing based on the editing rule shall be described, using flowcharts in FIGS. 17 and 18. The flowcharts in FIGS. 17 and 18 show sequences of name editing processing of a destination, with the editing rule referred to, by the history editing detecting unit 111 and the history editing unit 113.

When referring to the editing rule (Step S109), first, the history editing detecting unit 111 refers to an arrival date at the known point accumulated in the history (Step S201), and performs classification based on an arrival time (Step S202). In the case where the arrival time is between six hours and twelve hours, the history editing detecting unit 111 judges the arrival time as a "morning" class (Step S203). The history editing detecting unit 111 judges the arrival time as: an "afternoon" class when the arrival time is a time in between twelve hours and eighteen hours (Step S204); and a "night" class when the arrival time is a time in between eighteen hours and twenty four hours (Step S205), respectively.

Next, the history editing detecting unit 111 performs classification in accordance with a day of arrival, for example (Step S206). When the day is a day in between Monday and Friday, for example, the history editing detecting unit 111 judges the day as a "weekday" class (Step S207). When the day of arrival is either Saturday or Sunday, the history editing detecting unit 111 judges the day as a "holiday" class (Step S208). Hence the sequence proceeds to Step S301, and the history editing detecting unit 111 is to judge a class for an unknown point (Step S301).

In the case of the unknown point, as well, first, the history editing detecting unit 111 refers to an arrival date at the unknown point (Step S301), and performs classification based on the arrival date (Step S302). When an arrival time is a time in between six hours and twelve hours, the history editing detecting unit 111 judges the arrival time as the "morning" class (Step S303). The history editing detecting unit 111 judges the arrival time as: the "afternoon" class when the arrival time is a time in between twelve hours and eighteen hours (Step S304); and the "night" class when the arrival time is a time in between eighteen hours and twenty four hours (Step S305), respectively.

Next, the history editing detecting unit 111 performs classification in accordance with a day of arrival (Step S306). When the classified day is a day in between Monday and Friday, for example, the history editing detecting unit 111 judges the day as the "weekday" class (Step S307). When the day of arrival is either Saturday or Sunday, the history editing detecting unit 111 judges the day as the "holiday" class (Step S308).

Then, the history detecting unit 111 judges whether or not the classes of the unknown point and the known point belong to the same class (Step S309). In the case of the same class, the history detecting unit 111 further judges whether or not the dates of the arrival are of the same date (Step S310). Then, in the case where the dates are not the same date (Step S310: No), the history detecting unit 111 judges that the case conforms to the editing rule, and the sequence returns to the main flow.

Meanwhile, in the case where the classes of unknown point and the known point are not in the same class (Step S309: No), the history detecting unit 111 judges that the case does not conform to the rule (Step S312). In addition, even in the case where the classes are of the same class, (Step S309: Yes) the movements are made consecutively when the dates of arrival are of the same date (Step S310: Yes). Thus, the history detecting unit 111 may well judge that the case does not conform to the rule (Step S312).

(Minimum Structure)

Figure 19:
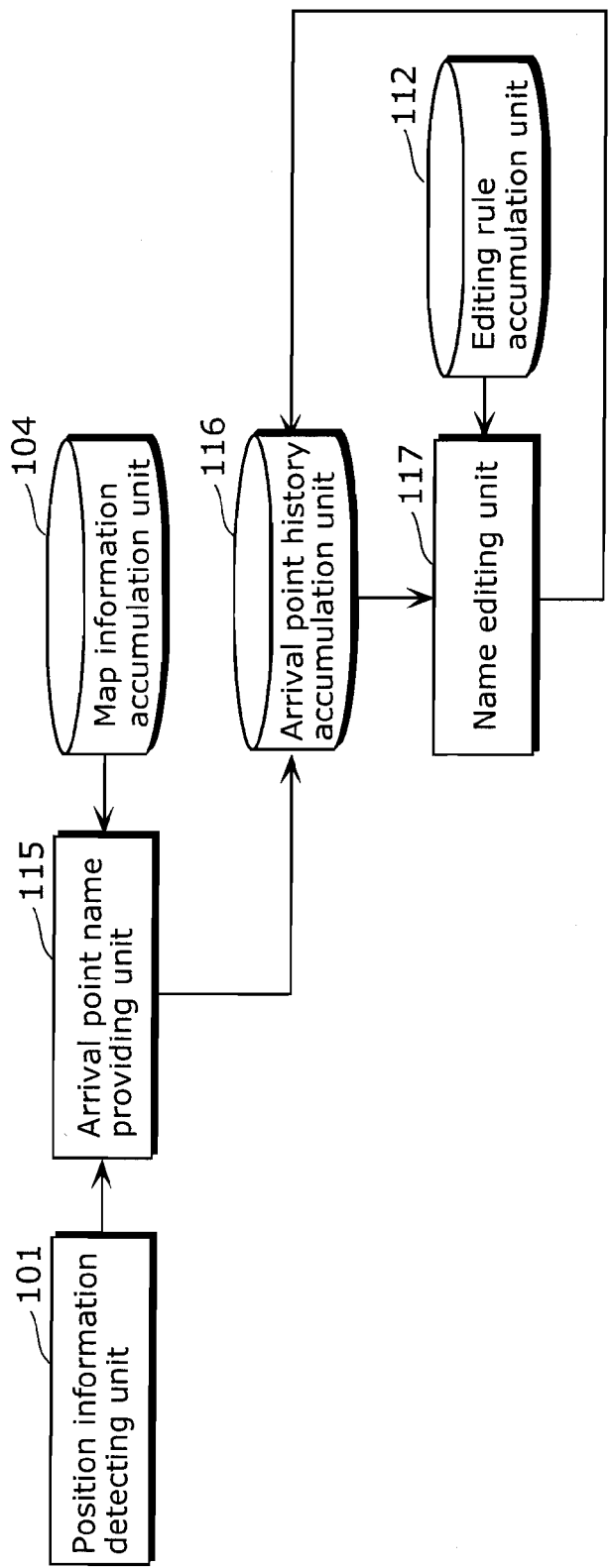
FIG. 19 is a block diagram showing a minimum structure of the travel history editing device in the first embodiment.

It is noted that in the above embodiment, the structure of the travel history editing device has been described in accordance with the structural elements shown in FIG. 1. In the travel history editing device, however, the searching unit 107 and the displaying unit 108 are not necessarily essential structural elements. Editing a name of an arrival point in accordance with another name of the arrival point is the objective of the travel history editing device in the present invention. Hence, the travel history editing device in the embodiment can be implemented with structural elements shown in FIG. 19. FIG. 19 is a block diagram showing a minimum structure of the travel history editing device in the first embodiment.

Specifically, the minimum structure includes: the position information detecting unit 101 detecting position information of a vehicle; the map information accumulation unit 104 accumulating pre-registered first position information, first kind name information indicating the first position information, second position information which does not correspond to the first position information, and second kind name information which is different from the first kind name information; the arrival point name providing unit 115, regarding a stopping place information, of the vehicle, detected by the position detecting unit as an arrival point, providing the first kind name information for the arrival point by reading out the first kind name information from the map information accumulation unit in the case where the arrival point corresponds to the first position information, and providing the second kind name information for the arrival point by reading out the second kind name information from the map information accumulation unit in the case where the arrival point corresponds to the second position information; an arrival point history accumulation unit 116 accumulating, at least, position information of the arrival point corresponding to the first position information and the first kind name information showing the position information of the arrival point; the name editing unit 117 editing name information of the arrival point as the first kind name information by rewriting the name information of the arrival point as the first kind name information accumulated in the point-of-history accumulation unit, the name information of the arrival point being with the second kind name information provided; and an editing rule accumulation unit 112. Here, the travel history accumulation unit 105 shown in FIG. 1 corresponds to the arrival point history accumulation unit 116, and the unknown point extracting unit 109, the known point extracting unit 110, the history editing detecting unit 111, and the history editing unit 113 correspond to the name editing unit 117.

(Another Example 1)

It is noted in the embodiment that a point that a name of which facility is used as a name of an arrival point has been judged based on position relationship between the arrival point and a facility at which the user has previously parked his or her vehicle; namely, similarities between information whether or not the facility at which the user has previously parked is included within a pre-detected range, and the arrival date at the arrival point and the arrival date at the facility at which the user has previously parked his or her vehicle. The present invention, however, is not limited to the above, and may utilize information indicating whether or not areas around a nearby facility at which the user has previously parked his or her vehicle are no-parking areas, and information whether or not a parking lot is full. Specifically, the present invention can obtain information on one-way restriction as road traffic information, and further, information on passage prohibition depending on a time slot, using the VICS (Vehicle Information and Communication System). In addition, the present invention can as well obtain information on: whether or not a road or an area is available for parking, or a no-parking area; and whether or not parking lots of nearby facilities are full. In the above FIG. 14, for example, when the user visits the "Ramen Torakichi", the user usually parks in front of the "Ramen Torakichi" in the case where a road in front of the "Ramen Torakichi" is available for parking. In the case where a relevant area (the road in front of the "Ramen Torakichi") is no-parking area, it is not preferable for the user to park on the shoulder. Thus, the user is to park a pay parking lot nearby or to park a distant designated parking lot. Alternatively, when the parking lot in front of the "Ramen Torakichi" is full, the user is to park in the distant designated parking lot. Hence, for example, the user possibly parks his or her vehicle at "Hananoki 2-2" when the road in front of the "Ramen Torakichi" is a no-parking area, or the parking lot of the "Ramen Torakichi" is full. In the above case, the history is judged to be editable, accordingly. Utilization of information on whether or not a no-parking area and on full parking lots, as well as time and date, causes the history to be edited more accurately.

Figure 20:
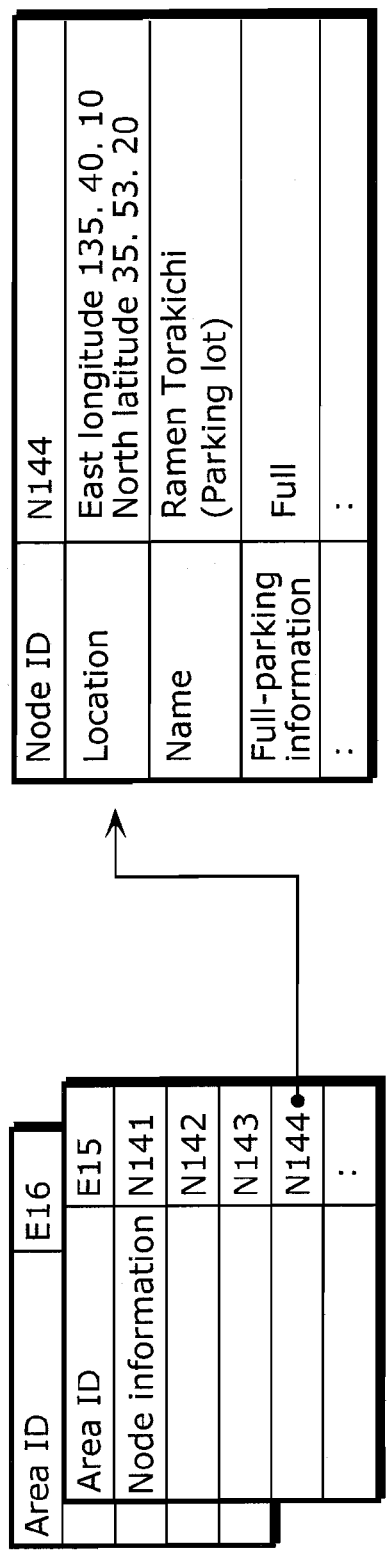
FIG. 20 exemplifies information, on a full parking lot, accumulated in a map information accumulation unit.

FIG. 20 exemplifies information, on a full parking lot, accumulated in the map information accumulation unit 104. The map information shown in FIG. 20 indicates information on each of nodes in an area "E15". A node "N144" indicates the parking lot of the "Ramen Torakichi". Here, the node "N114" additionally indicates the fact that the parking lot is currently "full" as "full-parking information". Recent car navigation systems can obtain information whether or not parking lots are currently full via a network. Thus, the "full-parking information" in the embodiment is assumed to be obtained from such a network, for example.

Figure 21:
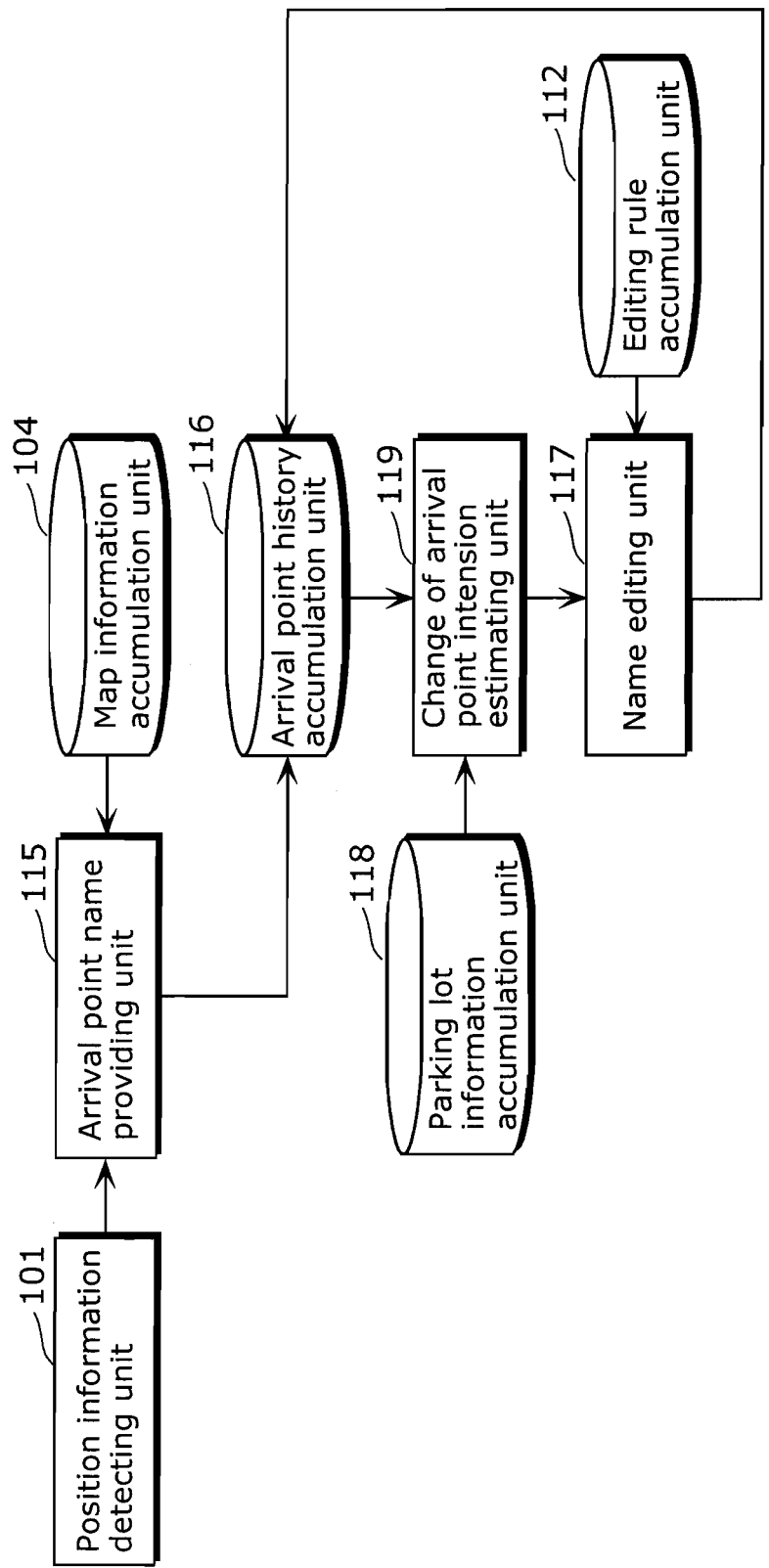
FIG. 21 is a block diagram showing a structure of the travel history editing device to achieve the above embodiment.

When the parking lot of the "Ramen Torakichi" is full as described above, it is assumed that the user cannot park at the parking lot of the "Ramen Torakichi" and ends in parking at the parking lot away for north from the "Ramen Torakichi", as shown in FIG. 14. The position of the parking lot, however, is away from the "Ramen Torakichi", and thus, the position is subject to registration as "Hananoki 2-2". Thus, when the vehicle arrives at a position away from a facility at which the user has previously parked as described above, the name editing unit 117: detects whether or not a position at which the user previously parked is currently full; assumes that the user has involuntarily parked his or her vehicle at the current arrival point somewhat away from the position at which the user previously parked his or her vehicle; and edits "Hananoki 2-2" as a name of the full parking lot. Meanwhile, when the user parks at a distant position including "Hananoki 2-2" even though the previous parking position is not full, the name editing unit 117 avoids editing the name of the history since the user is assumed to park for another objective instead of visiting the "Ramen Torakichi". As described above, by utilizing information on whether or not a parking lot is full, a history of parking, at a distant position from a facility at which the user has previously parked, can be edited more accurately in accordance with an objective of the user. It is noted that the above-described judgment in that whether or not a parking position is changed is to be made by the name editing unit 117; meanwhile, a change of arrival point intention estimating unit may be separately provided to perform the judgment. FIG. 21 is a block diagram showing a structure of the travel history editing device to achieve the above embodiment. In addition to the structural elements shown in FIG. 19, the travel history editing device further includes a parking lot information accumulation unit 118 and a change of arrival point intention estimating unit 119. The parking lot information accumulation unit 118, an example of a parking lot information accumulation unit, obtains to accumulate full-vacant information indicating whether a parking lot of a facility nearby an arrival point is full or vacant through communication. The parking lot information accumulation unit 118 accumulates full-vacant information of: the parking lot of the facility nearby the arrival point; and a parking lot. The change of arrival point intention estimating unit 119, an example of a change of arrival point intention estimating unit, examines the accumulated full-vacant information on the facility nearby the point of destination for which the second kind information is provided, and assumes that the user has parked at a current point of destination since the parking lot is unavailable when the parking lot of the facility is full. The change of arrival point intention estimating unit 119 estimates whether or not the user has changed the arrival point since the parking is full based on information, on the facility at which the user has previously parked, accumulated in the arrival point history accumulation unit 116, and the full-vacant information of a parking lot accumulated in the parking lot information accumulation unit 118. When the change of arrival point intention estimating unit 119 judges that the user has changed a point of destination because of a full parking lot, the name editing unit 117 provides for an identical name, as a name of the arrival point, to the name of the arrival point at which the user has parked when the parking lot is not full.

(Another Example 2)

It is noted in the embodiment that when a history having no facility to correspond to an arrival point (unknown point) is accumulated, a position accumulated as the facility (known point) is extracted from the history to edit a name. Meanwhile, there are some cases where no known point exists in the history. In such a case, the name of the known point cannot be provided, and thus, a search cannot be conducted later. Hence, in the above case, the facility name of a nearby facility of the known point may be accumulated as a nearby facility. The following describes the above, using FIGS. 22 and 23.

Figure 22:
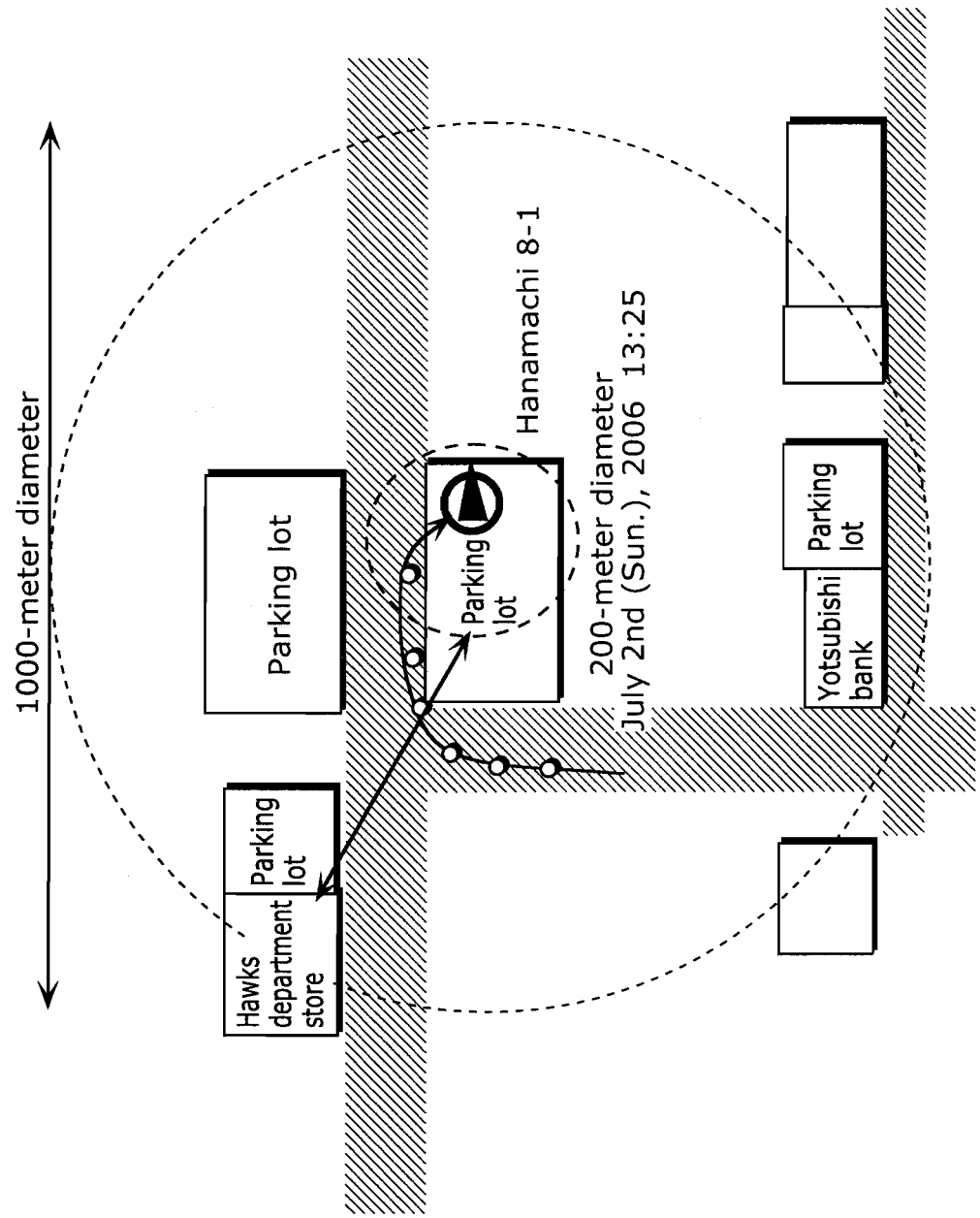
FIG. 22 shows how an unknown point is accumulated in the case where no history of a known point is found in the travel history accumulation unit shown in FIG. 1.

FIG. 22 shows how an unknown point is accumulated in the case where no history of a known point is found in the travel history accumulation unit 105 shown in FIG. 1. In FIG. 22, the user is assumed to have arrived at a position on "13:25, July 2nd (Sun.), 2006". Here, even though a search was conducted to find a facility which would exist within a pre-detected range (a 200-meter diameter in the embodiment), the facility did not exist. Moreover, even though a search was conducted within a 1000-meter diameter, the second range, no history indicating that the user had previously arrived at the facility existed. Thus, the name of the arrival point was preliminary accumulated as "Hanamachi 8-1". Simple accumulation of an address alone, however, does not allow a relevant facility to be searched out when a search is conducted. Thus, a facility existing within a 1000-meter diameter of an arrival point may be accumulated as a candidate destination for which the user heads even though no history of a previous visit to the facility is found. In the example, the "Hawks Department Store" and the "Yotsubishi Bank" exist within an area of a 1000-meter diameter. Thus, the "Hawks Department Store" and the "Yotsubishi Bank" are accumulated as nearby facilities.

FIG. 23 shows the travel histories accumulated in the travel history accumulation unit 105 shown in FIG. 1. Here, "nearby facility" is additionally accumulated as an item of each of the histories. In the travel history ID "021", a history of the arrival point shown in FIG. 22 is accumulated. Accordingly, "Hanamachi 8-1" is preliminary provided as the name of destination. Further, the "Hawks Department Store", and the "Yotsubishi Bank" are additionally accumulated as nearby facilities. When the history is searched out, for example, such as a case where the user has actually visited the "Hawks Department Store", the user is to enter the "Hawks Department Store" as a search keyword. Here, the destination name, accumulated under "Hanamachi 8-1", corresponds to the nearby facility the "Hawks Department Store". Thus, the user can conduct a search.

However, just accumulating each of the histories with corresponding facilities added simply as information on a nearby facility causes accumulated information to be significant. Moreover, a destination actually different from a relevant destination can be searched out. Hence, when a history of a facility added as a nearby facility is accumulated, the destination name may be edited, using the history.

Figure 24:
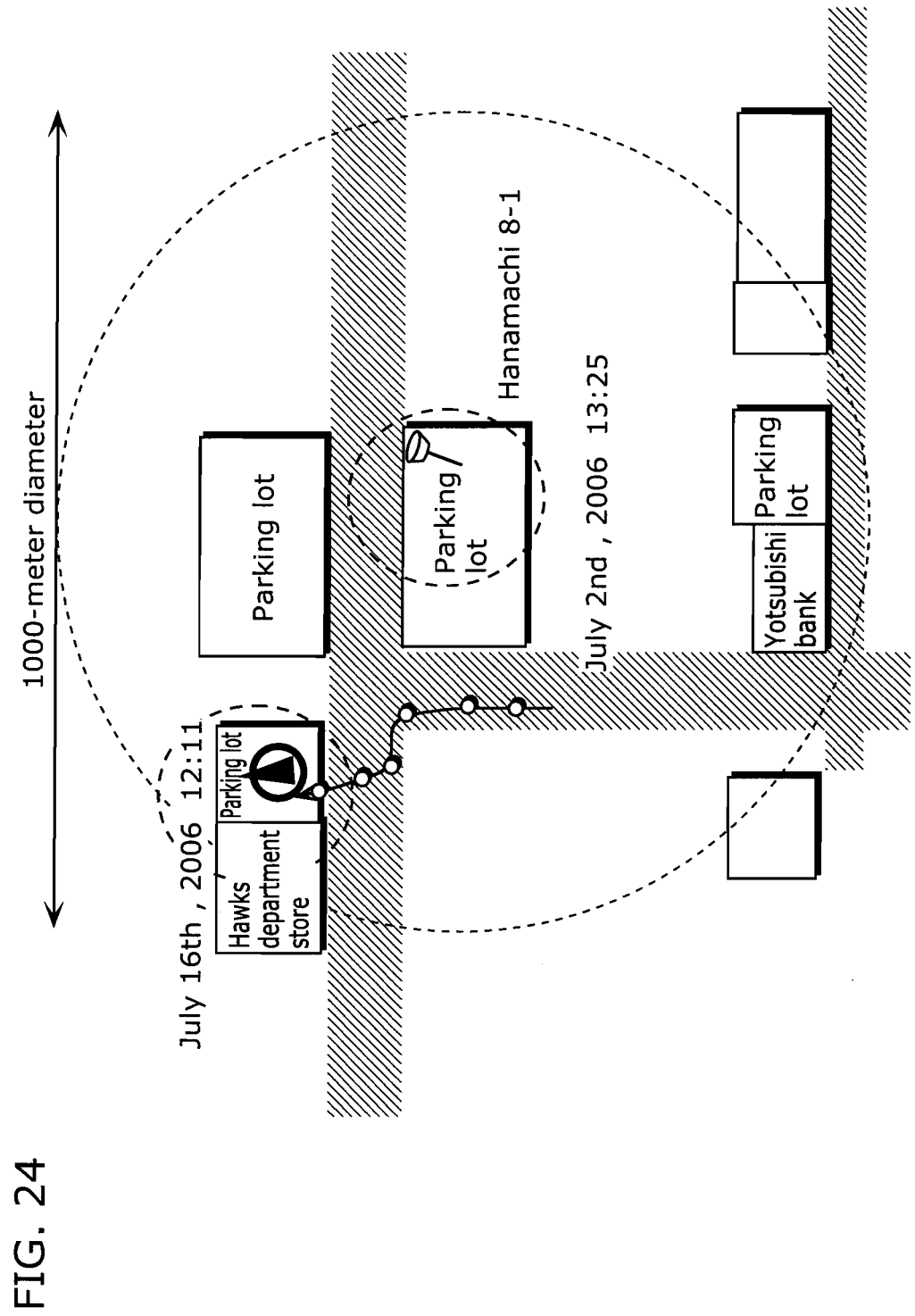
FIG. 24 shows editing of a history on which movements of the user, after the travel history shown in FIG. 22, is reflected.

FIG. 24 shows editing of a history on which movements of the user, after the travel history shown in FIG. 22, is reflected. For example, this time, the user is assumed to visit the "Hawks Department Store" at the date of "12:11, Jul. 16, 2006", after the date shown in FIG. 22. In FIG. 24, the Hawks Department Store exists within a pre-detected range from an arrival point, the name of the arrival point is to be accumulated under the Hawks Department Store as the history. Here, as shown in the embodiment, the name editing unit 117 searches out an unknown point within a 100-meter diameter from the "Hawks Department Store", and applies the editing rule to corresponding facilities. As a result of the search "Hanamachi 8-1" is obtained as the unknown point. The previous arrival date at "Hanamachi 8-1" "13:25, July 2nd (Sun.), 2006", and the current arrival date at the "Hawks Department Store" "July 16th (Sun.), 2006" are the same in class since the day is on Sunday, and the time slot is in the afternoon. Since "Hanamachi 8-1" and the "Hawks Department Store" belong to the same class, the name editing unit 117 judges that the above arriving dates represent the same destination, and edits the destination name of "Hanamachi 8-1", the unknown point, as the "Hawks Department Store".

It is noted that the facility conforming up to the class of the arriving date is only the "Hawks Department Store". At the same time, there is also a case where the "Yotsubishi Bank" also conforms to the class of the arriving date. In such a case, the name of "Hanamachi 8-1", the unknown point, may be edited as the name of a facility positioned closer to the arrival point "Hanamachi 8-1"; namely the "Yotsubishi Bank", for example. Further, in the case where there are a plurality of facilities conforming to a class of the arriving date within a 1000-meter distance range from the arrival point, each of relevant facilities is weighted based on a distance from the arrival point, and the relevant facilities may be accumulated as candidates for editing a name of an unknown point.

FIG. 25 describes how the unknown point is edited based on an arrival history to a facility shown in FIG. 24. Specifically, since the user arrived at the "Hawks Department Store" which is within a 1000-meter diameter from the unknown point "Hanamachi 8-1", first, a history that the user visited the "Hawks Department Store" at the date of "12:11, Jul. 16, 2006" is accumulated in a travel history ID "032". Further, the destination name in the travel history ID "021"; namely "Hanamachi 8-1",indicating the history of previous visiting "Hanamachi 8-1" at "13:25, July 2nd (Sun.), 2006" is edited as the name the "Hawks Department Store". In addition, the "Hawks Department Store" is deleted out of nearby facility in the travel history ID "021".

Moreover, as another technique, a name can provided with a use of information on a visiting date to a different position, so that accumulated information can be reduced. The following describes the above, using FIG. 26.

Figure 26:
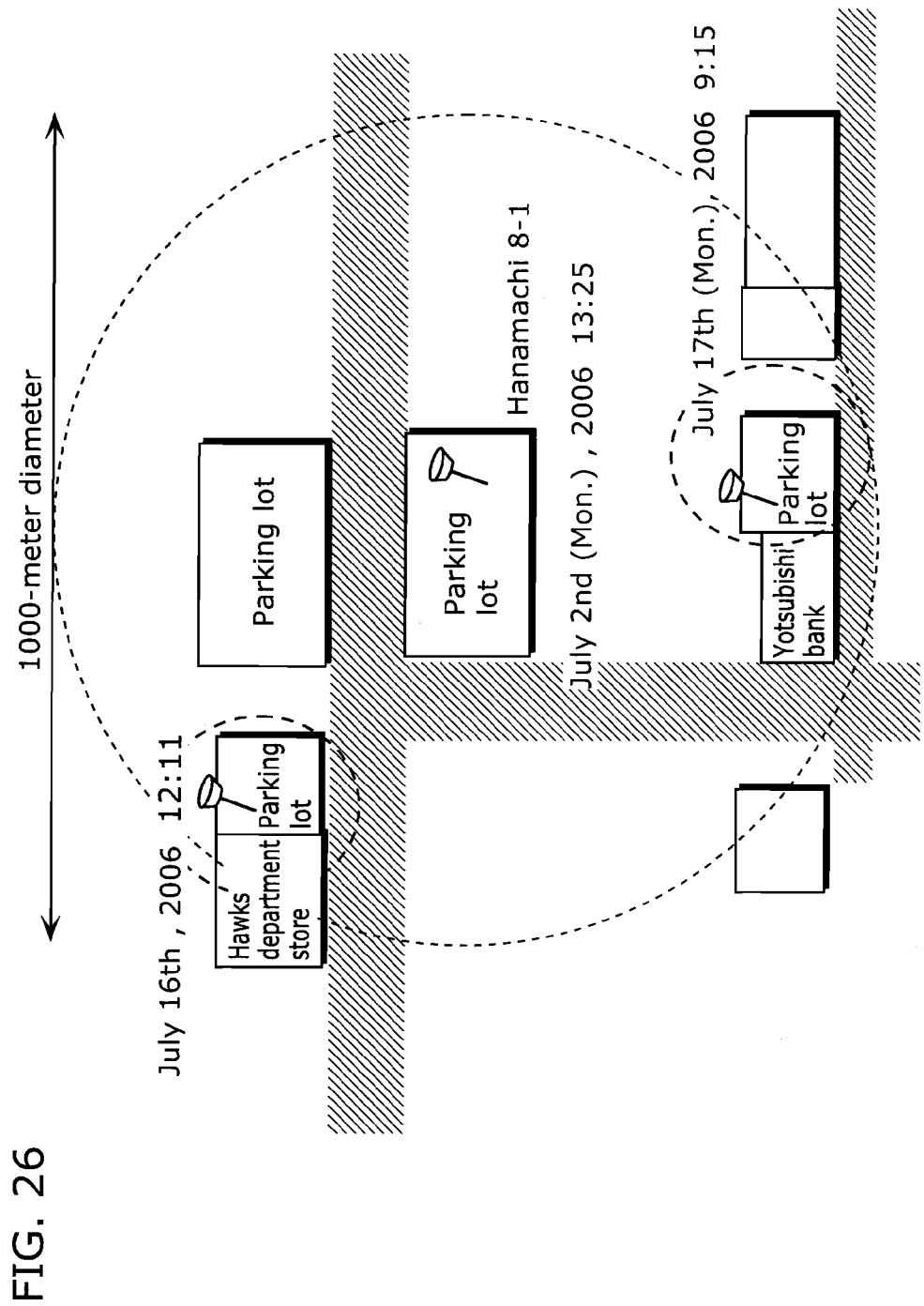
FIG. 26 shows how a history is edited in the case where the user visits a plurality of facilities within a 1000-meter diameter after arriving at the unknown point.

FIG. 26 shows how a history is edited in the case where the user visits a plurality of facilities within a 1000-meter diameter after arriving at the unknown point. For, example, as shown in FIG. 26, the user is assumed to have visited later the "Yotsubishi Bank" other than the "Hawks Department Store". The date is "9:15, July 17th (Mon.), 2006".

Figure 27:
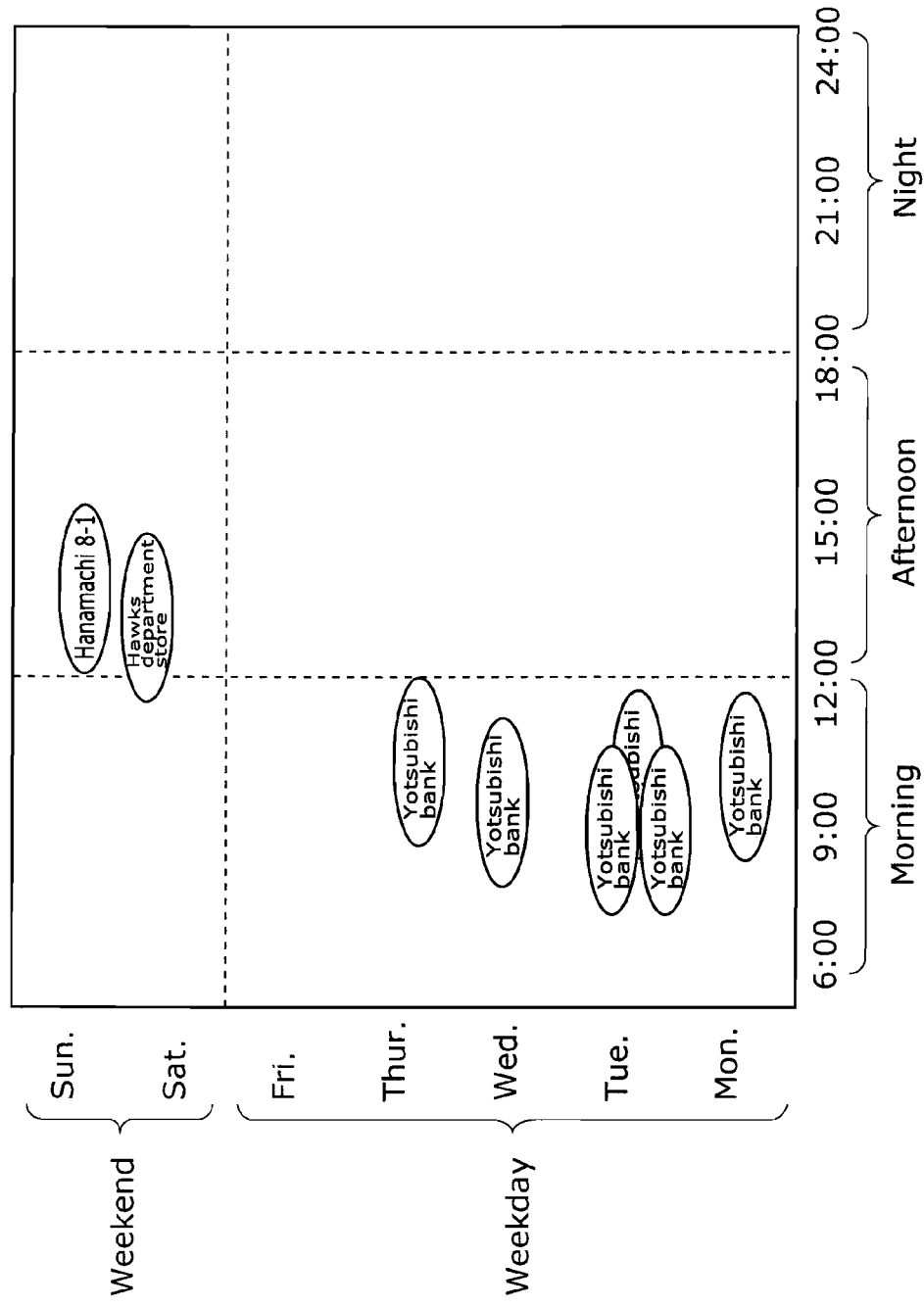
FIG. 27 exemplifies how the travel history to nearby facilities shown in FIG. 26 is classified in accordance with the editing rule, and the destination name of the unknown point "Hanamachi 8-1" is edited.

FIG. 27 exemplifies how the travel history to nearby facilities shown in FIG. 26 is classified in accordance with the editing rule, and the destination name of the unknown point "Hanamachi 8-1" is edited. As shown in FIG. 27, the visit histories to the Yotsubishi Bank are frequently observed in the weekday morning class at around 9:00, Monday, and around 9:00, Tuesday. On the other hand, the visit histories to the Hawks Department Store and "Hanamachi 8-1"; namely an unknown point, correspond to the weekend afternoon class including Saturday and Sunday. As described above, even though the arrival point is so close to the corresponding facilities as to be included in the pre-detected range as a point, situations including time slots are significantly different depending on a destination. Thus, availability of judgment with a use of the editing rule becomes possible.

FIG. 28 shows a result of editing of a travel history in accordance with the classification shown in FIG. 27. As shown in FIG. 28, the destination name "Hanamachi 8-1" in the history ID "021" is edited as the "Hawks Department Store" based on correspondence of classes shown in FIG. 27. Further, the "Yotsubishi Bank" is deleted out of nearby facility in the history ID "021". This is because even though the Yotsubishi Bank from the unknown point "Hanamachi 8-1" is also surely included within a 1000-meter diameter, the visiting date to the unknown point "Hanamachi 8-1" and the visiting date to the Yotsubishi Bank are different in class. Meanwhile, the user visits the Yotsubishi Bank on the weekday morning, and the point "Hanamachi 8-1" which the user visits on the weekday afternoon is not possibly the Yotsubishi Bank. Hence, when a search is conducted as the Yotsubishi Bank, only histories with visits to the Yotsubishi Bank are searched, and the histories having the position of "Hanamachi 8-1" are not searched.

As described above, the use of the present technique allows: destination names of histories accumulated as unknown points to be accurately grouped; and essentially unnecessary information on nearby facilities to be deleted, the essentially unnecessary information which is provided in order to conduct a history search, using facility name. Moreover, as a result of the above, an advantageous effect is obtained in that an efficient search can be conducted when searching.

(Another Example 3)

It is noted that as the history of arrival at the Yotsubishi Bank, the user's history is used in FIG. 26; meanwhile, a history of another user may also be used. In FIG. 26, for example, a plurality of facilities; namely the Hawks Department Store and the Yotsubishi Bank, exist within a 1000-meter diameter with the unknown position "Hanamachi 8-1" centered. Meanwhile, when a third person visits the Yotsubishi Bank, the third person parks his or her vehicle at a parking lot on the right. The position is assumed to be accumulated as the Yotsubishi Bank. In the above case, the unknown point "Hanamachi 8-1" is accumulated as the Hawks Department Store instead of the Yotsubishi Bank. A typical user visiting the Yotsubishi Bank possibly parks his or her vehicle at the parking lot on the right of the Yotsubishi Bank in FIG. 26 instead of intentionally parking at "Hanamachi 8-1". Thus, the user may edit his or her own history, using a history of the third party.

(Another Example 4)

In addition, the second pre-detected range in the embodiment is described as a fixed value of a 1000-meter radius; however, the description shall not be limited to this. For example, a sojourn time at a relevant destination, an unknown point, may be detected, so that a pre-detected range may be detected in accordance with the sojourn time. Specifically, first, a sojourn time can be calculated out of a difference between an arrival time to the relevant destination and a later departure time. Then, considering that the sojourn time has been spent for traveling to and from a facility, a pre-detected range can be represented as a distance where the product of 80 meters a minute; namely a person's average walking speed, for example, and the sojourn time (minute) is divided by two. For example, when the sojourn time is 10 minutes, the distance is 400 meters (=80×10/2). Hence, a 1000-meter range is too large to be a pre-detected range. Thus, the history is desirably edited as a facility positioned at least within a 400-meter diameter as the relevant facility. Thus, an edit of a name with a use of a sojourn time allows a name reflecting on movements of the user to be provided.

It is noted that this has described a technique to calculate To the second pre-detected range, ignoring the sojourn time of the facility; namely, an original destination. In other words, a technique to calculate the second pre-detected range has been described, considering only a necessary time to make a round trip on foot from a parking position, an unknown point, to a facility, an original destination. Meanwhile, the second pre-detected range may be calculated, considering the sojourn time at a target facility. In this case, the history editing detecting unit 111 holds a table to indicate a typical sojourn time on a basis of the kind of a facility, for example. The history editing detecting unit 111 holds a table holding information such that a sojourn time at a department store is two hours, at a bank 40 minutes, and a restaurant one hour, for example. In the case where a sojourn time at an unknown point is one hour and twenty minutes, for example, a restaurants to and from the unknown point within a 20-minute walking distance corresponds to a target facility since a typical sojourn time at a restaurant is one hour. Here, in the case of a restaurant, the history is desirably edited with a relevant facility positioned at least within a 800-meter diameter (=80×20/2) as the restaurant. Then, in the case where a sojourn time at an unknown point is one hour and twenty minutes, for example, a time required to travel back and forth from a parking lot to a bank is forty minutes since a typical sojourn time is forty minutes at a bank. Accordingly, a bank within a forty-minutes round trip walking distance from an unknown point; that is a bank within a 1600-meter diameter from the unknown point, corresponds to a target facility. In this case, however, it is improvable that the user walks from the parking lot as far as 1600 meters only for a forty-minute stay at the bank. Thus, when calculation indicates that the second pre-detected range is greater than a 1000-meter diameter, a maximum value of the second pre-detected range may be pre-detected, such as an area having a 1000-meter diameter.

(Second Embodiment)

The first embodiment has described the technique to edit a name of an arrival point, using a name of a previously accumulated arrival point. In the case where: a parking lot is large; and a user parks at a different position (parking lot) even though the destination is the same, the previously accumulated arrival point and a current arrival point are not always judged as the same position, depending on the position at which the user parks his or her vehicle, and then, the previously accumulated arrival point and the current arrival point are accumulated as different positions. Thus, a search cannot be conducted later. Using the present invention, however, the names of the points of arrival can be appropriately edited as the same name, and the user can conduct a search even in the case where the user parks at different positions (parking lots). Hence, a technique shown in the present invention is used as a technique to predict a destination with a use of a history, as well as simply to edit histories of points of arrival. The following describes with a specific example a technique to: edit a name of an arrival point, using a name of a previously accumulated arrival point; and predict a destination out of a history of the arrival point accumulated in the edited name.

Figure 29:
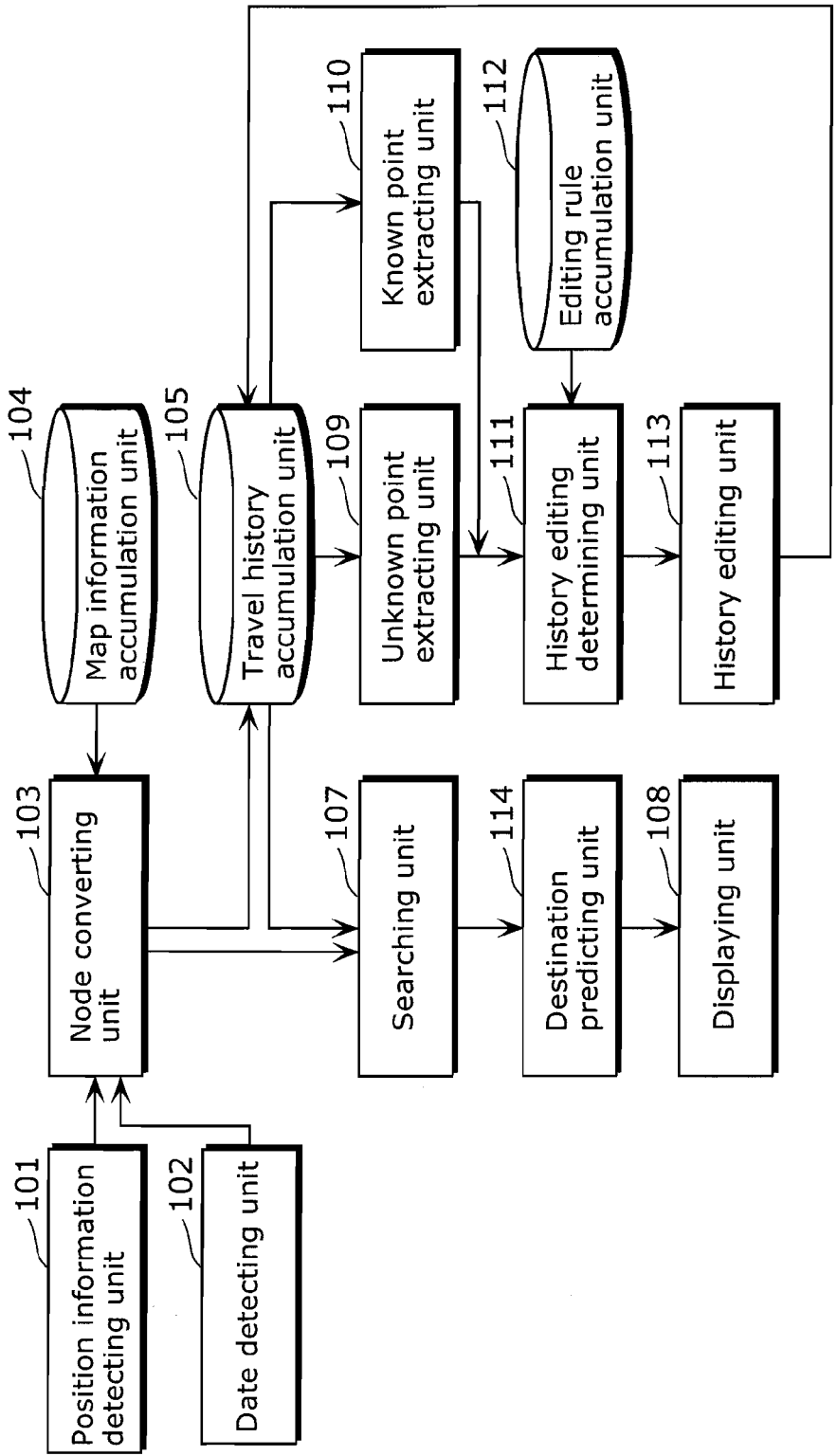
FIG. 29 is a block diagram showing a structure of a travel history editing device in a second embodiment.

FIG. 29 is a block diagram showing a structure of a mobile history editing device in a second embodiment. An identical numerical reference is assigned to the same structural element as that of the travel history editing device in the first embodiment shown in FIG. 1. Differences between the structure of FIG. 1 and that of FIG. 29 are that the search key entering unit 106 in FIG. 1 is omitted in the travel history editing device in FIG. 29, and a destination predicting unit 114 is added.

The position information detecting unit 101, a unit to detect position information, is structured in a GPS. Then, at the same time, the date detecting unit 102 detects a date, and the node converting unit 103 converts the position information into a node, using map information accumulated in the map information accumulation unit 104. It is noted that in the first embodiment, the arrival point is converted, using the map information; meanwhile, in the second embodiment, a travel sequence of the user (that is, position information including a starting point and a point of passage, as well as an arrival point) is to be converted into a node sequence. Hereinafter, the above shall be described, using the drawings.

Figure 30:
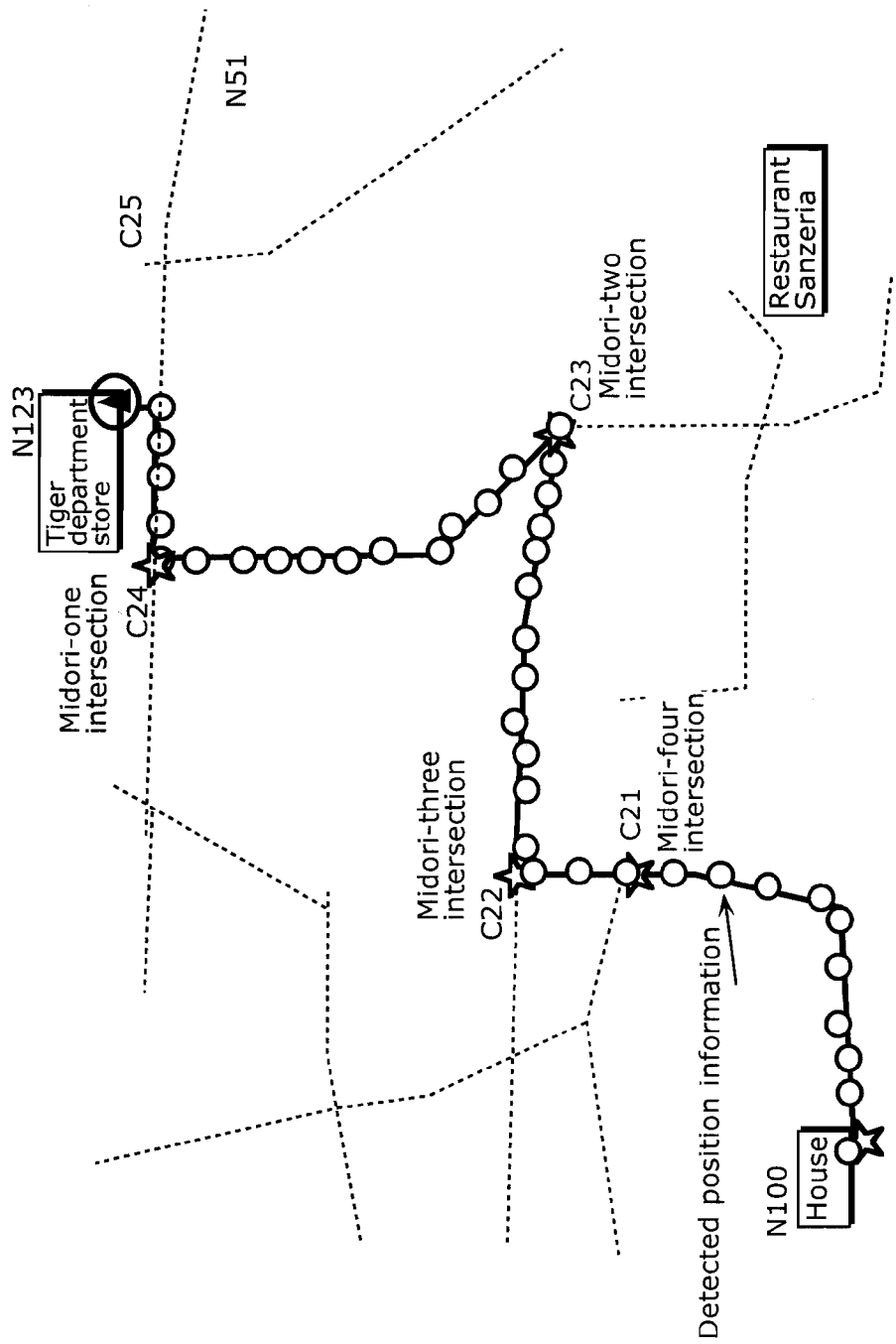
FIG. 30 shows a travel route of a user from his/her house to the Tiger Department Store.

FIG. 30 shows a travel route of the user from his or her house to the Tiger Department Store. FIG. 30 shows a travel route that the user leaves his or her house, passes a green-four intersection, a green-three intersection, a green-two intersection and a green-one intersection, and arrives at the Tiger Department Store. Moreover, the position information detecting unit 101 detects latitude and longitude at a pre-detected interval. In FIG. 30, a detected set of position information is shown in a white circle.

FIG. 31 shows latitude and longitude information detected by the position information detecting unit 101. As shown in FIG. 31, the latitude and longitude information represented in east longitude and north latitude is detected, along with a date, by the date detecting unit 102. In accordance with a travel of a moving object having the travel history editing device, the position of the user is detected. For example, the position of the user is "at 135 degrees 13 minutes 10 seconds east longitude, and 35 degrees, 44 minutes, 15 seconds north latitude" at a date of "11:40, Jun. 24, 2006".

Figure 32:
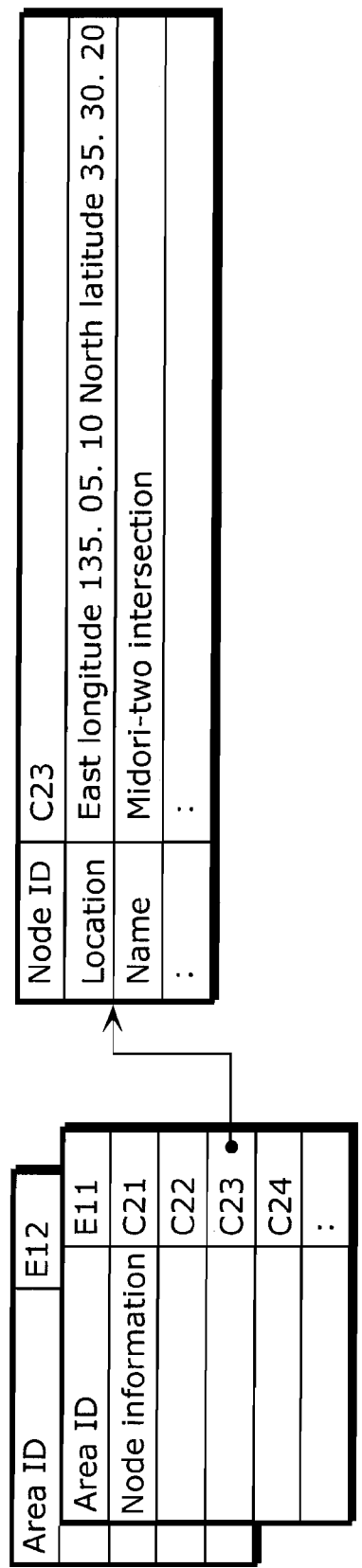
FIG. 32 shows map information accumulated in the map information accumulation unit.

FIG. 32 shows the map information accumulated in the map information accumulation unit 104. As seen in to FIG. 4, the map information is divided into pre-detected ranges. The map information accumulation unit 104 accumulates a facility and an intersection existing in a relevant area as node information. For example, sets of node information "C21", "C22", and "C23" exist in an area ID "E11". Out of the sets of node information, "C23" is information on "green-two intersection", showing that the intersection is positioned at "135 degrees 05 minutes, 10 seconds east longitude, and 34 degrees, 30 minutes, 20 seconds north latitude". Thus, the map information accumulate each of nodes on a pre-detected range basis. The node converting unit 103 converts the position information into a node based on the position of the node accumulated in the map information, and the latitude and longitude information detected by the position information detecting unit 101; and accumulates the travel of the user in the travel history accumulation unit 105 as a node sequence. For example "135 degrees, 13 minutes, 34 seconds east longitude, and 35 degrees, 43 minutes, 14 seconds north latitude" shown in FIG. 31 are converted into a node ID "C21 (green-four intersection)", using the map information.

FIG. 33 shows travel histories accumulated in the travel history accumulation unit 105 shown in FIG. 29. As seen in FIG. 5, the travel history is to be accumulated by each travel of the user. In the second embodiment, the travel history accumulation unit 105 accumulates the travel history as a node sequence including a starting point and a passed intersection, as well as a destination. For example, a history ID "001" indicates a history that the user: left the "house" at a date of "11:04" "June 24th (Sat.), 2006"; passed "green-four intersection", "green-three intersection", "green-two intersection", and "green-one intersection"; and arrived at a destination the "Tiger Department Store" at "12:01". In addition, histories arriving at a destination "Hanamachi 3-1" and at the "Restaurant Sanzeria" are accumulated as history IDS "005" and "007", respectively.

Latitude and longitude to be detected tend to be a significant amount of information. Thus, accumulating the latitude and longitude especially as a node sequence including an intersection allows only necessary information to be accumulated. Moreover, matching such as a search can be efficiently performed later.

The destination predicting unit 114 predicts a prospective destination of the user based on current driving of the user and the accumulated travel histories. The accumulated travel history reflects a movement tendency of the user. For example, matching the travel history with the current driving, the prospective destination can be predicted. The prospective destination can be predicted by searching the travel history at the searching unit 107, using the current driving detected by the position information detecting unit 101 as a search key, for example. Hereinafter, the above shall be described, using the drawings.

Figure 34:
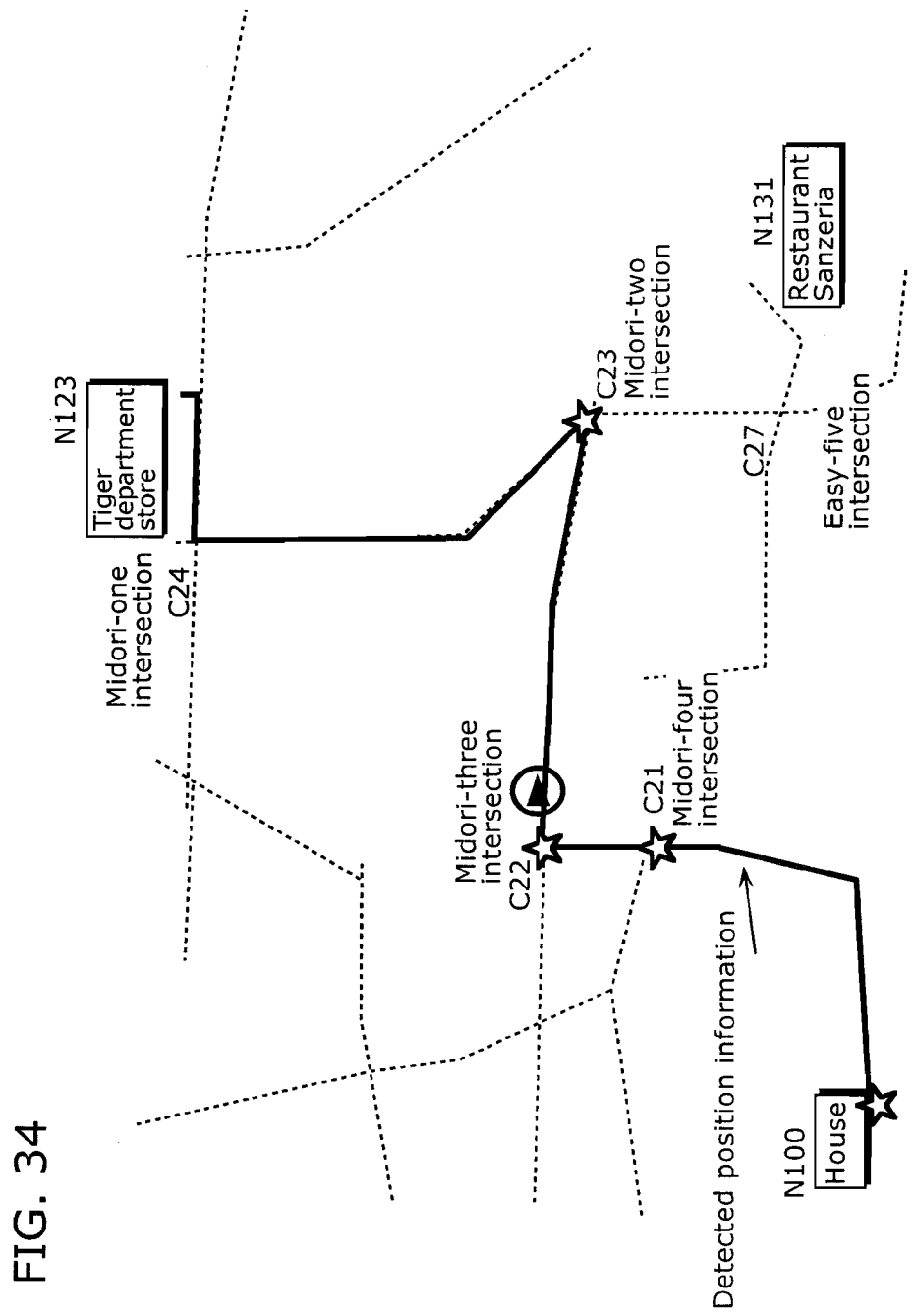
FIG. 34 shows a driving route including a current position of the user.

FIG. 34 shows a driving route including a current position of the user. As shown in FIG. 34, now, the user has left his or her house, gone strait at the green-four intersection, and been at a position at which the user has made a right turn at the green-three intersection. The searching unit 107 searches the travel histories accumulated in the travel history accumulation unit 105 based on a travel route on which the user is currently driving.

FIGS. 35A, 35B and 35C describe how a search is conducted out of the histories. FIG. 35A exemplifies a travel history subject to the search. FIG. 35B exemplifies a node sequence, until a current driving point, including a starting point. FIG. 35C exemplifies a search result when travel histories shown in FIG. 35A are searched out, using the search key shown in FIG. 35B. As shown in FIG. 35B, representing that the moving object has left the "house" and passed "green-four intersection" and "green-three intersection", the current driving point (referred to as "current driving", hereinafter) is converted into a node sequence. The searching unit 107 searches out a history, using the node sequence of the current driving as a key. For example the history ID "001" shown in FIG. 35A indicates that the user has left the "house", passed the "green-four intersection" and "green-three intersection", and arrived at the destination the "Tiger Department Store". Sequences of the current driving until the "green-four intersection" and of the history of a visit to this the "Tiger Department Store" correspond until the "green-four intersection. Hence, a prediction is made in that the user probably also visits the "Tiger Department Store" this time. Meanwhile, the history ID "005" also leaves the "house", passes the "green-four intersection" and the "green-three intersection", and arrives at the destination "Hanamachi 3-1", corresponding to the current driving. Thus, the user possibly visits the destination "Hanamachi 3-1". Further, the history ID "007" as well leaves the "house", passes the "green-four intersection" and the "green-three intersection", and arrives at the destination, the "Sanzeria", corresponding to the current driving. Hence, the number of histories corresponding to the current driving is not always one; instead, a plurality of histories may correspond to the current history. Thus, frequency of these destinations is calculated, so that the most frequent destination is predicted as a prospective destination, for example.

In this example, as shown in FIG. 35C, frequency of the "Sanzeria" counts "six times", the "Tiger Department Store" "five times", and "Hanamachi 3-1" "five times". Thus, the Sanzeria is predicted as the prospective destination.

Figure 36:
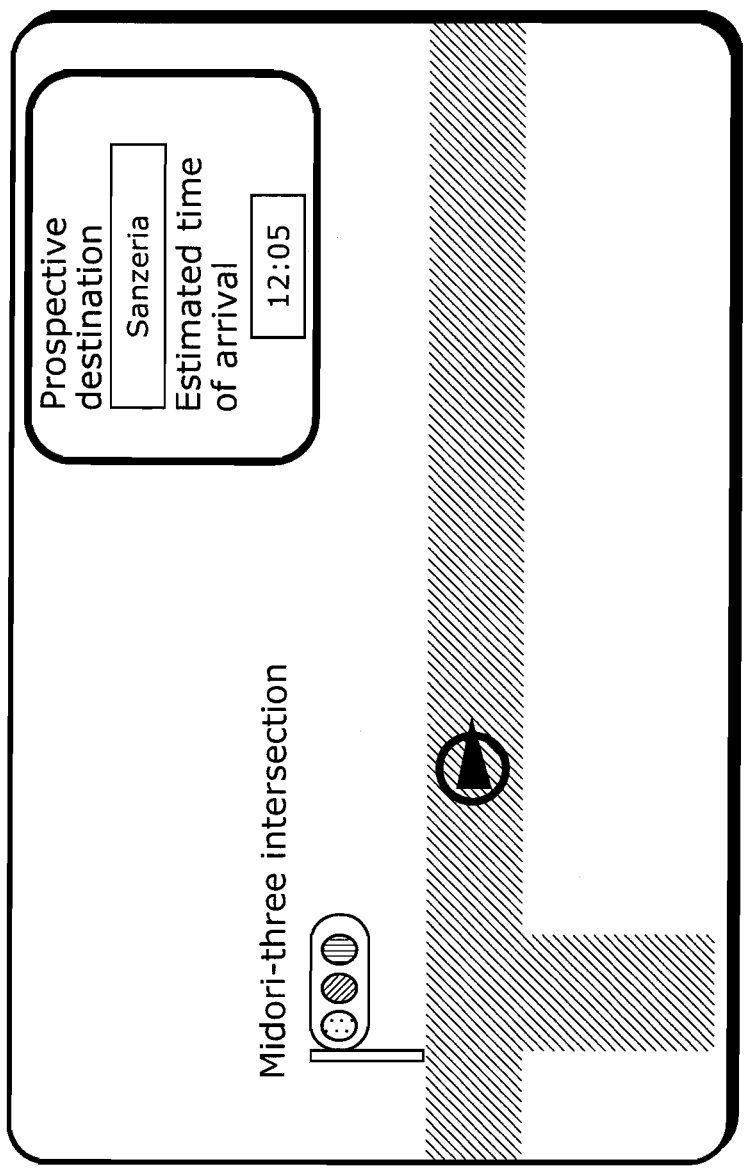
FIG. 36 shows an example displaying information on a prospective destination in a displaying unit shown in FIG. 29.

FIG. 36 shows an example displaying information on a prospective destination in the displaying unit 108 shown in FIG. 29. The displaying unit 108 shown in FIG. 36 is a display monitor of a car navigation system, for example. The current position of the user and a map nearby are shown on the monitor of the car navigation system. On the monitor, the user has just made a right turn at the green-three intersection. Moreover, the "Sanzeria" is predicted by the above technique as the prospective destination. On the upper 1o right of the monitor, information on the prospective destination is shown, such as the prospective destination, the "Sanzeria", and an estimated time of arrival "12:05".

As described above, the travel history reflects on the movement tendency of the user. A use of the history is taken advantage of for predicting a prospective destination of the user out of the current driving. As shown in the first embodiment, however, simply accumulating an arrival point as a destination cannot necessarily predict a destination with accuracy. Hereinafter, the above shall be described, using the drawings.

Figure 37:
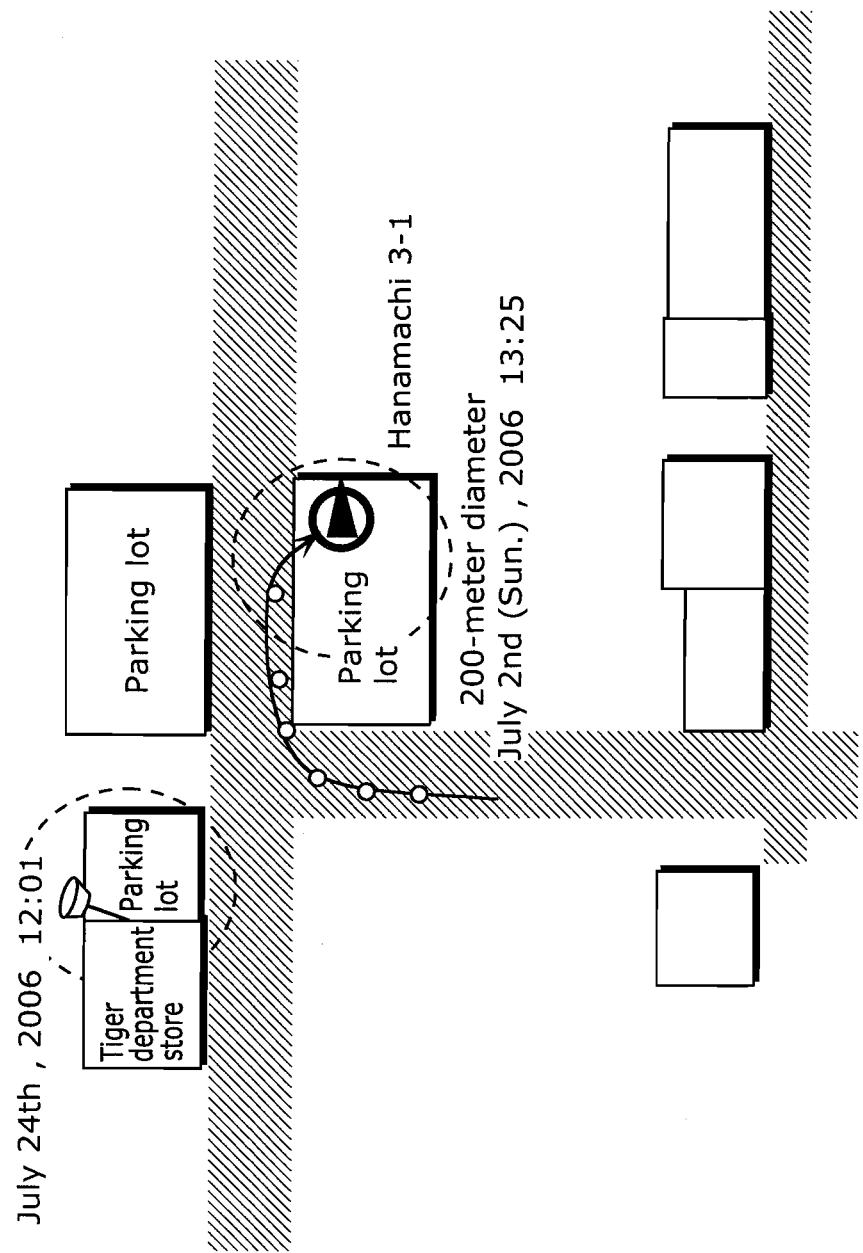
FIG. 37 shows how a destination of the user and a history thereof are accumulated.

FIG. 37 shows how a destination of the user and a history thereof are accumulated. First, at the date of "12:01, Jun. 24, 2006", the user arrived at a parking lot. The Tiger Department Store exists within a pre-detected range of a relevant point (within a 200-diameter, for example). The history is to be accumulated as an arrival to the Tiger Department Store. Meanwhile, the user arrived at a different parking lot at the date of "13:25, Jul. 2, 2006". This parking lot is designated as the second parking lot of the Tiger Department Store, for example. The FIG. 37 shows that the user also arrived at the Tiger Department Store on July 2nd. However, no relevant facility exists within the pre-detected range of the parking lot (within a 200-meter diameter, for example). Thus, the history of the destination is preliminary accumulated as the address "Hanamachi 3-1". Recent appearance of comprehensive facilities has been introducing facilities having a large parking lot or a plurality of parking lots. In such facilities, destinations end up being accumulated as different positions depending on parking positions. Further, in an area where street parking is prohibited, the user often uses a nearby pay parking lot. Thus, a simple use of only an arrival point causes destinations to be accumulated as different positions depending on an arrival point. Accumulation of the destinations as different histories, even though the destinations should be regarded as the same destination, can affect destination prediction using the histories.

As a history corresponding to the current driving in FIG. 35C, for example, the "Sanzeria" counts six times, the "Tiger Department Store" five times, and "Hanamachi 3-1" five times. Since frequency of the "Sanzeria" is the greatest, the "Sanzeria" is calculated as the prospective destination. Actually, however, the point accumulated as "Hanamachi 3-1" stands for a visit to the Tiger Department Store. Thus, regarding the count of the Tiger Department Store as ten times and the prospective destination as the "Tiger Department Store" can be said as the prediction reflecting the movement tendency of the user most. Hence, the present invention intends for editing a history accumulated as an unknown point as mentioned above, using accumulation of a known point, so that movements of the user can accurately predicted.

Similarly to the first embodiment, the unknown point extracting unit 109 extracts an unknown point. Then, the known point extracting unit 110 also extracts a known point, similarly to the first embodiment. Then, the editing rule accumulated in the history editing rule accumulation unit 112 is referred to at the history editing detecting unit 111, and a name of the known point is edited as a name of the unknown point at history editing unit 113.

Figure 38:
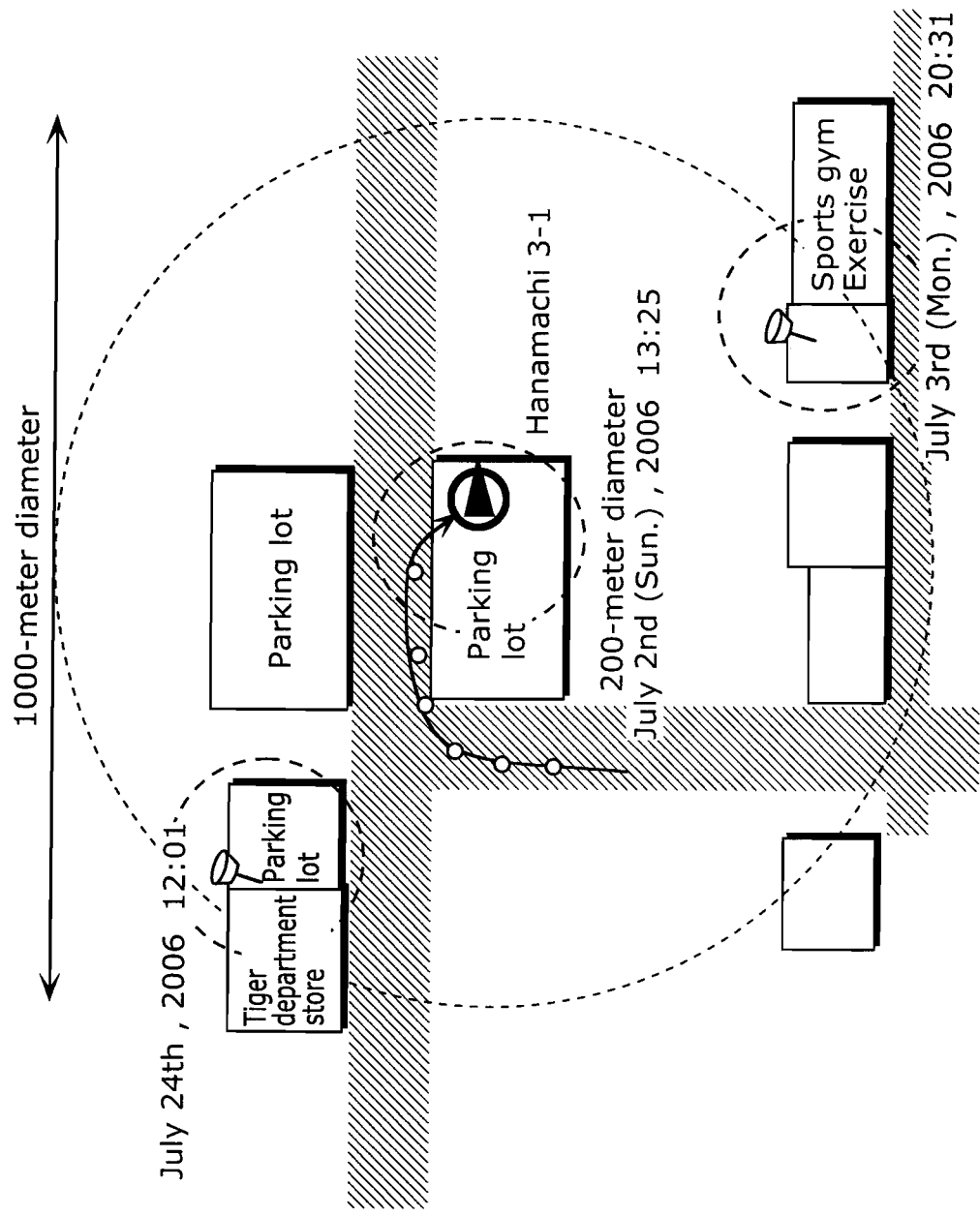
FIG. 38 shows how the history is edited.

FIG. 38 shows how the history is edited. Now, "Hanamachi 3-1" is preliminary accumulated in the travel history accumulation unit 105 as a name of an arrival point. The unknown point extracting unit 109 extracts a relevant point as an unknown point. Then, the known point extracting unit 110 extracts a known point existing within a pre-detected range (a 1000-meter diameter, for example) out of histories. The Tiger Department Store is extracted. After that, the history editing detecting unit 111 judges whether or not an edit is possible. It is noted that increasing a distance as described above possibly causes a plurality of facilities to correspond. In FIG. 38, for example, the "Sport Gym Exercise" ends up existing within a 1000-meter diameter. In view of a plurality of facilities corresponding as described above, the edit is performed in accordance with the editing rule in the first embodiment. Specifically, a rule regarding a time and a day is accumulated in the history editing rule accumulation unit 112. The history editing detecting unit 111 has judged whether or not the history is editable in accordance with the rule. In the second embodiment, for example, a starting point and a route to a relevant destination are referred, and thus, a judgment is made based on a degree of coincidence of the route.

FIG. 39 shows an editing technique of the history in the second embodiment based on a degree of coincidence of the travel history. As shown in FIG. 39, the travel history accumulated as the relevant unknown point "Hanamachi 3-1" is accumulated as the history ID "005". Meanwhile, histories of the known points the "Tiger Department Store" and the "Exercise" included within a pre-detected range are accumulated as the history ID "001", and the history ID "012", respectively. Here, the history editing detecting unit 111 refers to each of travel routes to judge the degree of coincidence. For example, a route of the history ID "005" includes the house, the green-four intersection, the green-three intersection, the green-two instruction, and the green-one instruction.

Meanwhile, a route of the history ID "001" also includes the house, the green-four intersection, the green-three intersection, the green-two instruction, and the green-one instruction. Since five nodes out of the five nodes coincide, the coincidence is calculated to be 100% (5/5=1), for example. On the contrary, the history ID "012" includes the Hanamachi company, the kyou-eight intersection, the kyou-seven intersection, the kyou-six intersection, and the kyou-five intersection. Since zero node out of five nodes coincides, the coincidence is calculated to be 0% (0/5=0). This is because even though the Exercise is included within a 1000-diameter; namely a pre-detected range, from the unknown point "Hanamachi 3-1", the user heads for the Exercise on the way from his or her company. Thus, the degree of coincidence of the route is significantly different. As described above, positions with significantly different movement tendency, such as a travel route, for example, often represent different destinations even tough the positions are positioned in a pre-detected range. Hence, using the degree of coincidence of the route to judge availability of a history edit allows a history accurately following movements of the user to be accumulated.

For example, a threshold of coincidence is assumed to be accumulated in the history editing rule accumulation unit 112. For example, when the coincidence is equal to 90% or greater, the history is judged to be editable. In this case, the coincidence between "Hanamachi 3-1" and the "Tiger Department Store" is 100%, equal to the threshold or greater. Thus, the edit of the history is judged to be available. As the result of the above, "Hanamachi 3-1" is edited as the "Tiger Department Store" in the history ID "005" of FIG. 39.

Similarly to FIG. 35, FIGS. 40 describe a prediction of the destination. FIG. 40A exemplifies travel histories subject to the search. FIG. 40B exemplifies a node sequence until the current driving point, including the starting point. FIG. 40C exemplifies a search result when the travel histories shown in FIG. 40A are searched, using the search key shown in FIG. 40B. As shown in FIG. 40B, the "green-four intersection" and the "green-three intersection", following departure from the "house" are detected as the current driving point by the node converting unit 103. The searching unit 107 searches the histories with a use of the current driving as a key, and the destination predicting unit 114 predicts a destination. FIG. 40A shows histories edited by the history editing unit 113. Specifically, "Hanamachi 3-1" in the history ID "005" is edited as the "Tiger Department Store". Then, destinations, having corresponding routes to the current driving, are calculated such that the Sanzeria counts six times and the Tiger Department Store counts ten times in frequency. Accordingly, the "Tiger Department Store" is calculated as the prospective destination.

Figure 41:
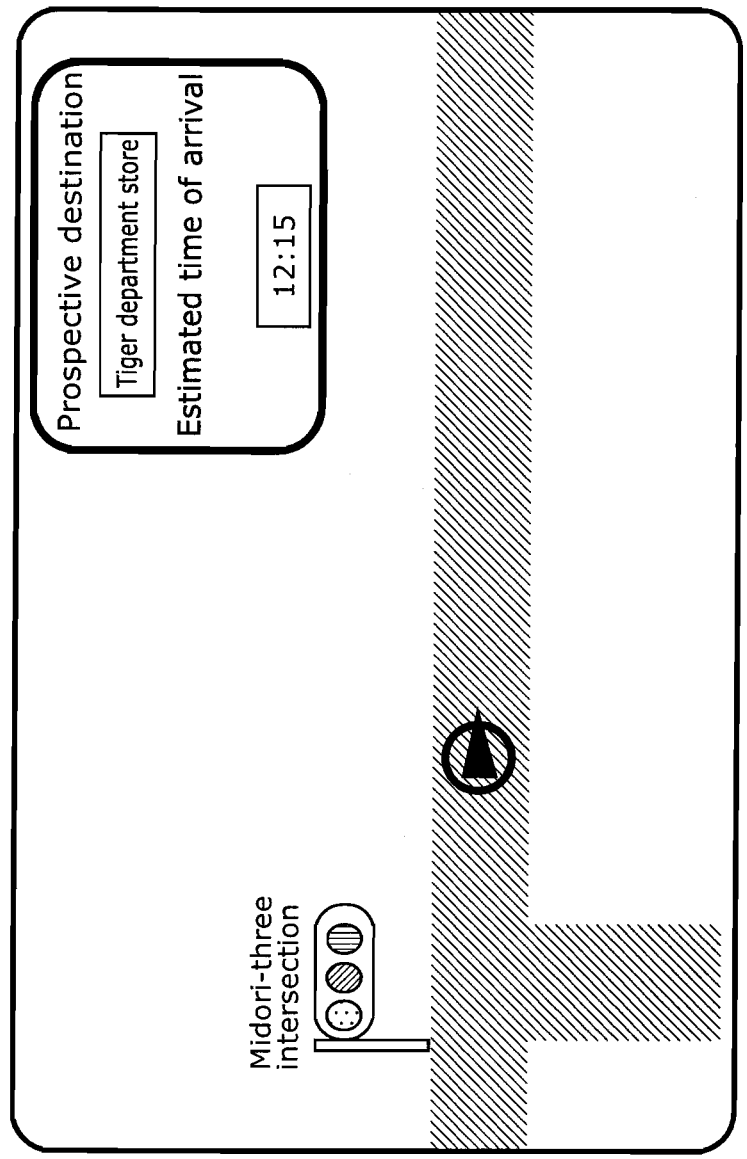
FIG. 41, similar to FIG. 36, is information on the prospective destination shown on a display screen of a car navigation system.

FIG. 41, similarly to FIG. 36, illustrates information on the prospective destination shown on the display screen of the car navigation system. As the prospective destination, the "Tiger Department Store" is displayed. In FIG. 36, the prospective destination is accumulated as the unknown point "Hanamachi 3-1"; namely a different point from the "Tiger Department Store", and thus the movement tendency of the user cannot be accurately predicted. Meanwhile, by editing a name of the unknown point with a use of the known point accumulated in the travel history accumulation unit 105, a destination reflecting more on the movement tendency of the user can be accurately predicted.

Figure 42:
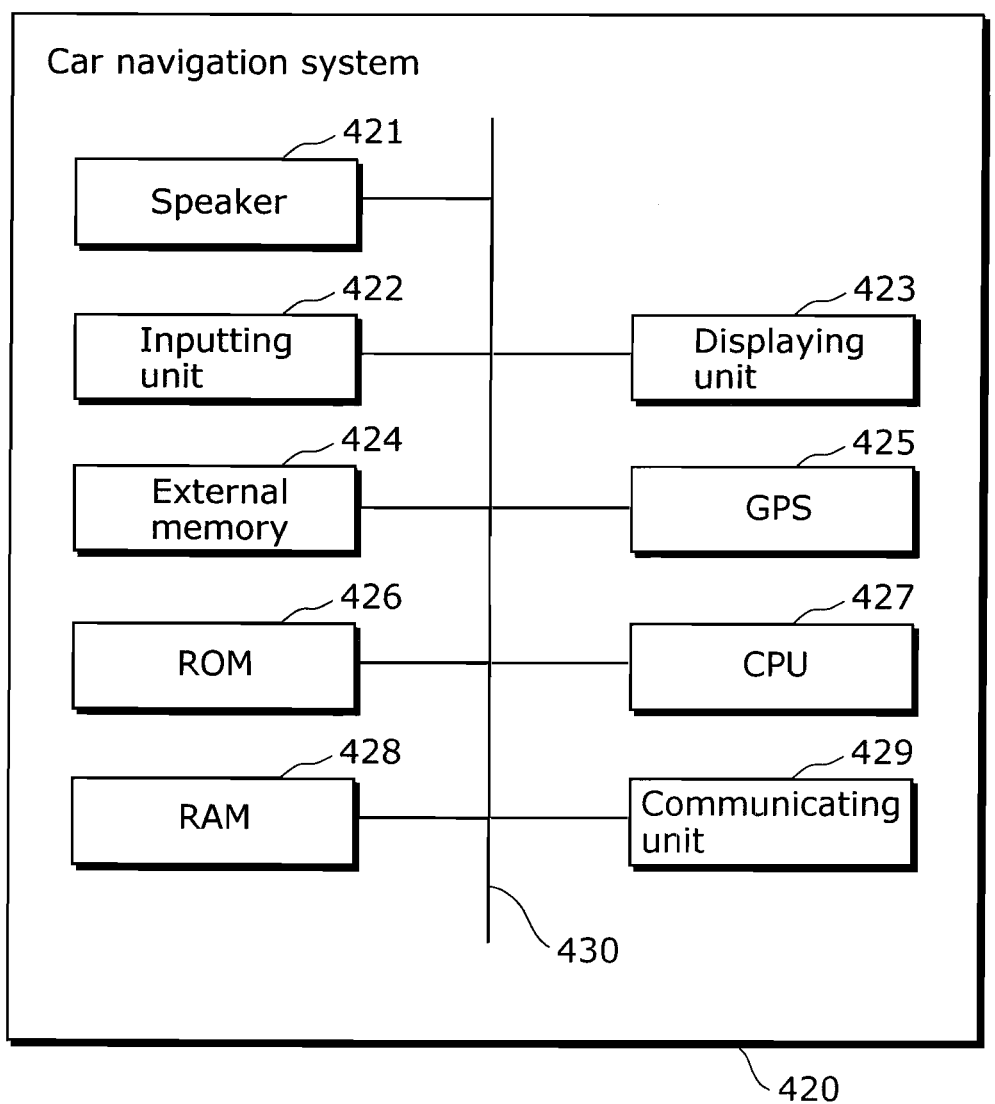
FIG. 42 is a block diagram exemplifying a hardware structure of a car navigation device including the travel history editing device in the present invention.

FIG. 42 is a block diagram exemplifying a hardware structure of a car navigation device including the travel history editing device in the present invention. As shown in FIG. 42, a car navigation device 420 in the present invention includes a speaker 421, an inputting unit 422, a displaying unit 423, an external memory 424, a GPS 425, a Read Only Memory (ROM) 426, a Central Processing Unit; namely a processor (CPU) 427, a Random Access Memory (RAM) 428, a communicating unit 429 and a bus 430.

The speaker 421 provides in synthetic speech an instruction in how to operate the inputting unit 422 in order to set the destination, and guidance such as information on the current position. The inputting unit 422, including a touch panel and an operation button, for example, corresponds to the search key entering unit 106 and the inputting unit shown in FIG. 6. The inputting unit 422 receives, from the user, an input of a search key and of destination setting. The displaying unit 423, a liquid crystal display, displays information on a travel route to a destination and a prospective destination. The external memory 424, a large capacity memory such as a DVD and an IC card, accumulates map information, an editing rule, and a travel history. The external memory 424 stores a program loaded onto the RAM 428 to be executed upon activating the car navigation device 420. The GPS 425 obtains the current position of the moving object (latitude and longitude), utilizing an electrical wave from a GPS satellite. The ROM 426, a non-volatile read-only semiconductor memory, stores a start-up program for the car navigation device 420. By executing the programs stored in the ROM 426 and the RAM 428, the CPU 427 implements each of processing units in the travel history editing device shown in the block diagrams in FIGS. 1, 19, 21, and 29, and each of processing units not shown in the car navigation device 420. The RAM 428, a volatile random access semiconductor memory, supplies the loaded program to the CPU 427 upon activating the car navigation device 420, as well as offers operational space by holding in-process data by the CPU 427. The communicating unit 429: implements a communicating unit for establishing a car-to-car communication which is not shown and a communication to a road information system; and performs transmission and reception of data via an infrared communication and a short-range radio communication. The bus 430, a parallel data transfer route in the car navigation device 420, performs data transfer between each of the processing units.

(Third Embodiment)

Figure 43:
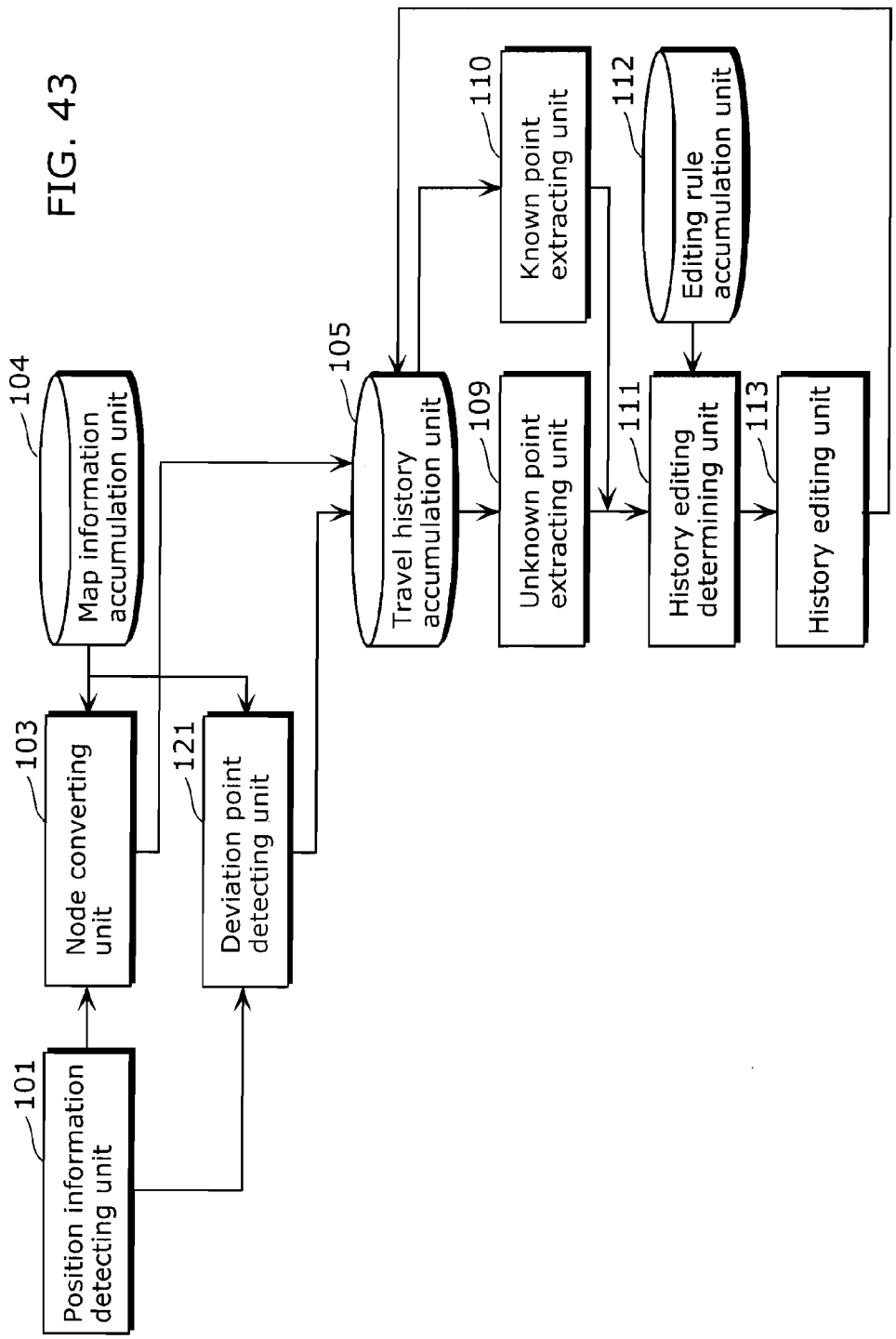
FIG. 43 is a system structure of a third embodiment.

FIG. 43 is a system structure of a third embodiment. Hereinafter, each of structural elements shall be described, followed by an operational flow of the present invention.

Similarly to the first embodiment, the position information detecting unit 101 detects position information of the user.

Figure 44:
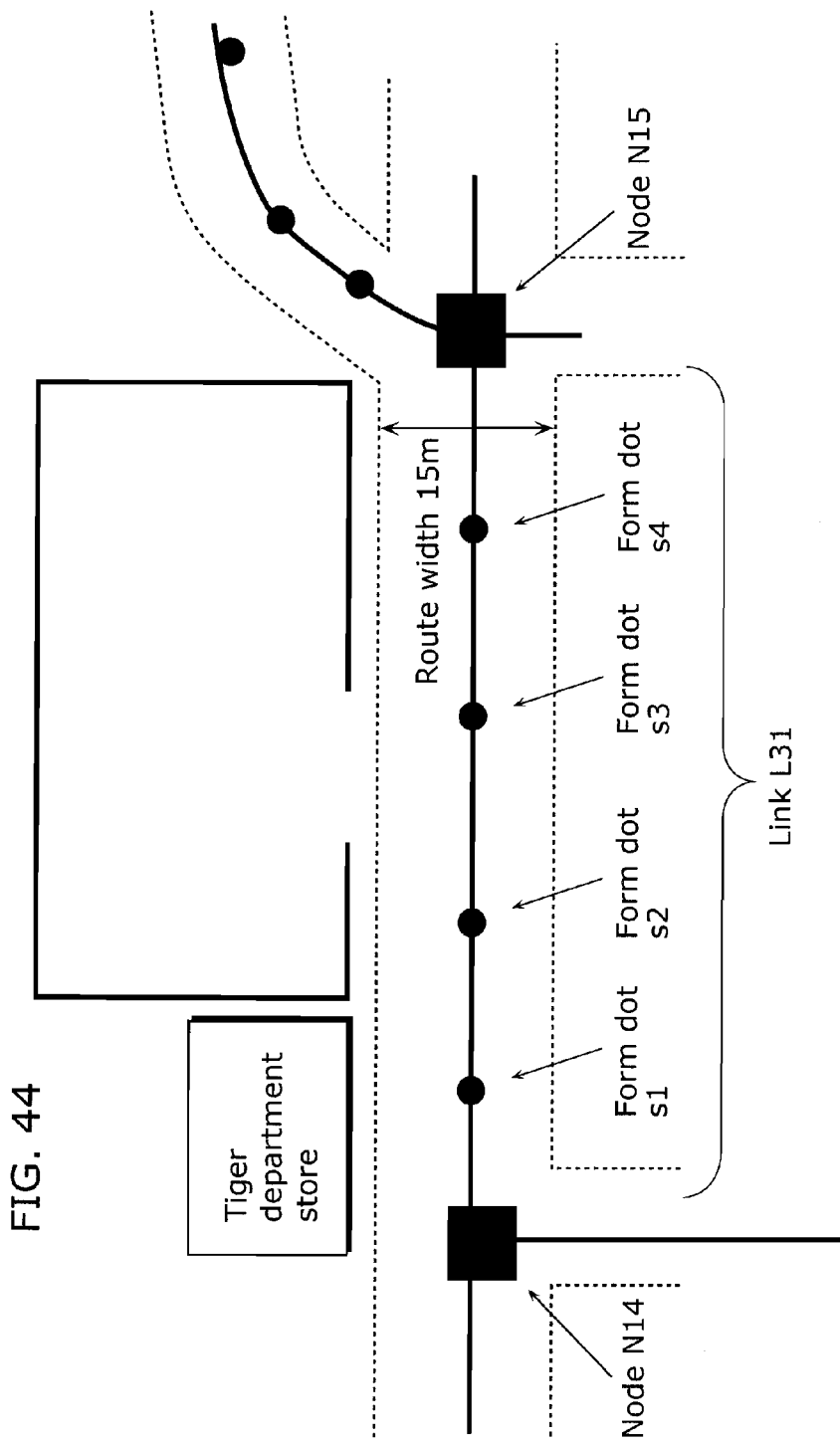
FIG. 44 exemplifies a route displayed using route information including nodes and links.
Figure 45:
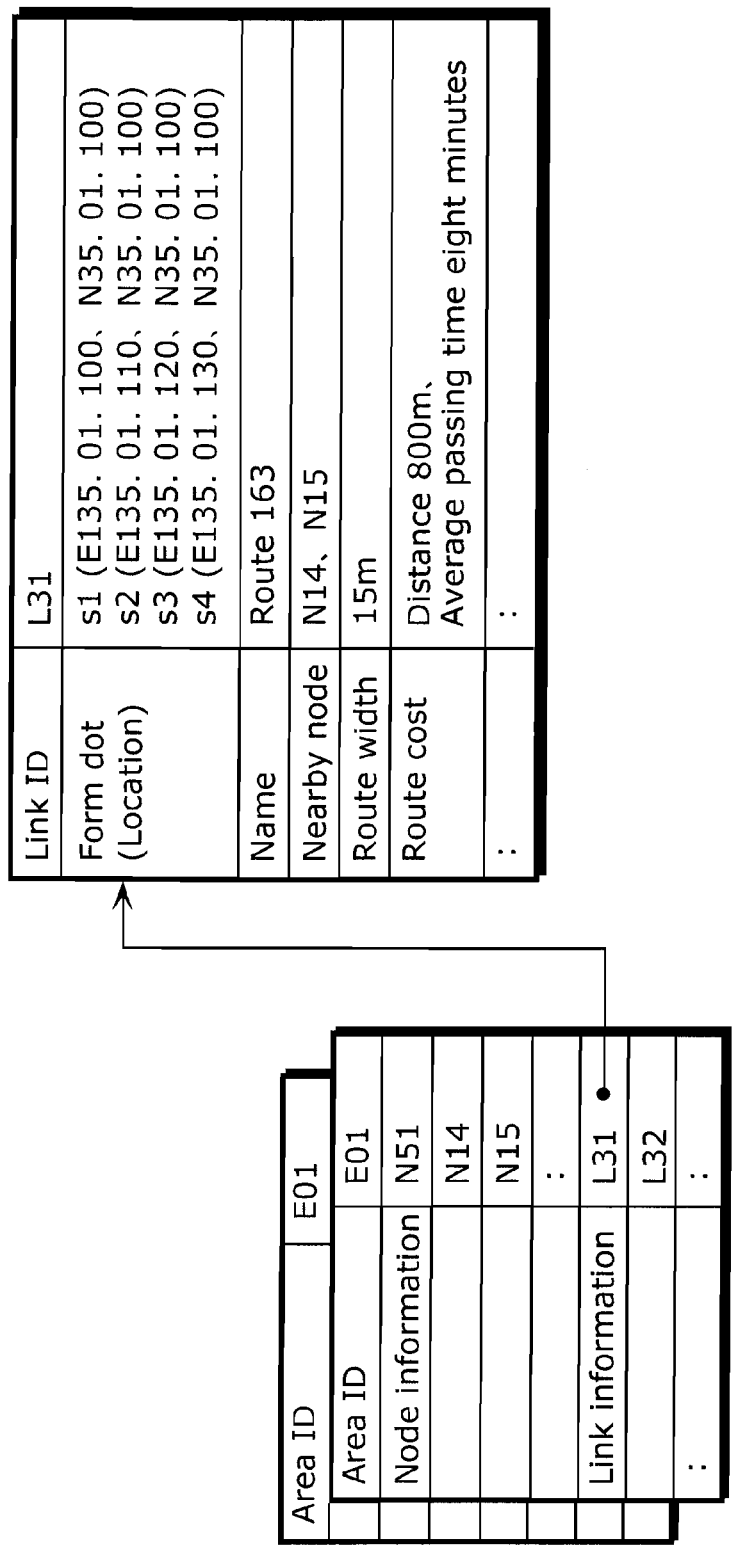
FIG. 45 exemplifies the route information displaying the route shown in FIG. 44 in a form of data.

Further, the map information accumulation unit 104 exemplifies a map information accumulation unit accumulating route information showing an area of a route. The route information accumulated in the map information accumulation unit includes route width information indicating a width of the route. Similarly to the first embodiment, the map information accumulation unit 104 accumulates map information. In the first and the second embodiments, the map information has been divided, on a pre-detected range basis, to indicate that information on a facility and a route existing in each of areas is accumulated. In addition, the route information shall be described, hereinafter. FIGS. 44 and 45 show an example of the route information out of the map information. In general, the map information accumulation unit 104 accumulates the route information including information in routes. The route information has a link connecting nodes, such as intersections, and a form dot forming the link. In addition, the route information includes route width information indicating a width of the route.

FIG. 44 shows a route indicated with route information at a point in a map. There exists a link "L31" connecting nodes "N14" and "N15; namely intersections (the nodes are represented in black squares). The link "L31" includes form dots "S1, S2, S3, and S4" (Black circles), forming a route (a straight route in the embodiment). Moreover, the route width of the link "L31" is 15 meters. This shows that the road shown in L31 is 15 meters in width.

FIG. 45 indicates the route information shown in FIG. 44 in a form of data. FIG. 45 shows that: an area shown in FIG. 44 is designated as an area ID "E01"; and the nodes "N51", "N14", and "N15" exist in the area ID "E01". Moreover, FIG. 45 shows that "L31" and "L32" exist as link information. Further, as detailed information of "L31", the form dots "S1, S2, S3, and S4" and positions of the form dots are shown in the latitude and longitude information, for example E (east longitude) 135. 01. 100, N (north latitude) 35. 01. 100. It is noted that the form dots can be indicated as a relative position of the X-coordinate and the Y-coordinate with respect to the latitude and longitude of the link due to data amount. In the embodiment, the form dots are also assumed to be accumulated in latitude and longitude information for a description. For example, in the map information accumulation unit 104, the form dots are accumulated in a data form shown in FIG. 45.

A deviation point detecting unit 121 exemplifies a deviation point detecting unit detecting a point at which position information, of the vehicle detected by the position detecting unit, either deviates from an area of a route shown in the route information, or returns to the route out of the route. The deviation point detecting unit 121 judges whether or not the position information, of the vehicle, deviates from the route based on the route information accumulated in the map information accumulation unit 104 and the position information detected by the position information detecting unit 101.

Figure 46:
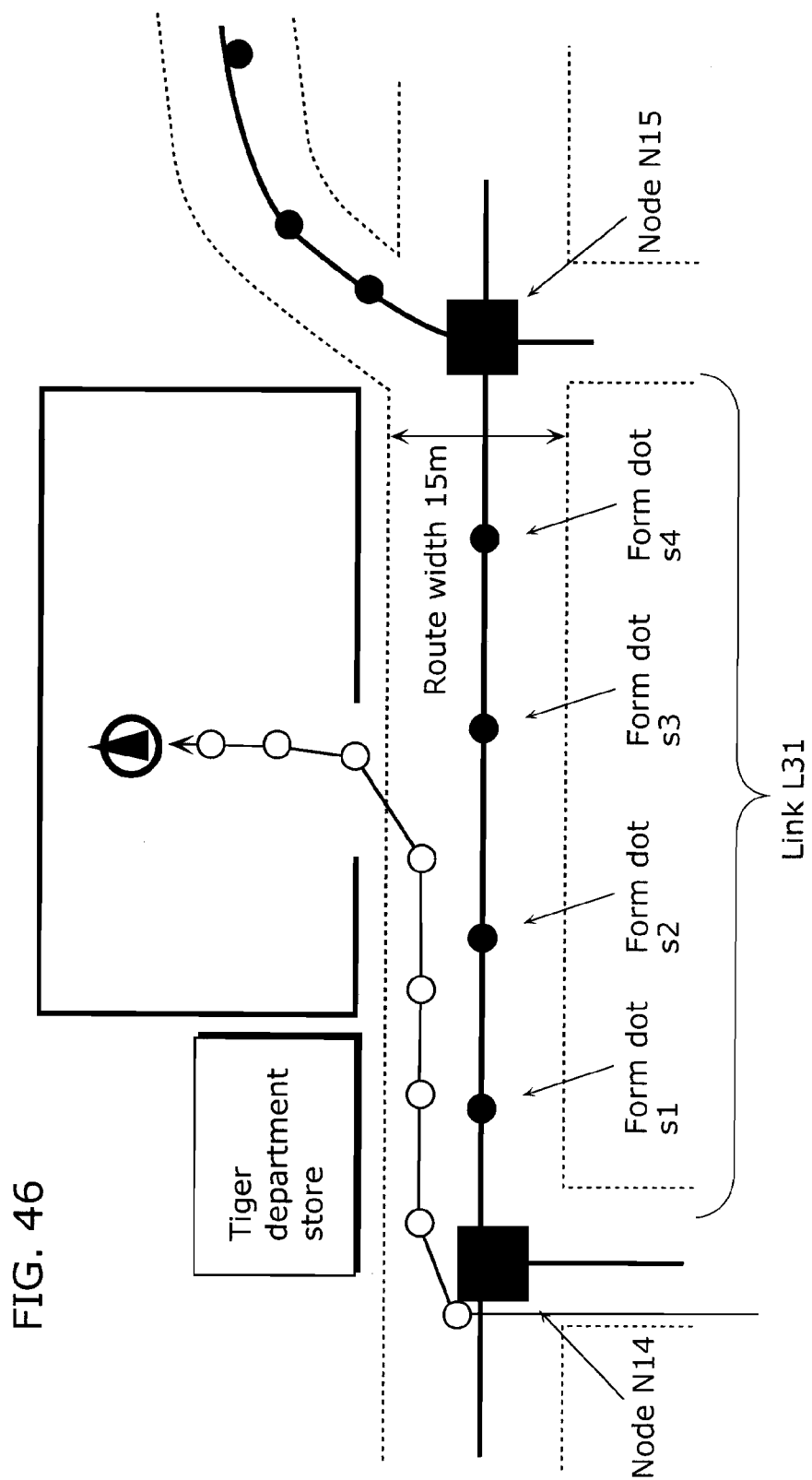
FIG. 46 shows that the user deviates from the route by making a left turn, and enters a parking lot of the Tiger Department Store.
Figure 47:
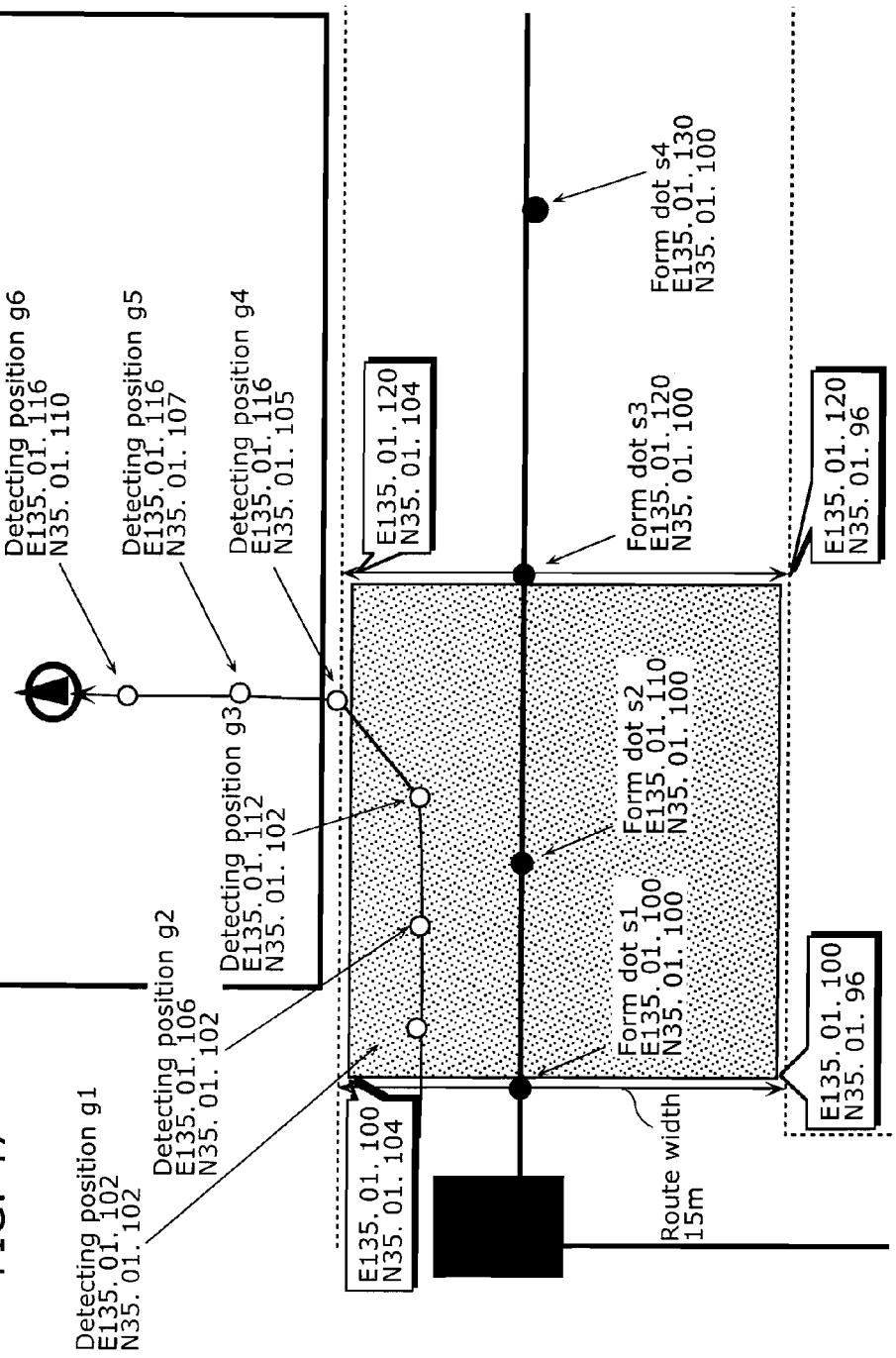
FIG. 47 is a diagram enlarging how the user enters into the parking lot in FIG. 46.

FIGS. 46, 47, and 48 show deviation from a route. FIG. 46 shows that the user turns right at an intersection and then turns left on the route to enter the parking lot of the Tiger Department Store.

FIG. 47 is a diagram enlarging how the user enters into the parking lot in FIG. 46. The deviation point detecting unit 121 exemplifies a deviation point detecting unit regarding position information out of the route width as a deviation point in the case where the position information of the vehicle detected by the position detecting unit is detected as position information out of the route width. The deviation point detecting unit 121, first, refers to link information accumulated in the map information accumulation unit 104 based on current position information detected by the position information detecting unit 101. With respect to a detection position g1 "E135. 01. 102, and N35. 01. 102", nearby form dots include a form dot s1 "E135. 01. 100, and N35. 01. 100", and a form dot s2 "E135. 01. 110, and N35. 01. 100". Out of a 15-meter route width, the deviation point detecting unit 121 judges whether or not a detection position is positioned on the route.

Here, latitude and longitude can be converted metric-wise such that latitude of one minute is approximately two kilometers, and longitude of one minute is approximately 1.3 kilometers. Accordingly, latitude of a one thousandth minute is calculated as approximately two meters, and longitude of a one thousandth as approximately 1.3 meters.

In the case of FIG. 47, assuming the route width to be 15 meters; that is, each lane is assumed to be 7.5 meters, one endpoint of the route is 35. 01. 104 north latitude. In other words, when a detecting point is positioned within (on or below) this north latitude, the detecting point is on the route, and when the detecting point crosses over this north latitude, the detecting point is out of the route. In the case of FIG. 47, the detecting positions g1, g2 and g3 are to be judged to be positioned on the route. Next, a detecting position g4 shall be described. The position of the detecting point g4 is "E135. 01. 116, and N35. 01. 105". Nearby form dots of the detecting position g4 include the form dot s2 "E135. 01. 110 and N35. 01. 100" and the form dot s3 "E135. 01. 120, and N35. 01. 100". Then, the road width is 15 meters as described above. Thus, when the detecting point is positioned within 35. 01. 104 north latitude (on or below), the detecting point is on the route, and when the detecting pointed crosses over this north latitude, the detecting point is positioned out of the route. The north latitude of the detecting position g4 is N35. 01. 105, which crosses over N35. 01. 104 north latitude. Thus, the detecting position g4 is positioned out of the route. Hence, the deviation point detecting unit 121 judges the position detected out of the route as described above as a "route deviation point"; namely, a point deviating from a route.

It is noted in the embodiment that a detected position is not simply regarded as a deviation point; instead, a detecting position around the detected position is referred in order to judge the route deviation point. In other words, the deviation point detecting unit 121 exemplifies a deviation point detecting unit regarding position information out of the route width as a deviation point in the case where the position information of the vehicle detected by the position detecting unit is detected a plurality of consecutive times as position information out of the route width. This is to prevent an erroneous decision because the GPS include some errors in the detection accuracy, and there is a case where the position information is detected as out of the route even though the vehicle runs on the route. Specifically, the deviation point detecting unit 121 avoids making a quick judgment just because a point has deviated; instead, the deviation point detecting unit 121 makes a judgment with the next detecting position, for example. This can accurately detect a point at which the user has actually deviated from the route, instead of a point of deviation which an error of the GPS inadvertently indicates.

In the case of FIG. 47, for example, a detecting position g5 is "E135. 01. 116, and N35. 01. 107", showing that the detecting position g5 deviates from the route. In this case, when one detecting position before is referred; namely the detecting position g4, g4 is "E135. 01. 116, and N35. 01. 105" deviating from the route. Hence, this is regarded not as an error but as driving actually deviated from the route, and the deviation point detecting unit 121 judges g4 as a deviation point.

FIG. 48 shows the position information detected by the position information detecting unit 101. Similarly to the second embodiment, the latitude and longitude information detected by the position information detecting unit 101, including "135. 01. 102" east longitude and "35. 01. 102" north latitude is accumulated. In the third embodiment, "135. 01. 116" east longitude and "35. 01. 105" north latitude are detected as a "deviation point" by the deviation point detecting unit 121. Further, similarly to the second embodiment, an arrival point "135. 01. 138." east longitude and "35. 01. 114" north latitude is detected as an arrival point in the node converting unit 103.

FIG. 49 shows travel histories accumulated in the travel history accumulation unit 105. In the third embodiment, similarly to the second embodiment, facilities nearby an arrival point are accumulated in the travel history accumulation unit 105 as names of relevant points of arrival with reference to the map information. In FIG. 49, for example, the arrival point "E135. 01. 102 and N35. 01. 108" is accumulated under a travel history ID "010" as the name the "Tiger Department Store". It is noted that a destination name may be automatically provided with reference to the map information, or the user may select the destination name out of presented candidates of destination names. Further, the user may manually provide for the destination name.

However, it is troublesome for the user to provide for a name on an arrival basis. Desirably, the name is automatically provided. Meanwhile, simply naming the destination after a nearby facility in accordance with the map information causes a different name to be provided in the case where the user arrives at a different point, crossing over a pre-detected range. Thus, in the embodiment, a name is automatically provided based on a deviation point.

In the embodiment, the travel history accumulation unit 105 is an example of arrival point history accumulation unit accumulating a deviation point or a returning point, along with the position information and the name information of the arrival point, detected by the deviation point detecting unit. The travel history accumulation unit accumulates the arrival point history with the arrival point, the destination name, and further the deviation point added. In the travel history shown in FIG. 49, "E135. 01. 116 and N35. 01. 105" under the travel history ID "010" is accumulated as a deviation point.

The unknown point extracting unit 109, similarly to the second embodiment, extracts a point with no destination name provided out of the points of arrival accumulated in the histories since no relevant facility exists. The known point extracting unit 110 extracts a point with a destination name provided (known point) out of the points of arrival accumulated in the histories. In addition, similarly to the second embodiment, a relevant facility existing within a pre-detected range is automatically provided as a name of the point, or the user himself or herself provides for the name of the point. In the case of FIG. 49, for example, the name of the destination name "Tiger Department Store" is provided for the travel history ID "010", and the destination name is extracted as the known point. Meanwhile, the travel history ID "011" is regarded as a history of current driving, and thus the name has not been provided. Hence, the history is to be extracted as an unknown point.

Similarly to the second embodiment, the history editing detecting unit 111, a unit to judge an edit of the name of the unknown point based on the known point, refers to the editing rule accumulated in the history editing rule accumulation unit 112. The name of the unknown point is edited by the history editing unit 113.

Figure 50:
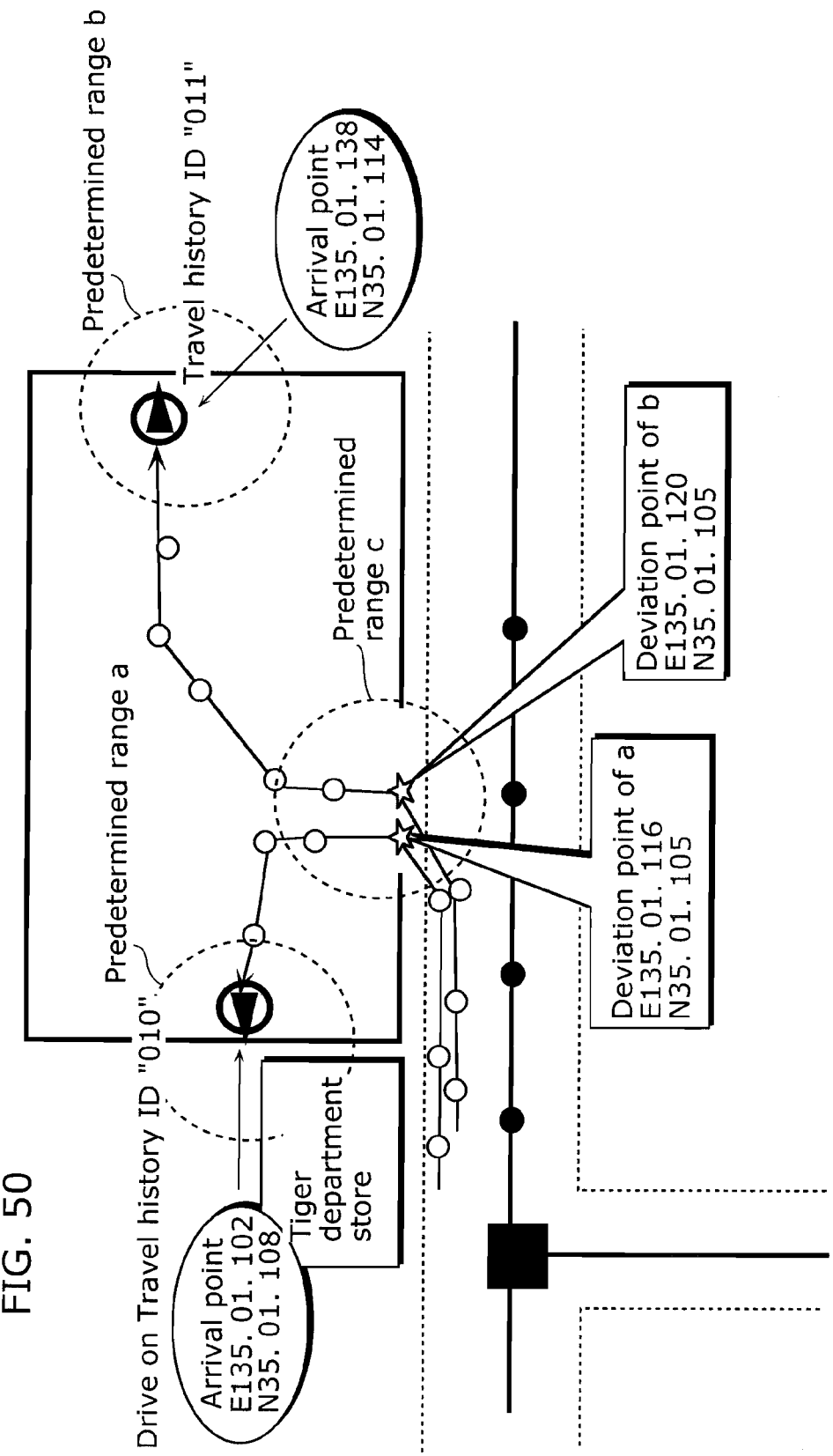
FIG. 50 explains how a history is edited.

FIG. 50 shows how the history is edited. FIG. 50 shows, for example, the travel histories shown in FIG. 49. The travel histories include the history of the travel history ID "010"; namely the known point, and the history of travel history ID "011"; namely the unknown point accumulated after current driving. Consequently, the travel, shown as the travel history ID "011" detected along with the current driving, is assumed to end at an upper right point in the parking lot "E135. 01. 138, and N35. 01. 114". In this case, for example, no relevant facility exists within a pre-detected range as shown in the second embodiment, and thus, no appropriate name can be provided. Thus, in the embodiment, a name is provided based on a deviation point. The history editing detecting unit 111, an example of a name editing unit, edits name information on the arrival point of the vehicle. The name information is on the arrival point added to the deviation point in the arrival point history accumulation unit in the case where the deviation point or the returning point detected by the deviation point detecting unit is within a pre-detected range from the deviation point or the returning point accumulated in the arrival point history accumulation unit.

In FIG. 50, the deviation point of the known point "Tiger Department Store" under the travel history ID "010" is "E135. 01. 116 and N35. 01. 105". Meanwhile, the deviation point of the unknown point under the travel history ID "011" is "E135. 01. 120 and N35. 01. 105". Here, the history editing detecting unit 111 searches a deviated history within a pre-detected range with respect to the deviation point of the unknown point "E135. 01. 120 and N35. 01. 105", and judges whether or not a relevant facility exists. For example, the history editing detecting unit 111 judges whether or not a point deviated within a 100-meter radius with the deviation point centered. It is noted in the embodiment that a rule formulating the above is assumed to be accumulated in the history editing rule accumulation unit 112. In the case of FIG. 50, the difference between the deviation point of the unknown point and the deviation point of the "Tiger Department Store"; namely the known point, is "E135. 01. 116, and n35. 01. 105" is as much as 0.004 minutes longitude (approximately equivalent to eight meters), and thus, the deviation point of the "Tiger Department Store" exists within the pre-detected range. Thus, this unknown point is judged as the "Tiger Department Store" and is edited at the history editing unit 113.

FIG. 51 shows histories edited in the history editing unit 113, and accumulated in the travel history accumulation unit 105. Compared with the histories shown in FIG. 49, the position name of the history ID "011"; namely the unknown point, is edited as the "Tiger Department Store" to be accumulated.

In the case of a large facility, the parking lot is significantly large. As a relevant arrival point, simply judging a nearby facility near an arrival point based on the map information alone cannot provide for an accurate name, which has caused problems when searching histories and in view of a user profile. Meanwhile, even though the parking lot is large as described above, most of entrances are confined. Thus, histories can be accurately accumulated by editing based on the deviation point from the route as shown in the embodiment.

Figure 52:
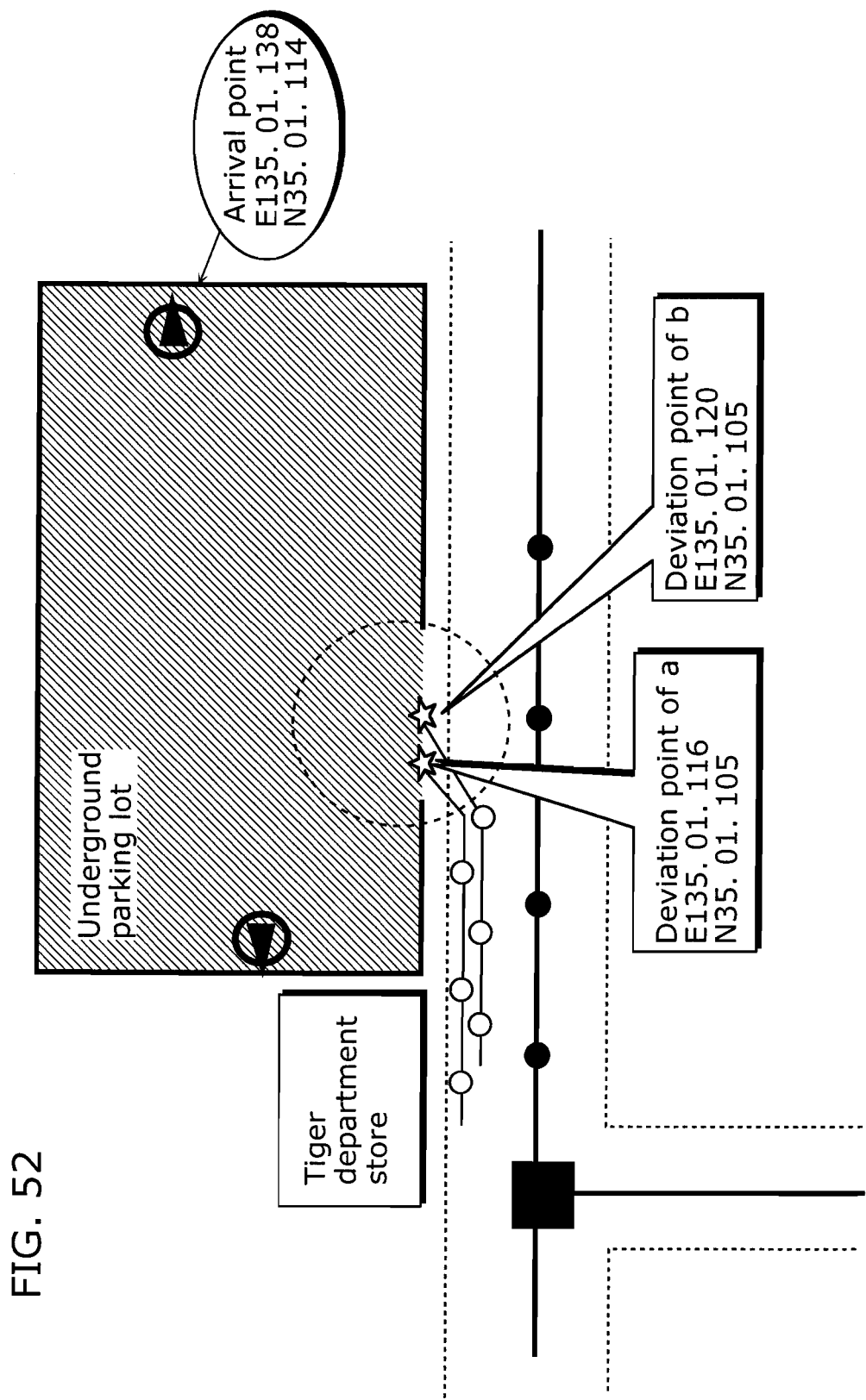
FIG. 52 exemplifies parking at an underground parking lot.

Further, the present invention is effective in the case of an underground parking lot and a multilevel parking garage undetectable by the GPS. FIG. 52 exemplifies parking at an underground parking lot. Most of underground parking lots and multilevel parking garages are not detected by the GPS. Conceivably, accuracy of the GPS is typically reduced since latitude and longitude is estimated to be complemented by an acceleration sensor embedded in the device. Moreover, the user needs to drive his or her vehicle circularly a plurality of times in order to go downstairs in the case of an underground parking lot and a multilevel parking garage. Hence, an error becomes great. In the above case, the vehicle is detected to be parked at a position significantly different from a previous parking position even in the same facility. As shown in the embodiment, however, when the vehicle deviates from the route, a vicinity of a parking lot entrance is detected as a deviation point and histories are edited based on the deviation point, so that the positions are judged to be in the same facility. Similarly to FIG. 50, the arrival point is judged as the "Tiger Department Store" in accordance with a deviation point "E135. 01. 116, and N35. 01. 105", and the deviation point "E135. 01. 120, and N35. 01. 105" in the case of FIG. 52, as well.

Figure 53:
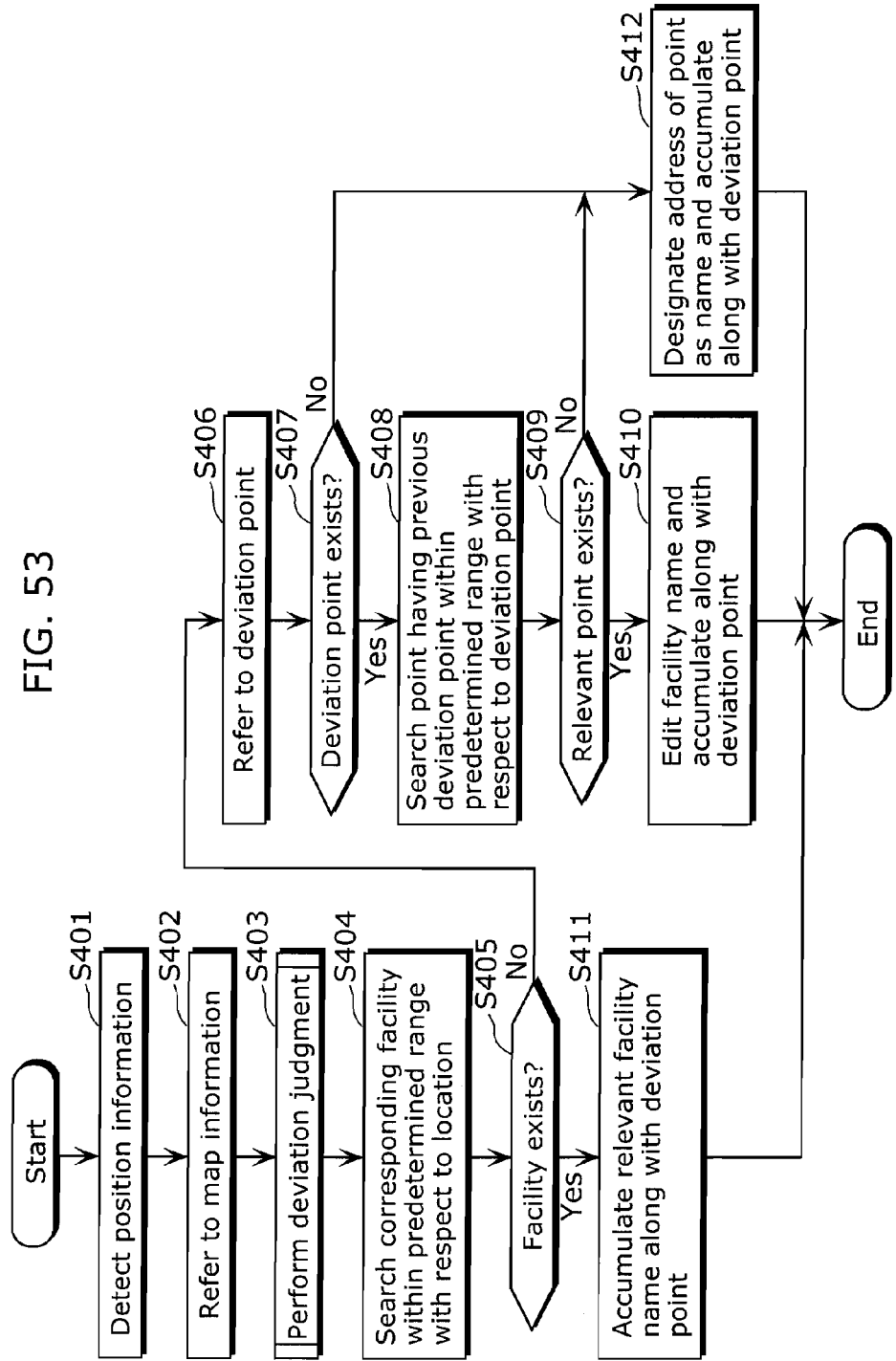
FIG. 53 is a flowchart showing an operation of the travel history editing device in the case where a destination is judged based on position relationship between a past and a present deviation points.
Figure 54:
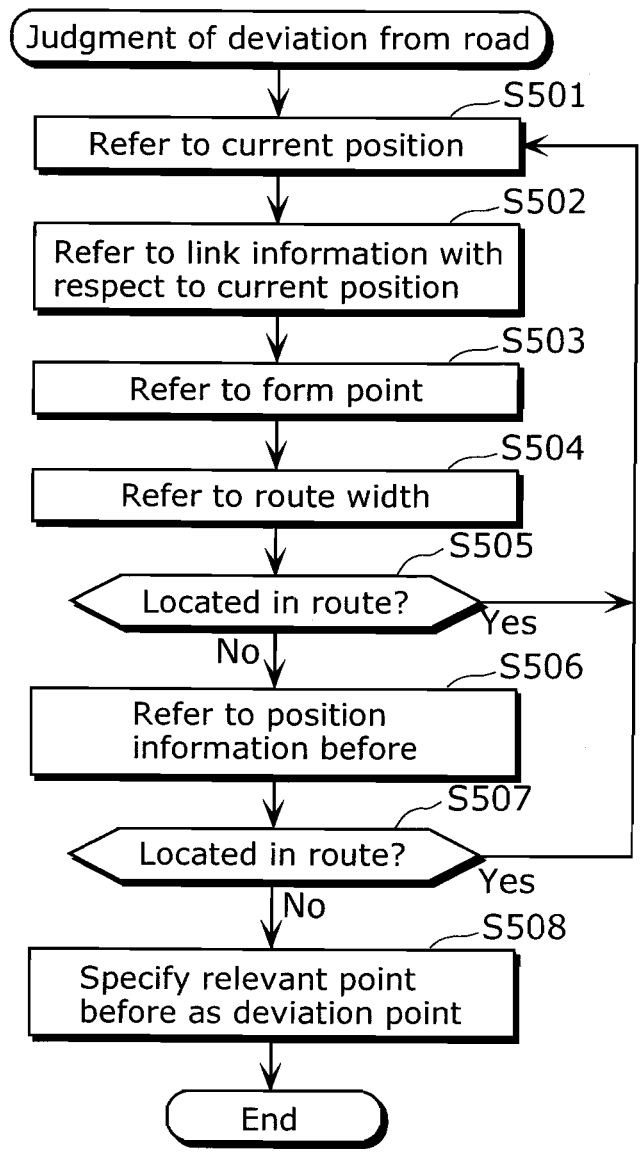
FIG. 54 is a flowchart showing an operation of a deviation point detecting unit in judging whether or not a vehicle deviates from a route.

FIG. 53 is a flowchart showing an operation of the travel history editing device in the case where a destination is judged based on position relationship between a past and a present deviation points. FIG. 54 is a flowchart showing an operation of a deviation point detecting unit in judging whether or not a vehicle deviates from a route. Hereinafter, an operation flow of the embodiment shall be described, using flowcharts in FIGS. 53 and 54.

First the position information detecting unit 101 detects position information (Step S401). Meanwhile, the map information accumulated in the map information accumulation unit 104 is referred (Step S402), and the deviation point is detected at the deviation point detecting unit 121 (Step S403).

The deviation point detecting unit 121 first refers to the position information detected by the position information detecting unit 101 (Step S501). Based on the current position, the deviation point detecting unit 121 refers to link information (Step S502), a form point (Step S503), and a route width (Step S504). Then, whether or not the user is in the route is judged (Step S505). When the user is in the route (Step S505: Yes), the flow goes back to Step S501, and goes back to a loop for referring to the position information detected by the position information detecting unit 101. Meanwhile, when the user is out of the route (Step S505: No), one set of the position information before is referred (Step S506) to judge whether or not the user is positioned in the route (Step S507). In the case where the one set of the position information before is in the route (Step S507: Yes), the flow again goes back to Step S501, and again goes back to the loop referring to the position information detected by the position information detecting unit 101 in order to prevent an error of the GPS and a mismatching error. Meanwhile, the one set of the position information before is out of the route (Step S507: No), the one position before is specified as a deviation point (Step S508), and goes back to the main loop.

Next, the node converting unit 103 searches out a relevant facility within a pre-detected range with respect to an arrival point. (Step S404). Whether or not the facility exists is judged (Step S405). When the facility exists, the flow goes to Step S411, and when the facility does not exist, the flow goes to Step S406.

When the relevant facility exists (Step S405: Yes), the name of the relevant facility is accumulated in the travel history accumulation unit 415 as the destination (Step S411). Meanwhile, when the facility does not exist, the history editing detecting unit 111 judges whether or not the name of the arrival point can be edited, using another travel history, and the history editing unit 113 edits a history. It is noted, in the embodiment that in the case where a relevant facilities does not exist, a description is provided such that processing is performed by the history editing unit 113 shown as follows; meanwhile, the relevant facility may temporarily be accumulated as a history, and a corresponding point may be extracted as an unknown point at the unknown point extracting unit 109.

First, the history editing detecting unit 111 refers to the deviation point judged by the deviation point detecting unit 121 (Step S406) in order to judge whether or not the deviation point exists (Step S407). When, the deviation point exists (Step S407: Yes), the flow goes to Step S408, and when the deviation point does not exist (Step S407: No), the flow goes to Step S412.

When the deviation point exists (Step S407: Yes), a point having the deviation point is searched within a pre-detected range with respect to the deviation point (Step S408). The history editing detecting unit 111 judges whether or not a relevant point exists (Step S409). When the relevant point exists (Step S409: Yes), the process goes to step S410. When the relevant point does not exist (Step S409: No), the process goes to Step S412.

When the relevant facility exists (Step S409: Yes), the history editing unit 113 edits the name of the facility (Step S410) to accumulate in the travel history accumulation unit 105. Meanwhile, when the relevant facility does not exist (Step S409: No) or when the deviation point does not exist (Step S407: No), the address of the point is designated as the name and accumulated as the deviation point (Step S412).

It is noted that the description of the embodiment is preconditioned that: the known point and the point corresponding to the editing rule have already been accumulated; and, when a point to be a unknown point is detected later, the name of the unknown point is edited based on the known point; meanwhile, the order of the accumulation and the edit may be reversed as a matter of course. In other words, in the case where the name of the facility is not finally judged to be editable with the above operation flow, the address of the relevant point is provided as the name of the point, and is accumulated along with the deviation point (Step S412). Then, when a travel is conducted later, a history is accumulated again, and a name is provide, the point at which the name is provided under the above address may be extracted, designating the relevant point as a known point, and the known point may be re-edited. In addition, the address is preliminary designated as the name for the description; meanwhile, the name may be maintained to be accumulated as NULL.

(Returning point showing a return to the route out of deviation).

It is noted in the embodiment that a point, at which driving of the user deviates from a route to enter a parking lot, is detected as a deviation point, and a history is edited, using the deviation point. A point, showing a return to the route out of the deviation, may also be used, on the contrary. The following describes with a specific example.

As described before, the deviation point detecting unit 121 judges whether or not the user deviates from the route based on the route information accumulated in the map information accumulation unit 104, and the position information detected by the position information detecting unit 101. Thus, when the user drives on the route, and then a point out of the route is detected, the point is literally a deviation point; meanwhile, when the user drives out of the route, and then a point for a return to the route is detected, the position can also be judged as a returning point. It is noted that the deviation point detecting unit 121 may also be a return judging unit since the deviation point detecting unit 121 judges a return.

Similarly to the route shown in FIG. 47 described above, the returning point can be detected out of latitude and longitude information of link information accumulated in map information whether or not the returning point is on the route.

FIG. 55 shows latitude and longitude information of the vehicle leaving the parking lot of the Tiger Department Store and returning to the route (returning point). In FIG. 55, the user leaves "135. 01. 138 east longitude, and 35. 01. 114 north latitude". This "135. 01. 138 longitude, and 35. 01. 114 north latitude" is to be judged as out of the route in accordance with map information. Then, the user drives out of the route, including "135. 01. 125 east longitude, and 35. 01. 114 north latitude", for a while, and then "135. 01. 112 east longitude, and 35. 01. 102 north latitude" is detected. This "135. 01. 112 east longitude, and 35. 01. 102 north latitude" corresponds to a point on the route, as shown in the map in FIG. 47. Then, a position before; that is "135. 01. 116 east longitude, and 35. 01. 105 north latitude", can be judged as a point at which the user returns to; namely, a returning point. It is noted that in the case where the "135. 01. 116 east longitude, and 35. 01. 105 north latitude" is detected when the user has driven his or her vehicle, and then moved to the parking lot (FIG. 48), the detected point is detected as the deviation point. In the embodiment, the detected point is referred to as a returning point since the user returns from the parking lot to the route. However, a technique for judging by the deviation point detecting unit 121 is the same. Thus, the deviation point and the returning point are simply referred to in different names for a description. Further, similarly to the deviation point, when the driving on the route is detected a plurality of times, the deviation point may be judged as the returning point in order to absorb an error of the GPS.

Figure 56:
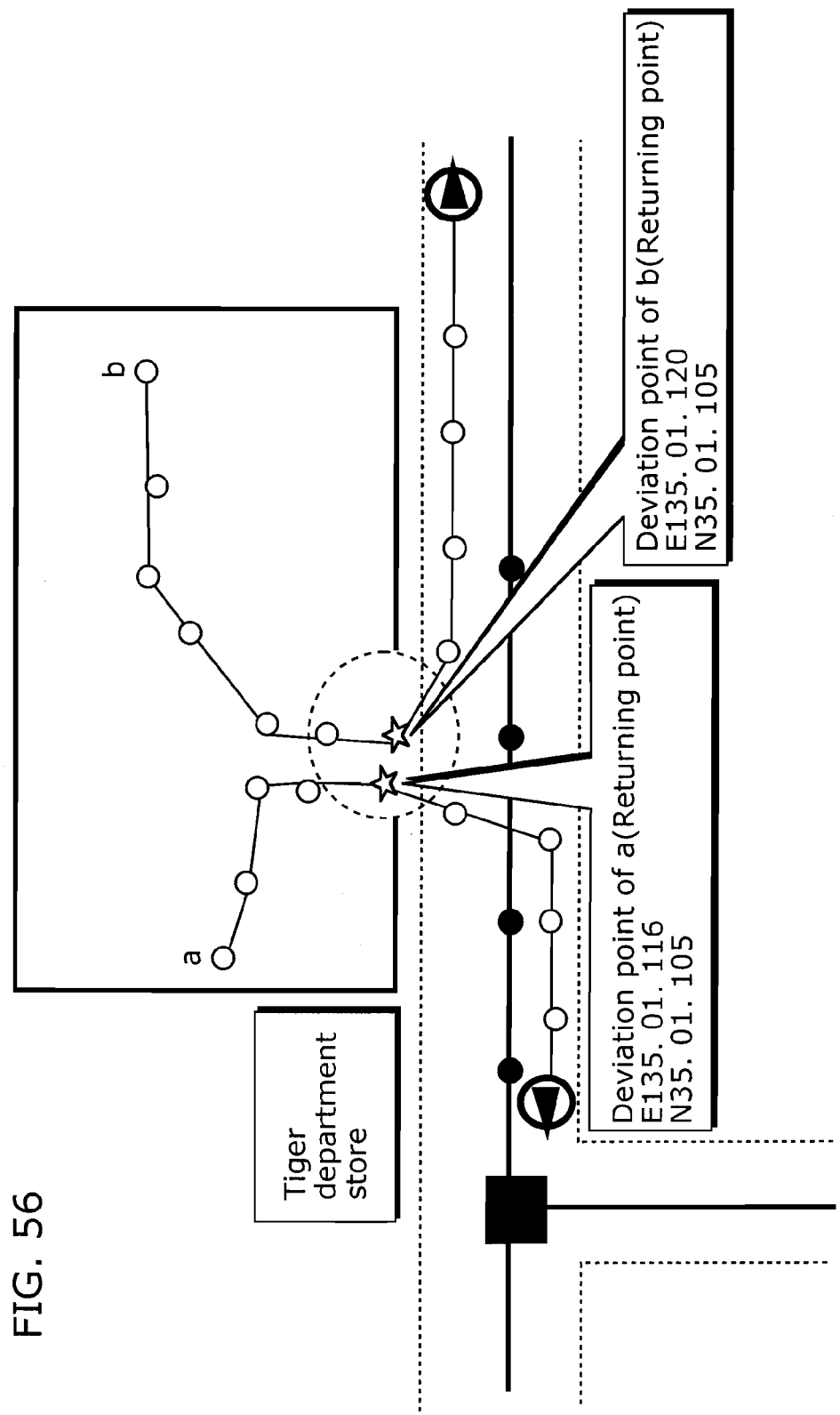
FIG. 56 shows a technique to edit a name of the starting point (arrival point), using the past returning point (deviation point).

FIG. 56 describes how a name is edited, using the returning point. In FIG. 56, the "135. 01. 116 east longitude, and 35. 01. 105 north latitude" is detected as a returning point a. A relevant starting point (in other word, the destination of the previous driving) is assumed to have the name, the Tiger Department Store. Meanwhile, as another driving, the "135. 01. 120 east longitude, and 35. 01. 105 north latitude" is detected as a returning point b. The starting point of the travel (in other words, the destination of the previous driving) is the parking lot of the Tiger Department Store; however, the parking lot is away from the Tiger Department Store, and thus, a name is assumed not to have provided yet. Hence, similarly to the name providing based on a distant relationship between the deviation points shown in FIG. 50, the name can automatically be edited as the Tiger Department Store, using the returning points.

It is noted that each of functional blocks in the block diagrams (FIGS. 1, 19, 21, 29, 42 and 43) is typically realized in an Large Scale Integration (LSI). LSIS including the LSI may be individually squeezed onto one chip. The LSIS may also be squeezed onto one chip in order to include part or all of the functional blocks.

For example, a functional block other than a memory may be onto one chip. Here, the functional block is referred to as an LSI; meanwhile, the functional blocks may also be referred to as a Integrated Circuit (IC), a system Large Scale Integration (LSI), a super LSI, and an ultra LSI.

Further, a technique to achieve an integrated circuit is not limited to an LSI. The integrated circuit may be achieved in a dedicated circuit or a general purpose processor. After producing the LSI, a programmable Field Programmable Gate Array (FPGA) and a re-configurable processor which allows a connection and a configuration of a circuit cell in the LSI to be reconfigured may be utilized.

Further, an introduction of a technique, to achieve an integrated circuit replacing the LSI, caused by improvement in a semi-conductor technique or a different technique derived from the improvement, may achieve an integrated functional block with a use of the technique, as a matter of course. An application to a biotechnology is possibly realized.

It is noted that a unit to store data subject to coding and decoding out of each of the structural blocks may be separately structured instead of squeezing onto one chip.

Industrial Applicability

The present invention is equipped with, for example, a car navigation device and a mobile terminal as a device to edit a travel history, and used as a travel history editing device to edit an accumulated travel history and to facilitate a search of a position and destination prediction.

The invention claimed is:

1. A travel history editing device editing name information of position information accumulated as a history of a travel route of a vehicle, said travel history editing device comprising:
    a position detecting unit configured to detect the position information corresponding to a position of the vehicle;
    a map information accumulation unit accumulating the name information related to one of the position information and a facility name corresponding to the position information, the facility name differing from the name information;
    an arrival point name determining unit configured to, when the vehicle arrives at an arrival point, (i) determine, as position information of the arrival point, the position information detected by said position detecting unit, and (ii) obtain the facility name that corresponds to the position information of the arrival point from said map information accumulation unit and determine the obtained facility name to be a facility name of the arrival point, or obtain the name information that relates to the position information of the arrival point from said map information accumulation unit and determine the obtained name information to be name information of the arrival point;
    a travel history accumulation unit accumulating (i) the position information of the arrival point, (ii) the determined facility name of the arrival point, and (iii) the determined name information of the arrival point; and
    a name editing unit configured to, when the name information of the arrival point is accumulated in said travel history accumulation unit, edit the name information of the arrival point to the facility name of the arrival point accumulated in said travel history accumulating unit, such that the edited name information of the arrival point is represented by a facility name previously visited by a user, and such that the name information of the arrival point is edited in accordance with a predetermined rule.

2. The travel history editing device according to claim 1, wherein said arrival point name determining unit is configured to determine that the vehicle arrives at the arrival point when an engine of the vehicle shuts down.

3. The travel history editing device according to claim 1, wherein said arrival point name determining unit is configured to (i) search said map information accumulation unit for a facility located within a first distance from the position information of the arrival point, and (ii), when the facility is located within the first distance, determine a name of the located facility to be the facility name of the arrival point.

4. The travel history editing device according to claim 3, wherein said name editing unit is configured to (i) select the name information of the arrival point accumulated in said travel history accumulating unit, (ii) search said travel history accumulation unit for the facility name of the arrival point found within a second distance, which is greater than the first distance, from the selected name information of the arrival point, and (iii), when the facility name of the arrival point is located within the second distance, edit the selected name information of the arrival point to the name of the located facility.

5. The travel history editing device according to claim 1, further comprising an editing rule accumulation unit accumulating the predetermined rule.

6. The travel history editing device according to claim 5, wherein said travel history accumulation unit accumulates a time and a date when the vehicle arrives at the arrival point, in addition to the determined facility name of the arrival point and the determined name information of the arrival point, and
    wherein said name editing unit is configured to edit the name information of the arrival point accumulated in said travel history accumulating unit to the facility name of the arrival point, when the facility name of the arrival point and the name information of the arrival point, which are accumulated in said travel history accumulation unit, satisfy the predetermined rule that describes (i) a first condition which stipulates that a date of arrival at an arrival point accumulated under a facility name differs from a date of arrival at the arrival point accumulated under name information, and (ii) a second condition which stipulates that, when a time zone is classified into a day of a week and time windows in the day of the week, a time of arrival at an arrival point accumulated under a facility name is in a same class of a time of arrival at an arrival point accumulated under name information.

7. The travel history editing device according to claim 6, wherein the day of the week is classified into a weekday and a weekend, and
    wherein the time windows are classified into morning, afternoon and night.

8. The travel history editing device according to claim 6, wherein, when said travel history accumulation unit accumulates a plurality of the facility names of the arrival point, which satisfies both the first condition and the second condition, said name editing unit is further configured to edit the name information of the arrival point to a facility name of the arrival point that is closer to the position information which relates to the name information of the arrival point.

9. The travel history editing device according to claim 1, wherein said name editing unit is configured to edit the name information of the arrival point only when the name information of the arrival point accumulated in said travel history accumulation unit is a parking lot.

10. The travel history editing device according to claim 4, wherein, when a facility corresponding to the facility name of the arrival point located within the second distance has a parking lot, said name editing unit is configured to (i) detect whether or not the parking lot is full when the selected name information of the arrival point is provided as the arrival point, and only when a result of detection indicates that the parking lot is full, and (ii) edit the selected name information of the arrival point to the facility name of the arrival point.

11. The travel history editing device according to claim 4, further comprising:
    a parking lot information accumulation unit obtaining and accumulating, via a communication network, full-vacant information indicating whether a parking lot of a facility nearby the arrival point is full or vacant; and
    a change of arrival point intention estimating unit configured to (i) check said parking lot information accumulation unit for the full-vacant information for the parking lot of the facility corresponding to the located facility name of the arrival point, (ii) determine that the vehicle cannot park at the parking lot of the facility corresponding to the located facility name of the arrival point when the parking lot is full and when the selected name information of the arrival point is provided as the arrival point, and (iii) determine that the facility corresponding to the located facility name of the arrival point is not the arrival point when the parking lot is vacant and when the selected name information of the arrival point is provided as the arrival point, wherein, when said change of arrival point intention estimating unit determines that the vehicle cannot park at the parking lot of the facility corresponding to the located facility name of the arrival point, said name editing unit is configured to edit the selected name information of the arrival point to the located facility name of the arrival point.

12. The travel history editing device according to claim 6, wherein, when said travel history accumulation unit accumulates a plurality of the facility names of the arrival point, which satisfies both the first condition and the second condition, said name editing unit is configured to (i) weigh the facility names of the arrival point based on a distance between position information related to the name information of the arrival point and position information related to the facility name of the arrival point, and (ii) accumulate, in said travel history accumulation unit, the weighted facility names as candidates for the facility name of the arrival point used for editing the name information of the arrival point.

13. The travel history editing device according to claim 6, wherein, when said travel history accumulation unit does not accumulate the facility name of the arrival point located within the second distance, said name editing unit is configured to (i) select, from said map information accumulation unit, a facility name of a facility found within the second distance from an arriving point in the name information of the arriving point, and (ii) accumulate, as a neighboring facility name, the selected facility name in said travel history accumulation unit.

14. The travel history editing device according to claim 1, wherein said map information accumulation unit further accumulates route information indicating a range of a route, wherein said travel history editing device further includes a deviation point detecting unit configured to detect a point at which the vehicle detected by said position detecting unit either deviates from the range of the route indicated in the route information or returns to the route from out of the route, wherein said travel history accumulation unit accumulates a deviation point or a returning point, along with the position information of the arrival point and the facility name of the arrival point or the position information of the arrival point and the name information of the arrival point, and wherein said name editing unit is configured to edit the name information of the arrival point to the facility name of the arrival point when either the deviation point or the returning point which comes along with the name information of the arrival point is located within a predetermined range from either the deviation point or the returning point which comes along with the facility name of the arrival point.

15. The travel history editing device according to claim 14, wherein the route information accumulated in said map information accumulation unit includes route width information indicating a width of the route, and wherein said deviation point detecting unit regards position information out of the route width as the deviation point when the detected position information of the vehicle is detected as the position information out of the route width.

16. The travel history editing device according to claim 15, wherein said deviation point detecting unit regards the position information out of the route width as the deviation point when the position information of the vehicle detected by the position information detecting unit is detected a plurality of consecutive times as the position information out of the route width.

17. A history editing method of using a device for editing name information of position information accumulated as a history of a travel route of a vehicle, wherein the device includes a map information accumulation unit accumulating the name information related to one of the position information and a facility name corresponding to the position information, the facility name differing from the name information, and wherein said history editing method includes:
detecting, via a position detecting unit, the position information corresponding to a position of the vehicle;

when the vehicle arrives at an arrival point, (i) determining, as position information of the arrival point, the position information detected by the position detecting unit, and (ii) obtaining the facility name that corresponds to the position information of the arrival point from the map information accumulation unit and determining the obtained facility name to be a facility name of the arrival point, or obtaining the name information that relates to the position information of the arrival point from the map information accumulation unit and determining the obtained name information to be name information of the arrival point;

accumulating, via a travel history accumulation unit, (i) the position information of the arrival point, (ii) the determined facility name of the arrival point, and (iii) the determined name information of the arrival point; and when the name information of the arrival point is accumulated in the travel history accumulation unit, editing, via a name editing unit, the name information of the arrival point to the facility name of the arrival point accumulated in the travel history accumulating unit, such that the edited name information of the arrival point is represented by a facility name previously visited by a user, and such that the name information of the arrival point is edited in accordance with a predetermined rule.

18. A non-transitory computer-readable recording medium having a computer program recorded thereon, the computer program being for a travel history editing device including a map information accumulation unit, and editing name information of position information accumulated as a history of a travel route of a vehicle, the map information accumulation unit accumulating the name information related to one of the position information and a facility name corresponding to the position information, the facility name differing from the name information comprising:

detecting position information corresponding to a position of the vehicle;

when the vehicle arrives at an arrival point:
determining, as position information of the arrival point, the position information detected by said detecting of the position information; and obtaining the facility name that corresponds to the position information of the arrival point from the map information accumulation unit and determining the obtained facility name to be a facility name of the arrival point, or obtaining the name information that relates to the position information of the arrival point from the map information accumulation unit and determining the obtained name information to be name information of the arrival point;

accumulating (i) the position information of the arrival point, (ii) the determined facility name of the arrival point, and (iii) the determined name information of the arrival point; and when the name information of the arrival point is accumulated, editing the name information of the arrival point to the facility name of the arrival point accumulated in said accumulating, such that the edited name information of the arrival point is represented by a facility name previously visited by a user, and such that the name information of the arrival point is edited in accordance with a predetermined rule.

19. A car navigation device, comprising:

a processor;

a Global Positioning System (GPS) detecting position information corresponding to a position of a vehicle;

a first storing unit accumulating name information related to one of the position information and a facility name corresponding to the position information, the facility name differing from the name information;

a second storing unit storing a program that, when executed by said processor, causes said processor to execute:

when the vehicle arrives at an arrival point, (i) determining, as position information of the arrival point, the position information detected by said GPS, and (ii) obtaining the facility name that corresponds to the position information of the arrival point from said first storing unit and determining the obtained facility name to be a facility name of the arrival point, or obtaining the name information that relates to the position information of the arrival point from said first storing unit and determining the obtained name information to be name information of the arrival point;

accumulating, via said second storing unit, (i) the position information of the arrival point, (ii) the determined facility name of the arrival point, and (iii) the determined name information of the arrival point; and when the name information of the arrival point is accumulated in said second storing unit, editing, via a name editing unit, the name information of the arrival point to the facility name of the arrival point accumulated in said second storing unit, such that the edited name information of the arrival point is represented by a facility name previously visited by a user, and such that the name information of the arrival point is edited in accordance with a predetermined rule.

* * * * *